United States Patent
Yasumoto et al.

(10) Patent No.: US 10,374,492 B2
(45) Date of Patent: *Aug. 6, 2019

(54) MOTOR APPARATUS HAVING IMPROVED CONNECTOR UNIT

(71) Applicant: Mitsuba Corporation, Gunma (JP)

(72) Inventors: Kenji Yasumoto, Gunma (JP); Teppei Tokizaki, Gunma (JP); Shigeki Ota, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,329

(22) Filed: Mar. 9, 2017

(65) Prior Publication Data
US 2017/0207686 A1 Jul. 20, 2017

Related U.S. Application Data

(63) Continuation of application No. 14/778,764, filed as application No. PCT/JP2014/057746 on Mar. 20, 2014, now Pat. No. 9,627,939.

(30) Foreign Application Priority Data

Mar. 22, 2013 (JP) ................................ 2013-060810
Mar. 22, 2013 (JP) ................................ 2013-060933
(Continued)

(51) Int. Cl.
*H02K 11/00* (2016.01)
*H02K 1/17* (2006.01)
(Continued)

(52) U.S. Cl.
CPC ............ *H02K 11/0094* (2013.01); *B60S 1/08* (2013.01); *H01R 13/11* (2013.01); *H01R 39/383* (2013.01);
(Continued)

(58) Field of Classification Search
CPC .......... H02K 5/22; H02K 5/225; H02K 23/04; H02K 1/17
(Continued)

(56) References Cited

U.S. PATENT DOCUMENTS

| 4,455,511 | A | | 6/1984 | Stewart, Sr. |
| 5,497,039 | A | * | 3/1996 | Blaettner ................ H02K 1/17 310/154.08 |

(Continued)

FOREIGN PATENT DOCUMENTS

| CN | 102044933 A | 5/2011 |
| EP | 2267872 A1 | 12/2010 |

(Continued)

*Primary Examiner* — Thomas Truong
(74) *Attorney, Agent, or Firm* — McCormick, Paulding & Huber LLP

(57) ABSTRACT

A motor apparatus provided with a connector unit (40) to which an external connector is connected, wherein the connector unit (40) has a plurality of conductive members (64, 65, 66) arranged over a base portion (50) and a connector connecting portion (70) provided with a plug-in hole in which the external connector is plugged, wherein the conductive members (64, 65, 66) respectively include connector-side connecting portions (64a, 65a, 66a) connected to the external connector so as to face the connector connecting portion (70) from a first direction reversed to a plug-in direction of the external connector to the plug-in hole and base-side connecting portions (64b, 65b, 66b) connected to terminals or wirings provided in the base portion (50), wherein the connector-side connecting portions (64a, 65a, 66a) are respectively inserted into a plurality of insertion holes (74, 75, 76) provided at positions different from each other in a second direction intersecting the first direction, and wherein the base-side connecting portions (64b, 65b, 66b) are respectively arranged at the same position in the second direction.

12 Claims, 41 Drawing Sheets

| (30) | Foreign Application Priority Data | | |
|---|---|---|---|
| Mar. 29, 2013 | (JP) | | 2013-072538 |
| Aug. 13, 2013 | (JP) | | 2013-167987 |
| Aug. 13, 2013 | (JP) | | 2013-167987 |

(51) Int. Cl.
| | | |
|---|---|---|
| *H02K 5/04* | (2006.01) | |
| *H02K 23/04* | (2006.01) | |
| *H02K 5/22* | (2006.01) | |
| *B60S 1/08* | (2006.01) | |
| *H02K 7/116* | (2006.01) | |
| *H02K 11/21* | (2016.01) | |
| *H02K 11/38* | (2016.01) | |
| *H02K 5/08* | (2006.01) | |
| *H01R 13/11* | (2006.01) | |
| *H01R 39/38* | (2006.01) | |
| *H02K 5/14* | (2006.01) | |

(52) U.S. Cl.
CPC ............... *H02K 1/17* (2013.01); *H02K 5/08* (2013.01); *H02K 5/225* (2013.01); *H02K 7/1166* (2013.01); *H02K 11/21* (2016.01); *H02K 11/38* (2016.01); *H02K 23/04* (2013.01); *H02K 5/148* (2013.01)

(58) Field of Classification Search
USPC .................................. 310/71, 154.01–154.49
IPC ..................................................... H02K 005/22
See application file for complete search history.

(56) References Cited

U.S. PATENT DOCUMENTS

| 9,627,939 B2* | 4/2017 | Yasumoto | H02K 5/225 |
|---|---|---|---|
| 2004/0061391 A1* | 4/2004 | Matsuyama | G01P 1/026 |
| | | | 310/71 |
| 2009/0102303 A1* | 4/2009 | Ackva | H02K 1/17 |
| | | | 310/154.21 |
| 2009/0255186 A1 | 10/2009 | Uchimura | |
| 2010/0231072 A1 | 9/2010 | Qin et al. | |
| 2011/0018385 A1* | 1/2011 | Ishikawa | H02K 1/17 |
| | | | 310/234 |

FOREIGN PATENT DOCUMENTS

| JP | H05178168 A | 7/1993 |
|---|---|---|
| JP | 2001103709 A | 4/2001 |
| JP | 2002238218 A | 8/2002 |
| JP | 2008092641 A | 4/2008 |
| JP | 2010042729 A | 2/2010 |
| JP | 2011-33076 A | 2/2011 |
| JP | 2011-84251 A | 4/2011 |
| JP | 2011-256932 A | 12/2011 |
| JP | 2012222995 A | 11/2012 |
| JP | 2013099137 A | 5/2013 |

* cited by examiner

FIG. 18
(a)
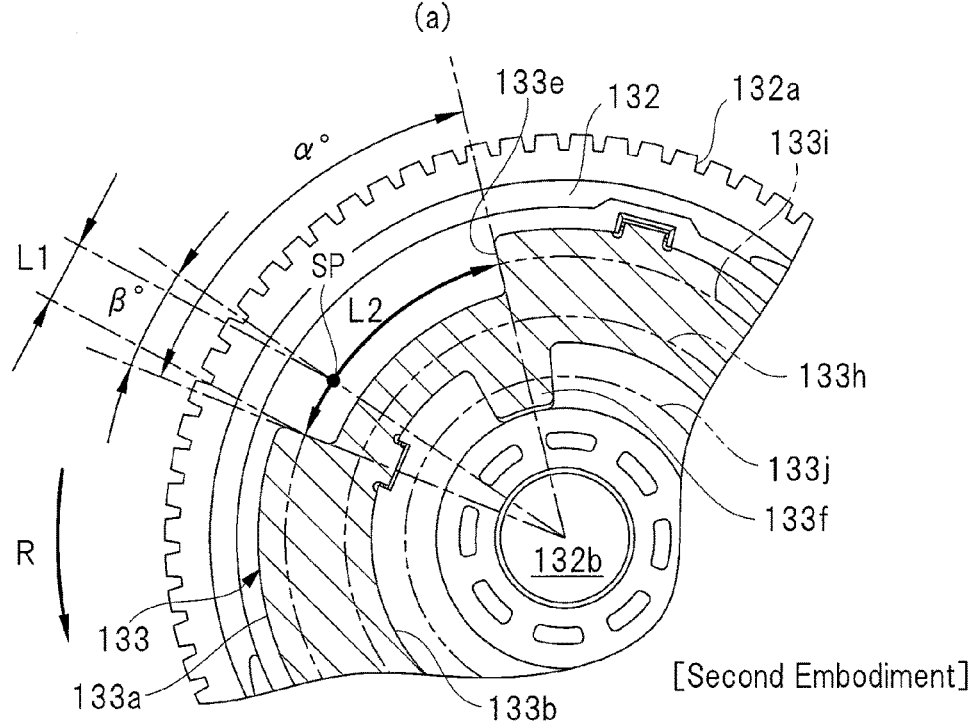
[Second Embodiment]
(b)
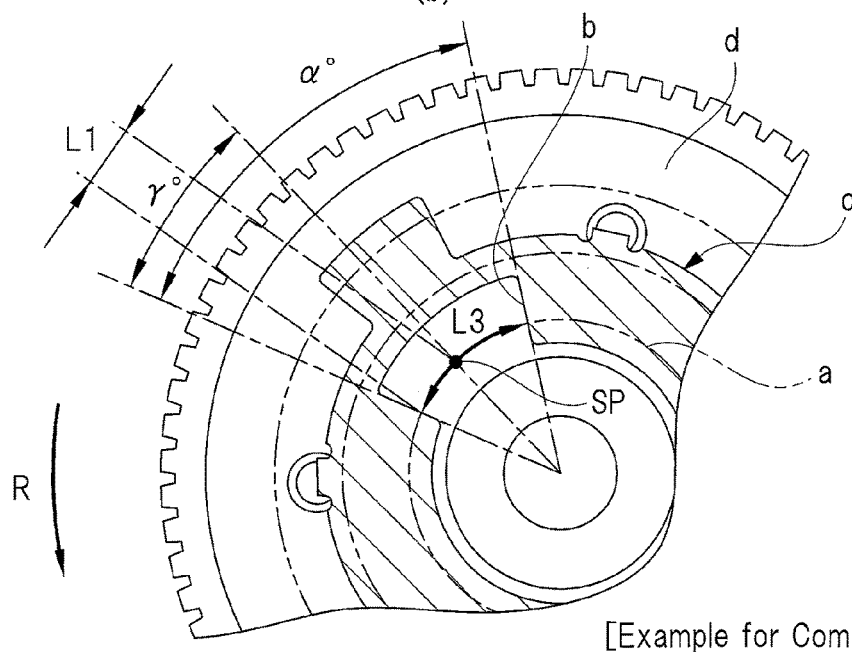
[Example for Comparison]

FIG. 29
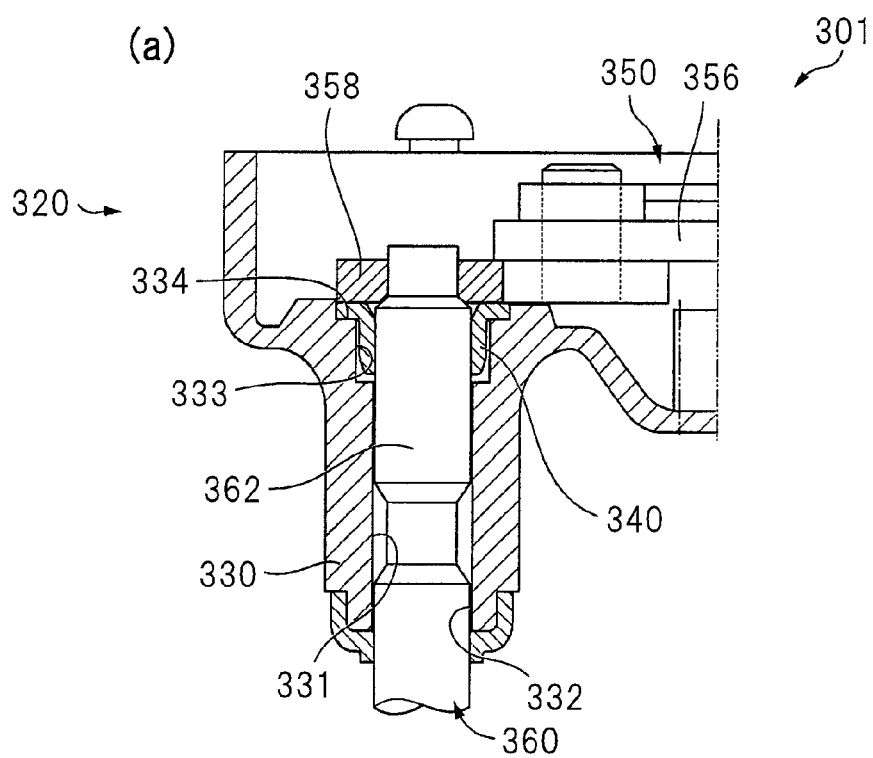
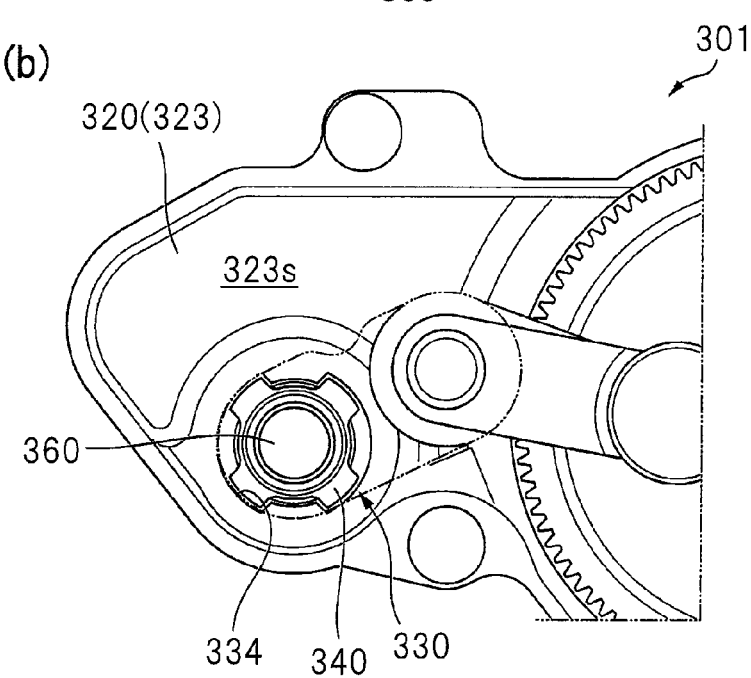

FIG. 31
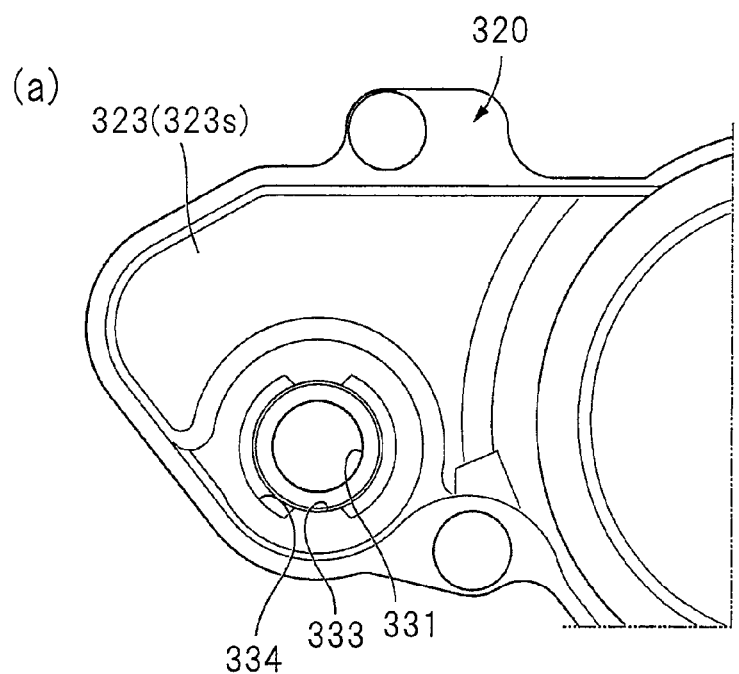
(a)
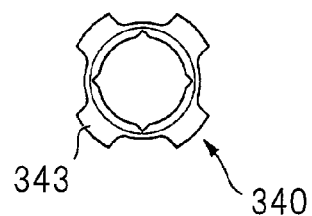
(b)

FIG. 39
(a) 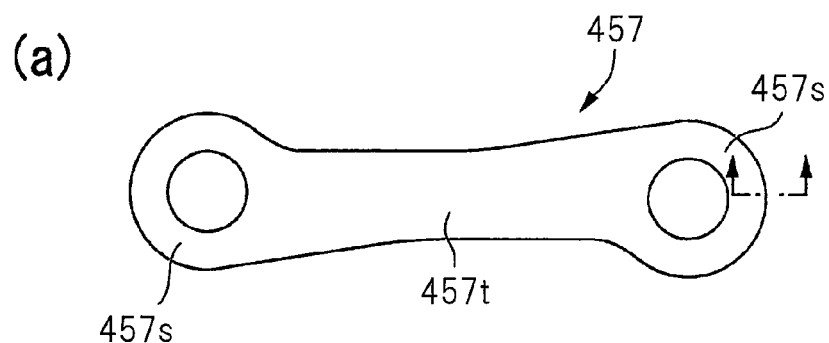
(b) 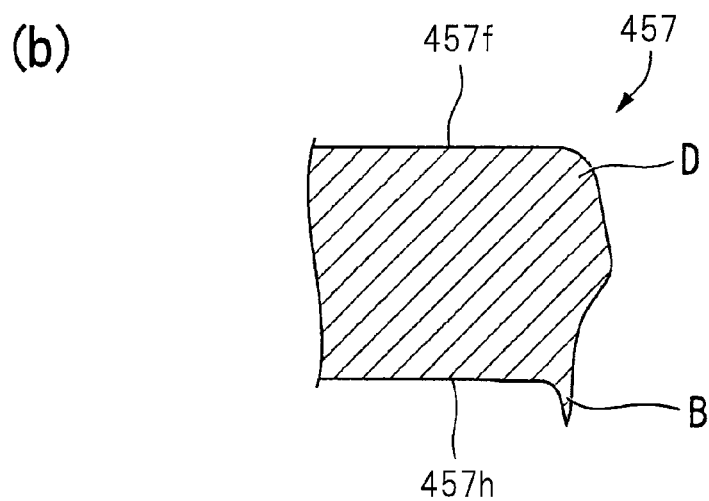
(c) 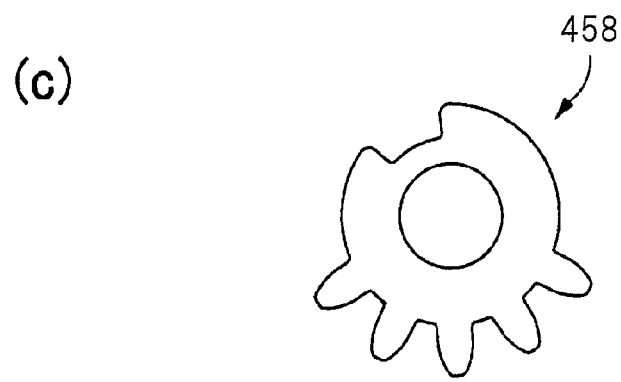

MOTOR APPARATUS HAVING IMPROVED CONNECTOR UNIT

CROSS REFERENCE TO RELATED APPLICATION

This application is a continuation of U.S. patent application Ser. No. 14/778,764, filed on Sep. 21, 2015, which is the National Stage Filing of PCT Application Serial No. PCT/JP2014/057746, filed on Mar. 20, 2014 which claims priority to Japanese Patent Application Serial No. 2013-060810 filed on Mar. 22, 2013; Japanese Patent Application Serial No. 2013-060933, filed on Mar. 22, 2013; Japanese Patent Application Serial No. 2013-072538, filed on Mar. 29, 2013; Japanese Patent Application Serial No. 2013-167986, filed on Aug. 13, 2013 and Japanese Patent Application Serial No. 2013-167987, filed on Aug. 13, 2013, the contents of which are incorporated by reference herein.

TECHNICAL FIELD

The present invention relates to a motor apparatus provided with a connector unit to be connected to an external connector and a motor section supplied with driving current through the connector unit.

BACKGROUND ART

As one example of a motor apparatus described above, there is a wiper motor for driving a wiper apparatus mounted on such a vehicle as an automobile. The wiper motor has a motor section provided with an armature shaft which is rotated when driving current is supplied to the motor section, a reduction gear mechanism section for reducing speed of rotation of the armature shaft to increase torque, and a connector unit attached to the motor section or the reduction gear mechanism section and connected to an external connector, wherein driving current is supplied from the external connector to the motor section through the connector unit.

One example of a wiper motor having a structure described above is described in Japanese Patent Application Laid-Open Publication No. 2008-236995 (FIGS. 11 and 12). The wiper motor described in Japanese Patent Application Laid-Open Publication No. 2008-236995 (FIGS. 11 and 12) has a motor subassembly (the motor section) provided with an armature shaft (armature spindle), a reduction gear portion subassembly (the reduction gear mechanism section) provided with a reduction gear mechanism including a worm and a worm wheel, and a brush holder unit (the connector unit) disposed between the motor subassembly and the reduction gear portion subassembly and provided with a connector box connected to an external connector.

The brush holder constituting the brush holder unit is formed of a resin material having electrical insulation, and is molded into a predetermined shape by injection molding. Furthermore, a plurality of internal wirings is embedded in the brush holder by insert molding. The respective internal wirings which are insert members are strip-shaped electrical conductive members bent in an X-axis direction, a Y-axis direction, and Z-axis direction. That is, the respective internal wirings have a labyrinth-like shape. The respective internal wirings are embedded in the brush holder such that they do not interfere with one another. One end sides of the respective internal wirings are drawn into the motor section and the reduction gear mechanism section, while the other end sides thereof are drawn into the connector box to be collected therein.

SUMMARY

In the wiper motor described in Japanese Patent Application Laid-Open Publication No. 2008-236995 (FIGS. 11 and 12), a plurality of internal wirings (electrical conductive members) bent in a three-dimensional fashion are embedded into the brush holder by the insert molding. Therefore, in order to mold the brush holder, a plurality of sliding molds was required in addition to an upper mold and a lower mold. That is, it was necessary to undergo a complicated manufacturing process in order to the wiper motor described in Japanese Patent Application Laid-Open Publication No. 2008-236995 (FIGS. 11 and 12).

It is therefore an object of the present invention to simplify a manufacturing process of a motor apparatus including a wiper motor as much as possible.

A motor apparatus according to the present invention is provided with a connector unit to which an external connector for supplying driving current to a motor section is connected, wherein the connector unit comprises: a base portion provided with an opening portion in which an armature shaft extending from the motor section is inserted; a connector connecting portion provided with a plug-in hole in which the external connector is plugged; and a plurality of conductive members arranged over the base portion and the connector connecting portion, wherein the conductive members respectively include connector-side connecting portions connected to the external connector so as to face the connector connecting portion from a first direction reversed to a plug-in direction of the external connector to the plug-in hole and base-side connecting portions connected to terminals or wirings provided in the base portion, wherein the connector-side connecting portions of the respective conductive members are respectively inserted into a plurality of insertion holes provided at positions different from each other in a second direction intersecting the first direction, and wherein the base-side connecting portions of the conductive members are respectively arranged at the same position in the second direction.

In accordance with one aspect of the present invention, a holder member holding the conductive members is provided between the same and the connector connecting portion so as to face from the first direction to the connector connecting portion.

In accordance with another aspect of the present invention, an insulating projection interposed between the conductive members adjacent to each other is formed on an inner face of the holder member facing the connector connecting portion.

In accordance with still another aspect of the present invention, the connector unit is at least provided with a first attaching portion attached with a first conductive member and a second attaching portion attached with a second conducive member, the first attaching portion has a first supporting face on which a lower face of the first conductive member is placed, and a first positioning face rising from the first supporting face, on which a side face of the first conductive member is caused to abut, and the second attaching portion has a second supporting face extending from the first positioning face in parallel with the first supporting face, on which a lower face of the second conductive member is placed, and a second positioning face rising from the second supporting face, on which a side face of the second conductive member is caused to abut.

In accordance with yet another aspect of the present invention, the conductive members respectively have intermediate portions connecting the connector-side connecting portions and the base-side connecting portions, the intermediate portions including flat portions parallel to the base-side connecting portions, and the flat portions of the conductive members are respectively arranged at positions different from one another in the second direction.

According to the present invention, a simplified manufacturing process of a motor apparatus including a wiper motor is realized.

BRIEF DESCRIPTION OF THE DRAWINGS

FIG. 18 is a partially-enlarged view comparing a switching plate of the second embodiment and a switching plate of a comparative example;

FIG. 29 is a view showing a sleeve 330;

FIG. 31 is a view showing a whirl-stop mechanism for the resin-made bush 340;

FIG. 39 is a view showing a coupling plate 457 and a second sector gear 458;

DETAILED DESCRIPTION

First Embodiment

Figure 1:
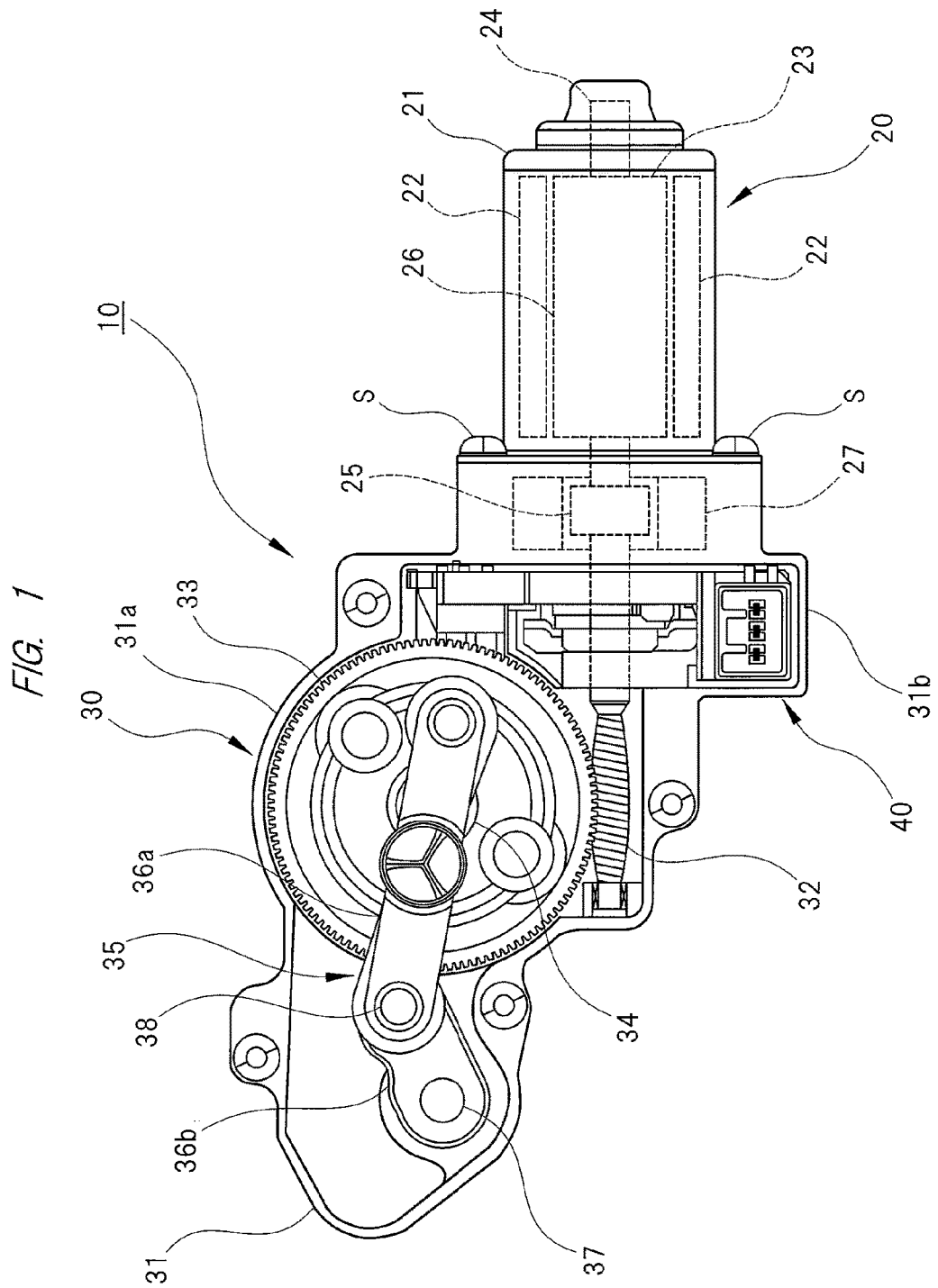
FIG. 1 is a plan view of a wiper motor.

Hereinafter, a first embodiment of the present invention will be described in detail with reference to the drawings. A wiper motor 10 shown in FIG. 1 is a motor apparatus which is used as a driving source of a rear wiper apparatus mounted on a rear hatch of a vehicle or the like, and provided with a motor section 20 and a reduction gear mechanism section 30.

The motor section 20 is composed of a four-pole motor with brush, and provided with a yoke 21 as a casing formed of a magnetic steel plate. The yoke 21 is formed into a bottomed cylindrical shape by press work, and four magnets 22 are fixed to an inner circumferential face of the yoke 21. However, only two magnets 22 are shown in FIG. 1. An armature 23 is rotatably accommodated and surrounded by these magnets 22 via a predetermined gap (air gap) between the armature 22 and each magnet 22.

The armature 23 is provided with an armature shaft rotatably supported by the yoke 21, and a commutator 25 and an armature core 26 are fixed to the armature shaft 24. The commutator 25 is provided with a plurality of segments, and a plurality of armature coils are wounded on the armature shaft 24. Furthermore, a coil end of each armature coil is electrically connected to each segment of the commutator 25.

A power-supply unit 27 provided with a plurality of brushes coming in sliding contact with the commutator 25 is arranged inside a gear case 31 around the commutator 25. The power-supply unit 27 is supplied with driving current via a connector unit 40 integrated with the reduction gear mechanism section 30. The driving current supplied to the power-supply unit 27 is supplied to the armature 23 (each armature coil) via the brushes and commutator 25. When the driving current is supplied to the armature 23, the armature shaft 24 is rotated in a predetermined direction at a predetermined velocity.

The reduction gear mechanism section 30 is provided with the gear case 31 forged from aluminum material and serving as a casing. A reduction gear mechanism accommodating portion 31a and a connector unit accommodating portion 31b which are molded into a bathtub shape are provided inside the gear case 31. The gear case 31 is fixed to an opening end of the yoke 21 by two fixing screws "S".

One end of the armature shaft 24 projecting from the opening end of the yoke 21 extends through the connector unit accommodating portion 31b to advance into the reduction gear mechanism accommodating portion 31a. The one end of the armature shaft 24 advancing into the reduction gear mechanism portion 31a is coupled to one end of a worm shaft 32 rotatably supported within the reduction gear mechanism accommodating portion 31a.

A worm wheel 33 is accommodated in the reduction gear mechanism accommodating portion 31a. The worm wheel 33 is rotatably supported by a supporting shaft 34, and a teeth portion of the worm wheel 33 meshes with a worm formed integrally with the worm shaft 32. A reduction gear mechanism for reducing rotation of the armature shaft 24 to increase torque is constituted by the worm shaft 32 and the worm wheel 33 thus configured.

Furthermore, a power converting mechanism 35 converting a rotating motion of the worm wheel 33 to a swinging motion is accommodated in the reduction gear mechanism accommodating portion 31a. The power converting mechanism 35 is provided with an arm member 36a whose one end is rotatably coupled to the worm wheel 33 and an arm member 36b whose one end is fixed to an output shaft 37, and the other ends of the arm member 36a and the arm member 36b are rotatably coupled to each other by a coupling pin 38.

The output shaft 37 is rotatably attached to the gear case 31, and a rear wiper arm for wiping a rear window glass is fixed to an end portion of the output shaft 37 projecting outside the gear case 31.

When the armature shaft 24 of the motor section 20 is rotated, the rotation is reduced by the reduction gear mechanism (the worm shaft 32 and the worm wheel 33), so that torque is increased. Furthermore, the rotating motion of the worm wheel 33 is converted into a swinging motion by the power converting mechanism 35 to be transmitted to the output shaft 37. Thereby, the rear wiper arm fixed to the output shaft 37 is swung (reciprocated) on the rear window glass, so that the rear window glass is wiped.

A connector unit 40 shown in FIG. 2 to FIG. 5 is accommodated in the connector case accommodating portion 31b of the gear case 31. The connector unit 40 is arranged inside the connector unit accommodating portion 31b shown in FIG. 1, and it is provided with a base portion 50 arranged within the connector unit accommodating portion 31b shown in FIG. 1 and covered with a cover (not shown) fixed to the gear case 31, a plurality of electrical components 60 (half-tone dotted meshing portions in the figures), and a connector connecting portion 70 which is not covered with the cover and is exposed outside.

The base portion 50 and the connector connecting portion 70 are composed of an integral resin member injection-molded, and an external connector (not shown) where a plurality of wirings connected to a vehicle-mounted battery, a vehicle-mounted controller, and the like are collected is connected to the connector connecting portion 70. The electrical components 60 are formed of a steel material or a steel plate having conductivity. Furthermore, the electrical components 60 include electronic parts (for example, a varistor) for removing brush noises, and the like.

Figure 2:
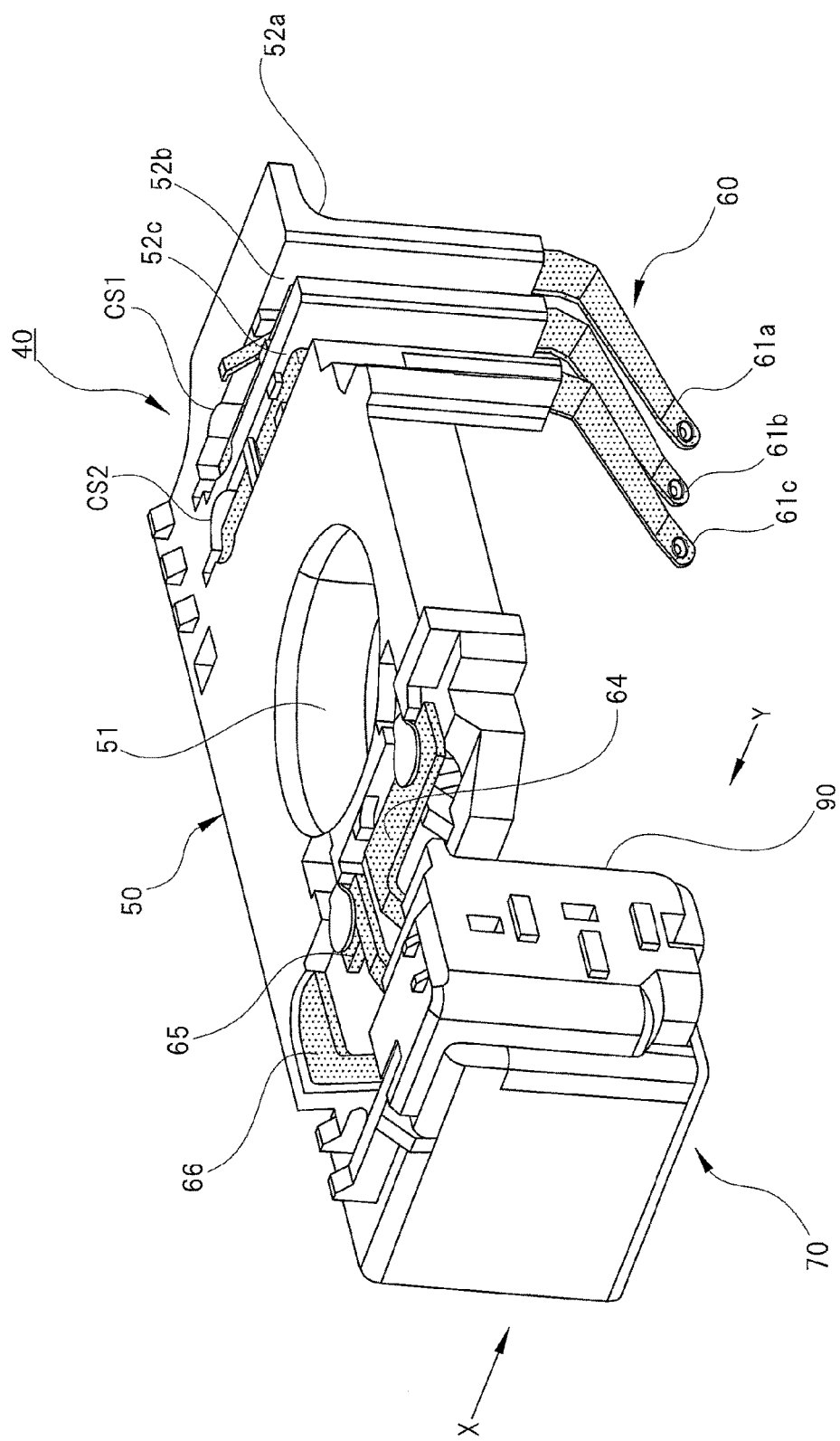
FIG. 2 is a perspective view of a connector unit shown in FIG. 1.
Figure 3:
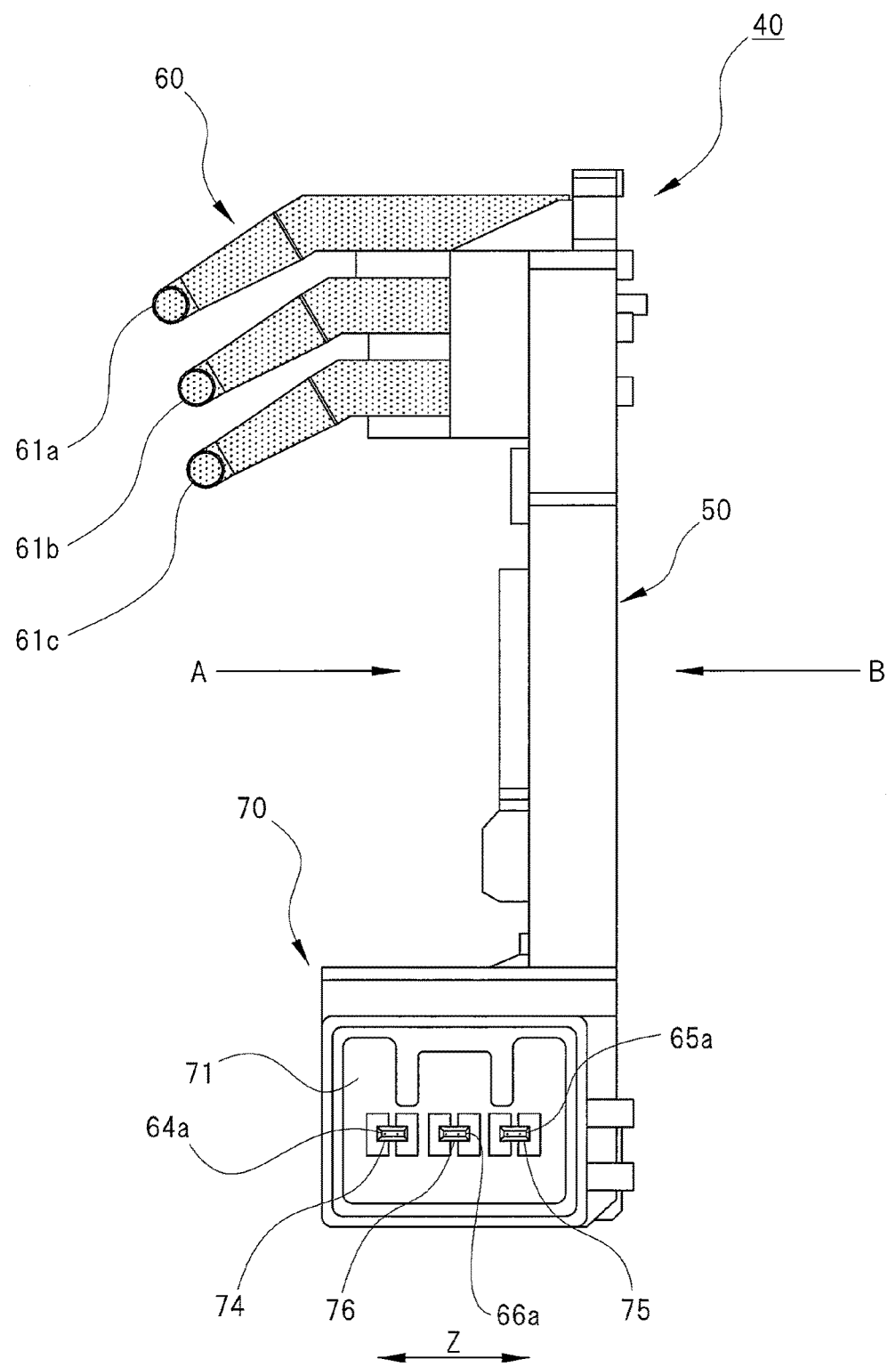
FIG. 3 is a plan view of the connector unit shown in FIG. 1.
Figure 4:
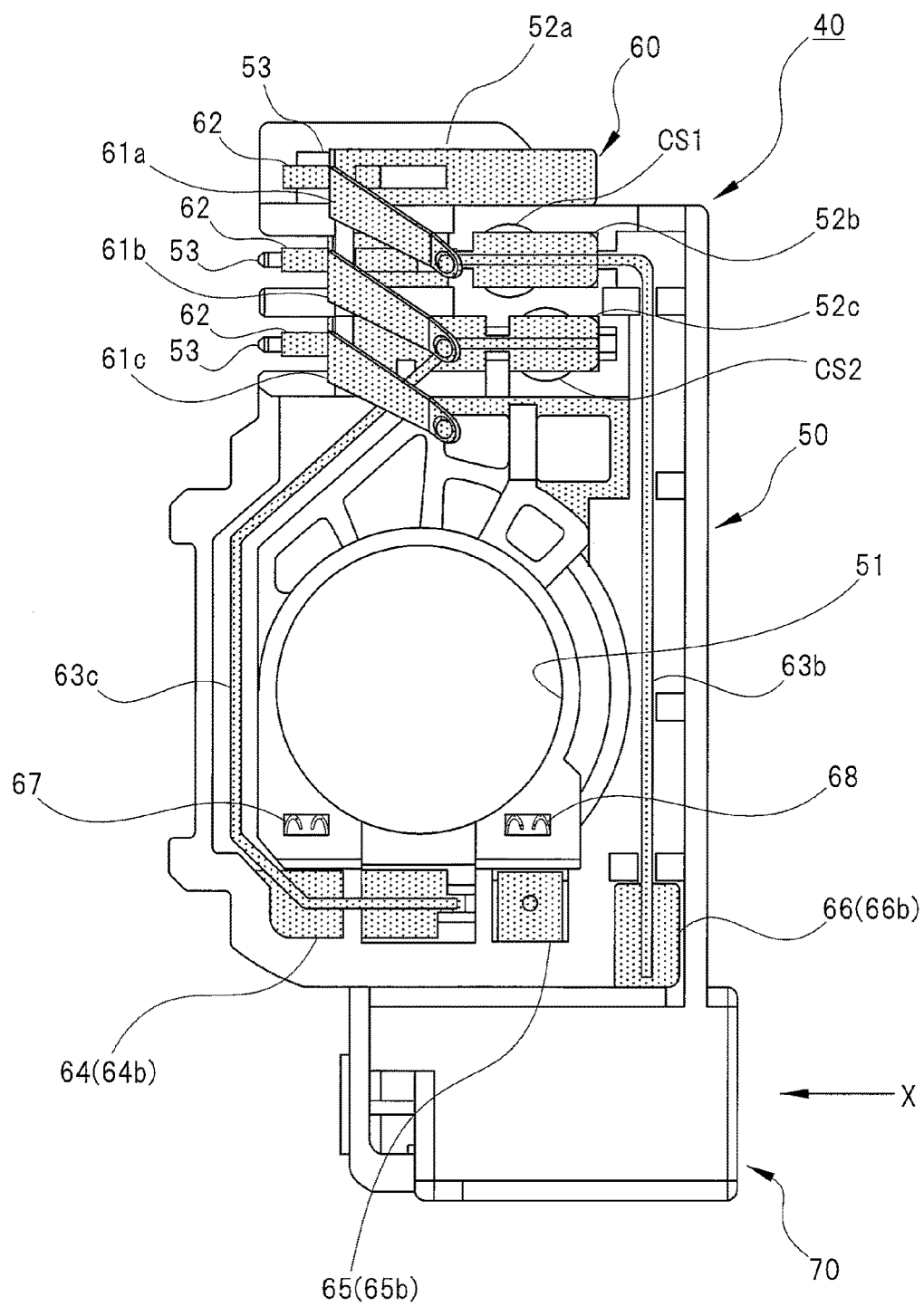
FIG. 4 is an arrow view from "A" in FIG. 3.
Figure 5:
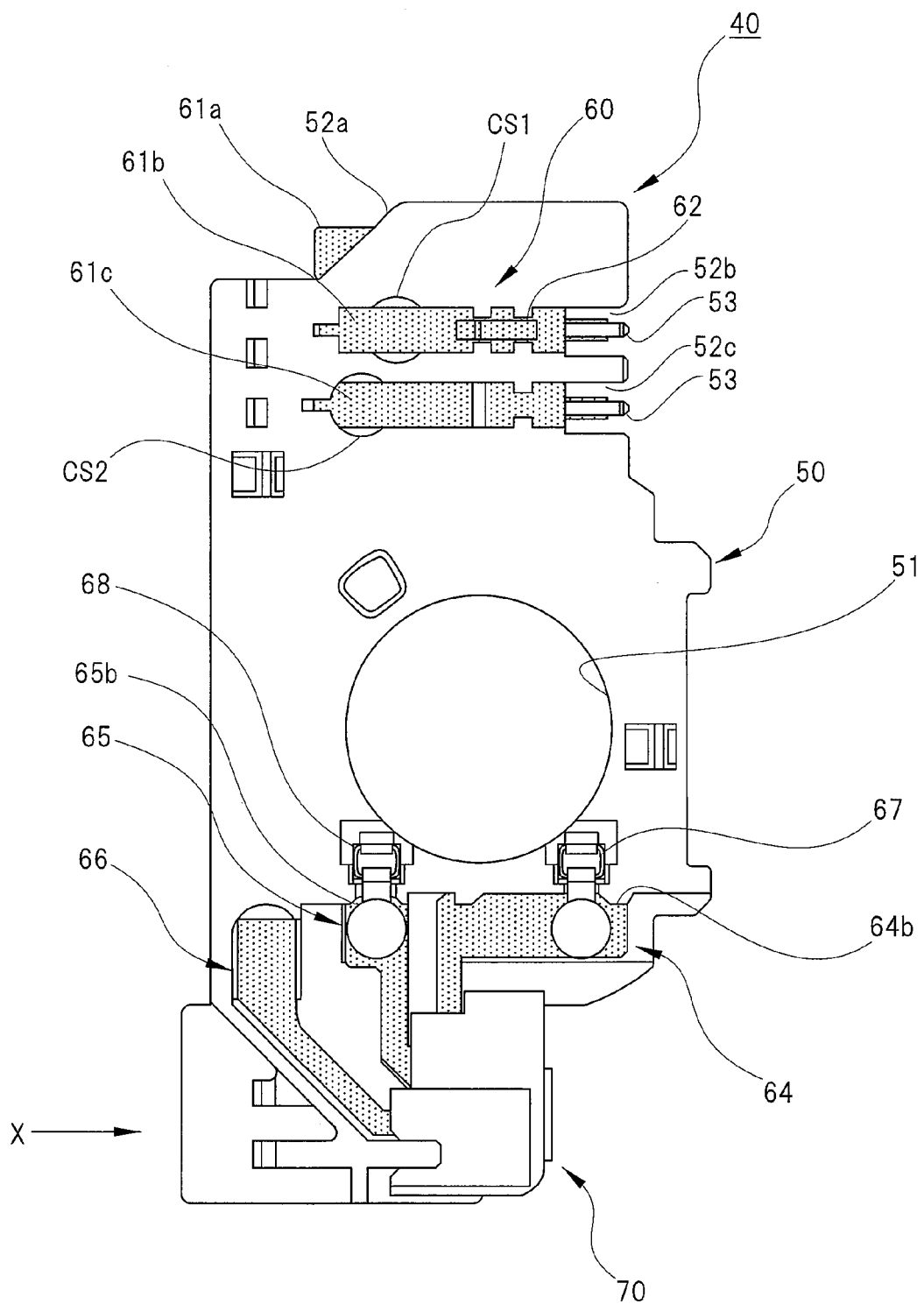
FIG. 5 is an arrow view from "B" in FIG. 3.
Figure 6:
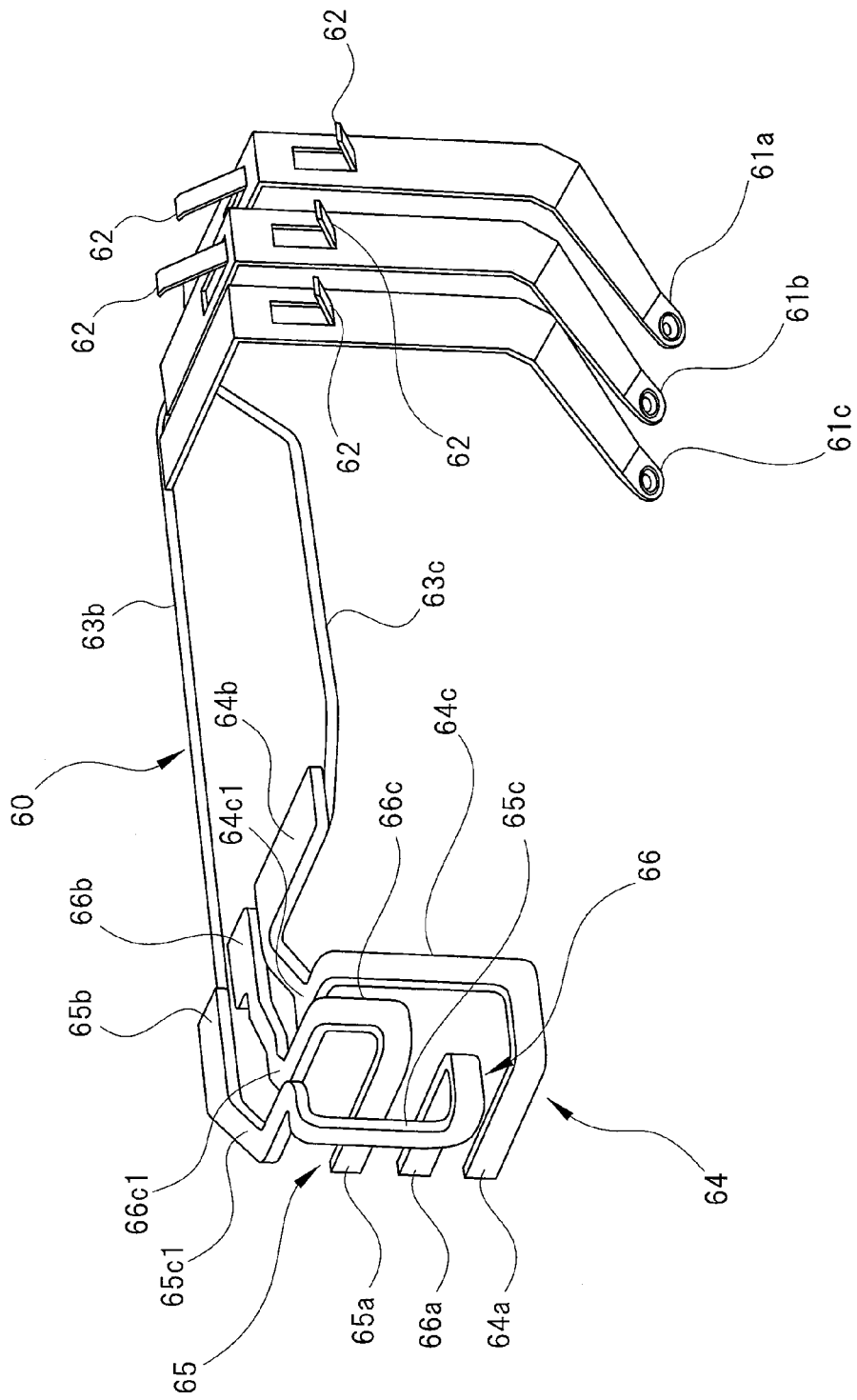
FIG. 6 is a perspective view showing positions of electrical components.

As shown in FIG. 2 to FIG. 5, the base portion 50 is formed into an approximately flat plate shape, and a circular opening portion 51 through which the armature shaft 24 (FIG. 1) is extended is provided with at an approximately central portion of the base portion 50 in a longitudinal direction of the base portion 50. Three contact plate attaching portions 52a to 52c are formed on one end side of the base portion 50 in the longitudinal direction (the right side on the sheet showing FIG. 2, and the upper sides on the sheets showing FIG. 3 to FIG. 5), and contact plates 61a to 61c are attached to the respective contact plate attaching portions 52a to 52c, respectively. The contact plate attaching portions 52b and 52c of three contact plates attaching portions 52a to 52c are formed into a groove shape, and the contact plates 61b and 61c are fitted inside these contact plate attaching portions 52b and 52c, respectively. Incidentally, as shown in FIG. 6, retaining pieces 62 are properly formed on the respective contact plates 61a to 61c. On the other hand, as shown in FIGS. 4 and 5, retaining projections 53 engaged with the retaining pieces 62 formed on the respective contact plates 61a to 61c to prevent the contact plates 61a to 61c from falling off are properly formed on the respective contact plate attaching portions 52a to 52c.

As shown in FIGS. 4 and 5, connecting spaces (welding spaces) CS1 and CS2 are provided in the contact plate attaching portions 52b and 52c, respectively. At an assembling time of the connector unit 40, electrical connections between the contact plates 61b and 61d and jumper wires 63b and 63c (FIGS. 4 and 6) are performed in the connecting spaces CS1 and CS2, respectively.

Here, the contact plates 61a to 61c are ones obtained by bending thin plates made of brass material excellent in conductivity in a predetermined shape. The shapes of the contact plates 61a to 61c are shown most clearly in FIG. 6. One end sides of the contact plates 61a to 61c constitute sliding contact arm portions coming in sliding contact with switching plates (not shown) attached to the worm wheel 33. The respective sliding contact arm portions of the contact plates 61a to 61c slide on the switching plates according to rotation of the worm wheel 33 to perform switching actions. Thereby, when a wiper switch is turned OFF, the rear wiper arm is automatically stopped on the rear window glass at a predetermined stop position.

FIG. 2 is referred to again. A connector connecting portion 70 is formed on the opposite side (a left side on the sheet showing FIG. 2, and lower sides on the sheets showing FIG. 3 to FIG. 5) to the contact plates attaching portions 52a to 52c through the opening portion 51. As shown in FIG. 3, a plug-in hole 71 in which an external connector (not shown) is plugged is provided on one side of the connector connecting portion 70. The external connector is plugged in the plug-in hole 71 from the near side of the sheet showing FIG. 3 in FIG. 3 to the depth side thereof in FIG. 3, from the right side from the left side toward the left side on the sheet showing FIG. 4 in FIG. 4, and from the left side toward the right side on the sheet showing FIG. 5 in FIG. 5. That is, the directions of arrows X shown in FIG. 2, FIGS. 4 and 5 are in the plug-in direction of the external connector to the plug-in hole 71.

Figure 7:
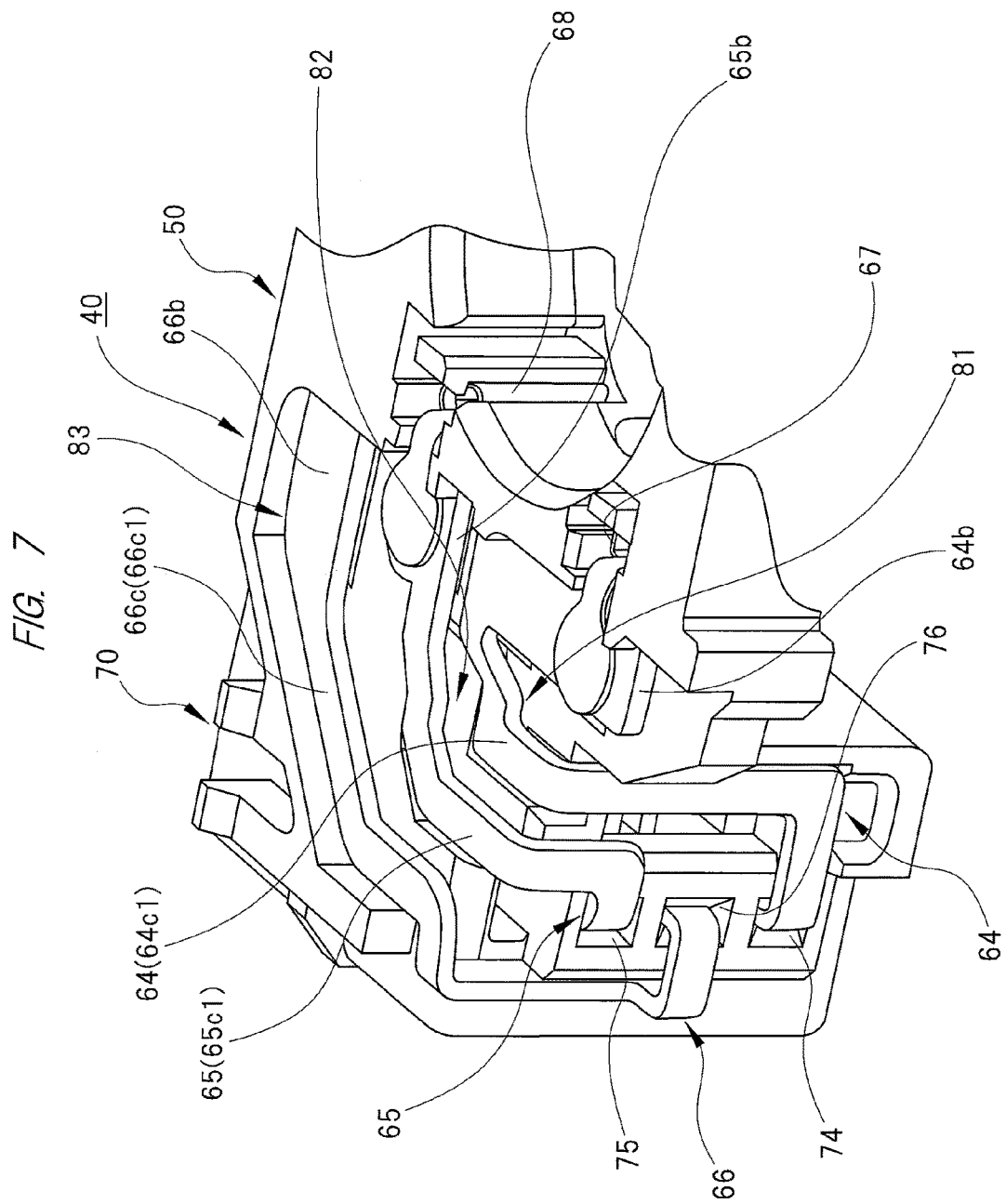
FIG. 7 is a perspective view showing an attached conductive plate.
Figure 8:
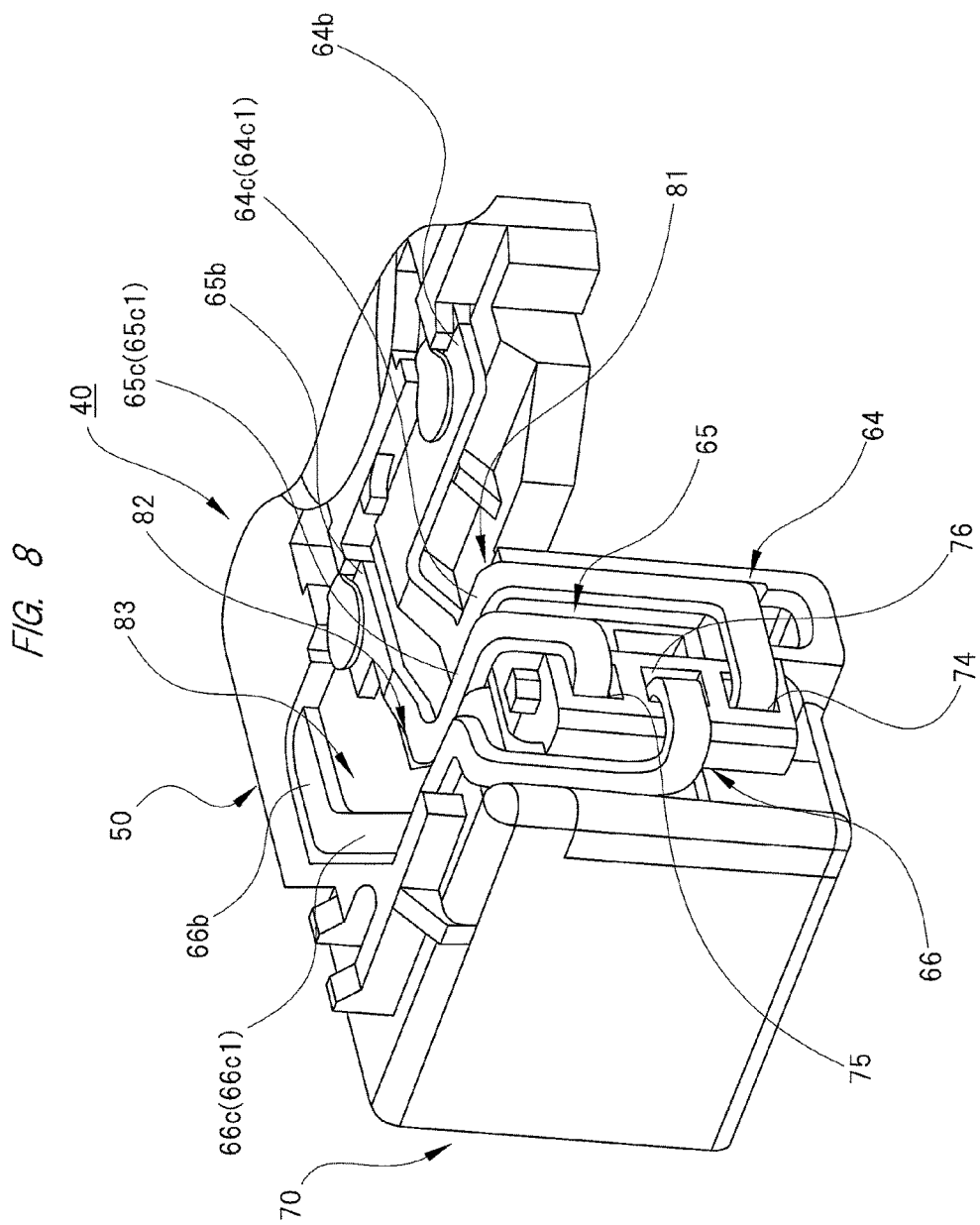
FIG. 8 is another perspective view showing the attached conductive plate.

As shown in FIGS. 7 and 8, a plurality of conductive members are arranged over the connector connecting portion 70 and the base portion 50 in the connector unit 40. Specifically, a first conductive plate 64 serving as a first conductive member, a second conductive plate 65 serving as a second conductive member, and a third conductive plate 66 serving as a third conductive member are arranged.

Figure 9:
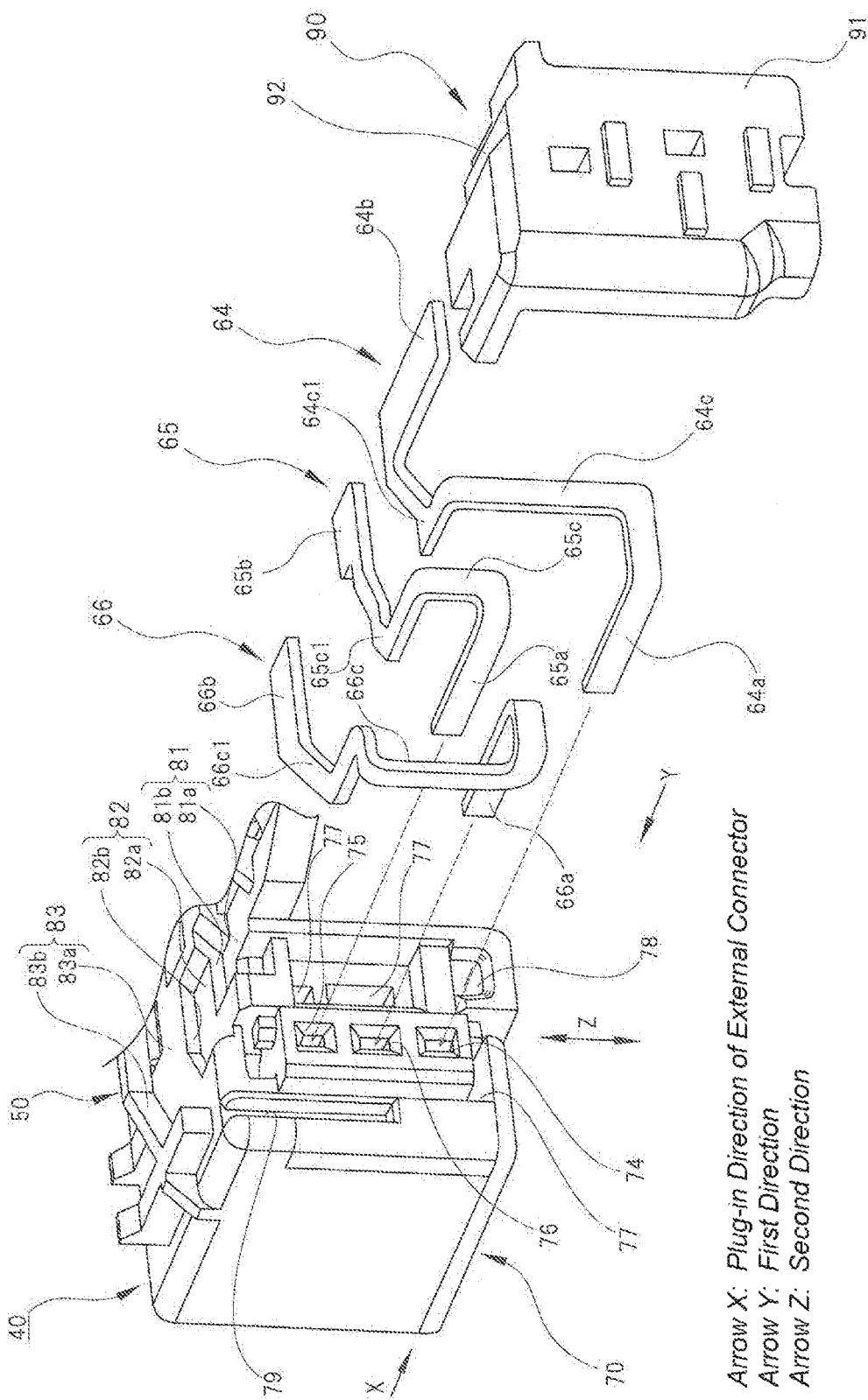
FIG. 9 is an exploded perspective view showing the attached conductive plate and a holder member.

As shown in FIG. 9, the first conductive plate 64, the second conductive plate 65, and the third conductive plate 66 are attached to the connector attaching portion 70 from a first direction (direction of arrow Y) reverse to the plug-in direction (direction of arrow X) into the plug-in hole 71 (FIG. 3) for the external connector to the connector connecting portion 70. That is, an attaching direction of three conductive plates 64, 65 and 66 to the connector connecting portion 70 is exactly opposed to the attaching direction (connecting direction) of the external connector to the connector connecting portion 70. Furthermore, all of three conductive plates 64, 65 and 66 are attached to the connector connecting portion 70 from the same direction. An attaching structure of the first conductive plate 64, the second conductive plate 65, and the third conductive plate 66 to the connector connecting portion 70 will be specifically described below.

As shown in FIGS. 3 and 9, three insertion holes 74, 75 and 76 are formed in a bottom portion of the plug-in hole 71 (FIG. 3) in which the external connector is plugged in a row along a second direction (a direction of arrow Z) crossing the first direction (the direction of arrow Y). That is, the three insertion holes 74, 75 and 76 are provided at different positions from one another in the second direction (the direction of arrow Z).

On the other hand, as shown in FIGS. 6 and 9, the respective conductive plates 64, 65, and 66 are inserted into the insertion holes 74, 75 and 76, respectively, and they have connector-side connecting portions 64a, 65a, and 66a electrically connected to the external connector plugged in the plug-in hole 71 (FIG. 3), base-side connecting portions 64b, 65b, and 66b connected to terminals or wirings provided in the base portion 50, and intermediate portions 64c, 65c, and 66c connecting the connector-side connecting portions 64a, 65a, and 66a and the base-side connecting portions 64b, 65b, and 66b with each other. Of course, the connector-side connecting portion, the base-side connecting portion, and the intermediate portion of each conductive plate 64, 65, 66 are formed in an integral manner. That is, the above discrimination is a discrimination for convenience of explanation.

As shown in FIG. 9, the connector-side connecting portion 64a of the first conductive plate 64 is inserted into the insertion hole 74 along the first direction (the direction of arrow Y) to project into the plug-in hole 71 (FIG. 3). The connector-side connecting portion 65a of the second conductive plate 65 is inserted into the insertion hole 75 along the first direction (the direction of arrow Y) to project into the plug-in hole 71 (FIG. 3). The connector-side connecting portion 66a of the second conductive plate 66 is inserted into the insertion hole 76 along the first direction (the direction of arrow Y) to project into the plug-in hole 71 (FIG. 3). Each connector-side connecting portion 64a, 65a, 66a of each conductive plate 64, 65, 66 projecting in the plug-in hole 71 comes in contact with a predetermined terminal of the external connector plugged in the plug-in hole 71, namely, connected to the connector unit 40 to be electrically connected to the predetermined terminal. Specifically, the connector-side connecting portion 64a of the first conductive plate 64 and the connector-side connecting portion 65a of the second conductive plate 65 are electrically connected to drive-line terminals of the external connector, respectively.

Furthermore, the connector-side connecting portion 66a of the third conductive plate 66 is electrically connected to a control-line terminal of the external connector. That is, the first conductive plate 64 and the second conductive plate 65 are conductive members of the drive line, while the third conductive plate 66 is a conductive member of the control line.

As shown in FIGS. 5 and 7, the base-side connecting portion 64b of the first conductive plate 64 is connected to a female-type terminal 67 which is one of terminals provided in the base portion 50, and it is electrically connected to the power-supply unit (FIG. 1) via the female-type terminal. Furthermore, as shown in FIG. 4, the base-side connecting portion 64b of the first conductive plate 64 is also connected to a jumper wire 63c which is one of the wirings provided in the base portion 50, and it is electrically connected to the contact plate 61c via the jumper wire 63c.

As shown in FIGS. 5 and 7, the base-side connecting portion 65b of the second conductive plate 65 is connected to a female-type terminal 68 which is another of the terminals provided in the base portion 50 and it is electrically connected to the power-supply unit (FIG. 1) via the female-type terminal 68.

As shown in FIG. 4, the base-side connecting portion 66b of the third conductive plate 66 is connected to a jumper wire 63b which is another of the terminal provided in the base portion 50, and it is electrically connected to the contact plate 61b via the jumper wire 63b. Incidentally, the contact plate 61a is not connected to any of the conductive plates.

The jumper wires 63b and 63c are ones obtained by bending conductive wires with a predetermined length which is circular in section so as to extend along jumper wire attaching grooves formed in the base portion 50. The jumper wire attaching groove is formed with a plurality of catching claws properly, and the jumper wires 63b and 63c attached to the jumper wire attaching grooves are held by the catching claws at plurality of portions in the longitudinal directions thereof.

As shown in FIG. 9, a first attaching portion 81, a second attaching portion 82, a third attaching portion 83 on which one portions of the intermediate portions 64c, 65c and 66c of the respective conductive plates 64, 65 and 66 are placed, respectively, are formed in a stepped fashion on a side face of the connector connecting portion 70 and a side face of the base portion 50 continuous thereon. Here, flat portions 64c1, 65c1 and 66c1 parallel to the base-side connecting portions 64b, 65b and 66b are included in the intermediate portions 64c, 65c and 66c of the respective conductive plates 64, 65 and 66, respectively (see FIG. 9 in conjunction with FIG. 6). As shown in FIGS. 7 and 8, the flat portion 64c1 of the intermediate portion 64c of the first conductive plate 64 is placed on the first attaching portion 81, the flat portion 65c1 of the intermediate portion 65c of the second conductive plate 65 is placed on the second attaching portion 82, and the flat portion 66c1 of the intermediate portion 66c of the third conductive plate 66 is placed on the third attaching portion 83, respectively.

As shown in FIG. 9, the first attaching portion 81 is composed of a first supporting face 81a on which a lower face of the flat portion 64c1 is placed, and a first positioning face 81b which rises from an edge of the first supporting face 81a and on which a side face of the flat portion 64c1 is caused to abut.

The second attaching portion 82 is composed of a second supporting face 82a on which a lower face of the flat portion 65c1 is placed, and a second positioning face 82b which rises from an edge of the second supporting face 82*a* and on which a side face of the flat portion 65*c*1 is caused to abut.

The third attaching portion 83 is composed of a third supporting face 83*a* on which a lower face of the flat portion 66*c*1 is placed, and a third positioning face 83*b* which rises from an edge of the third supporting face 83*a* and on which a side face of the flat portion 66*c*1 is caused to abut.

Here, the second supporting face 82*a* of the second attaching portion 82 extends from the edge of the first positioning face 81*b* of the first attaching portion 81 in parallel with the first supporting face 81*a*. Furthermore, the third supporting face 83*a* of the third attaching portion 83 extends from the edge of the second positioning face 82*b* of the second attaching portion 82 in parallel with the second supporting face 82*a*. That is, the first attaching portion 81, the second attaching portion 82 and the third attaching portion 83 are formed in a stepped fashion along the second direction (the direction of arrow Z).

Figure 10:
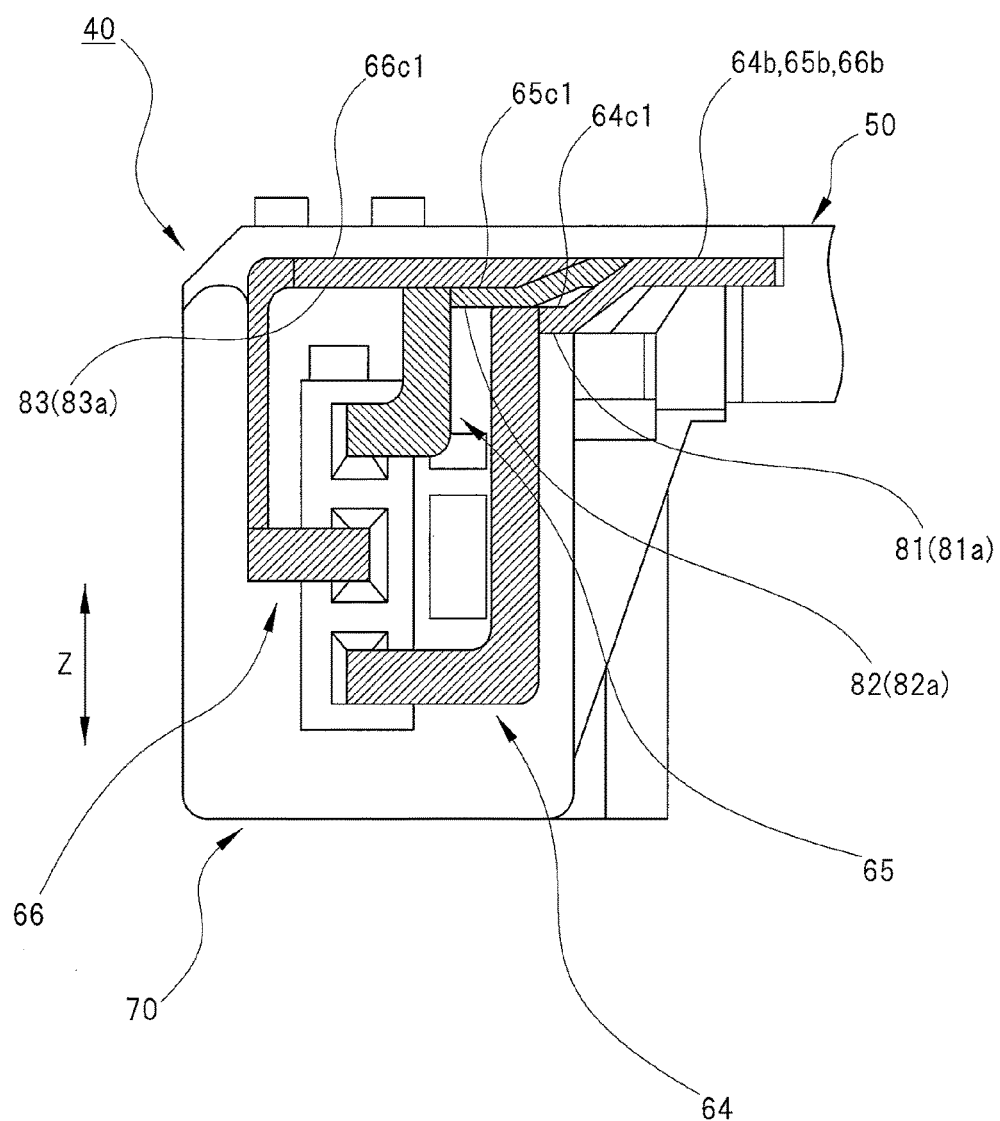
FIG. 10 is a sectional view showing the attached conductive plate.

As shown in FIG. 10, therefore, the flat portion 64*c*1 of the first conductive plate 64 placed on the first attaching portion 81 (the first supporting face 81*a*), the second portion 65*c*1 of the second conductive plate 65 placed on the second attaching portion 82 (the second supporting face 82*a*), and the flat portion 66*c*1 of the third conductive plate 66 placed on the third attaching portion 83 (the third supporting face 83*a*) are arranged at positions different from one another in the second direction (the direction of arrow Z). On the other hand, the base-side connecting portions 64*b*, 65*b* and 66*b* of the respective conductive plates 64, 65 and 66 are arranged at the same position in the second direction (the direction of arrow Z). In other words, the flat portions 64*c*1, 65*c*1 and 66*c*1 are arranged at heights different from one another on the sheet showing FIG. 10, while the base-side connecting portions 64*b*, 65*b* and 66*c* are arranged at the same height. Incidentally, in FIG. 10, hatchings are attached to the respective conductive plates 64, 65 and 66 in order to clarify boundaries of the respective conductive plates 64, 65 and 66, but these hatchings do not show sections. Furthermore, arrangement situations of the respective conductive plates 64, 65 and 66 are further clearly understood by referring to FIG. 10 in conjunction with FIGS. 7 and 8.

As shown in FIG. 2, a holder member 90 is attached to the connector connecting portion 70 of the connector unit 40. As shown in FIG. 9, the holder member 90 is attached to the connector attaching portion 70 from the first direction (the direction of arrow Y) toward a bottom portion outer face (a bottom face of the connector connecting portion 70) of the plug-in hole 71 (FIG. 3) in which the external connector is plugged. That is, the holder member 90 is attached to the connector connecting portion 70 from the same direction as the conductive plates 64, 65 and 66 toward the connector connecting portion 70. The conductive plates 64, 65 and 66 are held by the connector connecting portion 70 and the holder member 90 attached to the connector connecting portion 70 in a sandwiching fashion.

Figure 11:
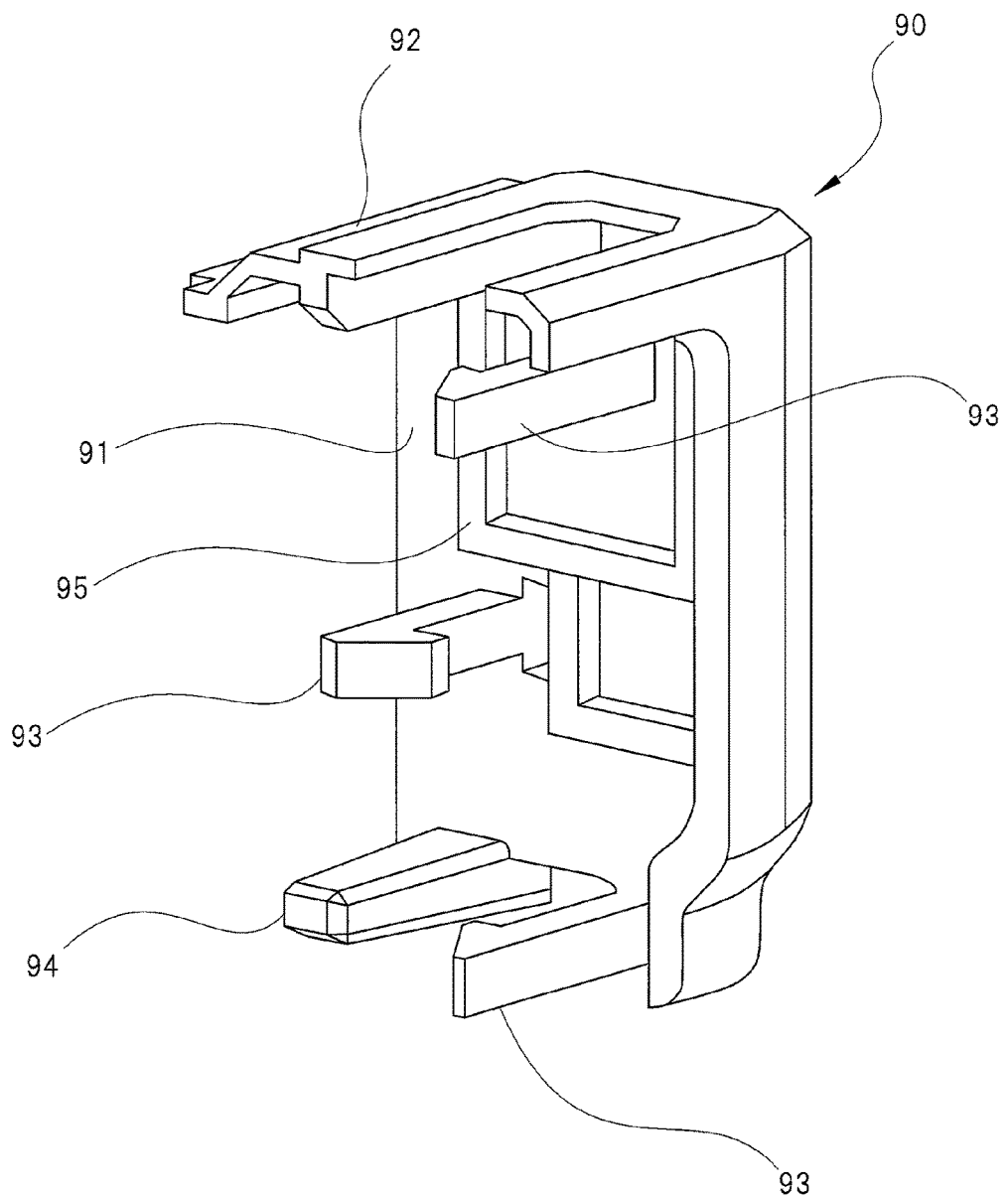
FIG. 11 is a perspective view of the holder member.

As shown in FIG. 11, the holder member 90 is provided with a main wall portion 91 facing the bottom face of the connector connecting portion 70 and a side wall portion 92 extending from one end of the main wall portion 91 in a longitudinal direction in a direction approximately orthogonal to the main wall portion 91. Three engagement claws 93 which are inserted into three engagement holes 77 (FIG. 9) provided in the bottom face of the connector connecting portion 70, respectively, are formed on an inner face of the main wall portion 91 integrally with the main wall portion 91. Furthermore, a plug-in projection 94 inserted into a through-hole 78 (FIG. 9) provided in the bottom face of the connector connecting portion 70 is formed on the inner face of the main wall portion 91 integrally with the main wall portion 91. The three engagement claws 93 penetrate predetermined through-holes 77 to advance inside the plug-in hole 71 (FIG. 3) and engage peripheries of the respective engagement holes 77. Thereby, the holder member 90 is securely fixed to an exact position on the connector connecting portion 70. As a result, the conductive plates 64, 65 and 66 held between the connector connecting portion 70 and the holder member 90 are also securely fixed to exact positions. In other words, falling-out or positional displacement of the conductive plates 64, 65 and 66 and the holder member 90 is securely prevented.

Figure 12A:
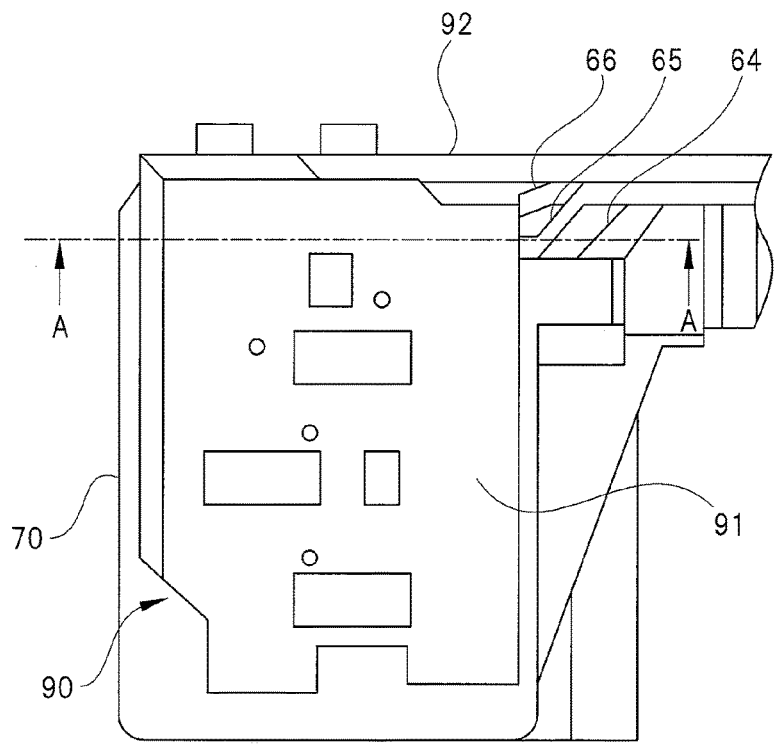
FIG. 12A is a partially-omitted bottom view of a connector unit.
Figure 12B:
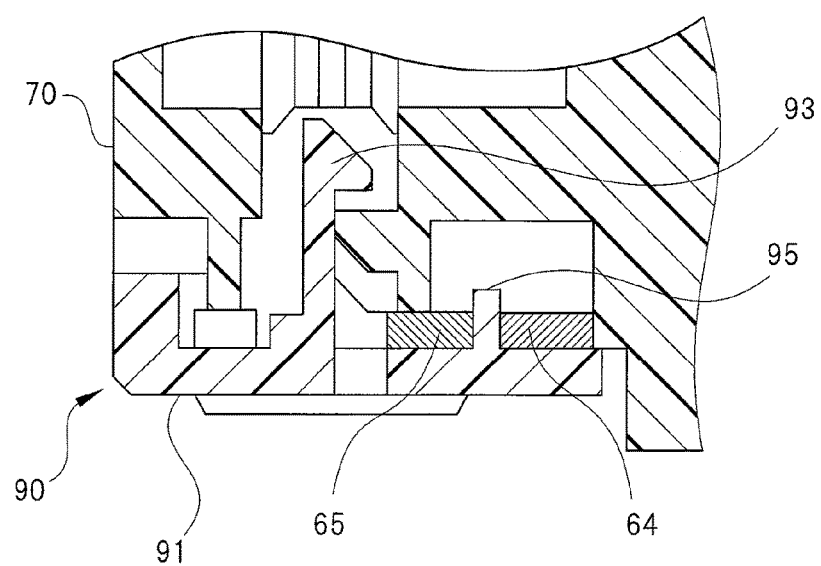
FIG. 12B is an explanatory view showing a section taken along line A-A in FIG. 12A.
Figure 13A:
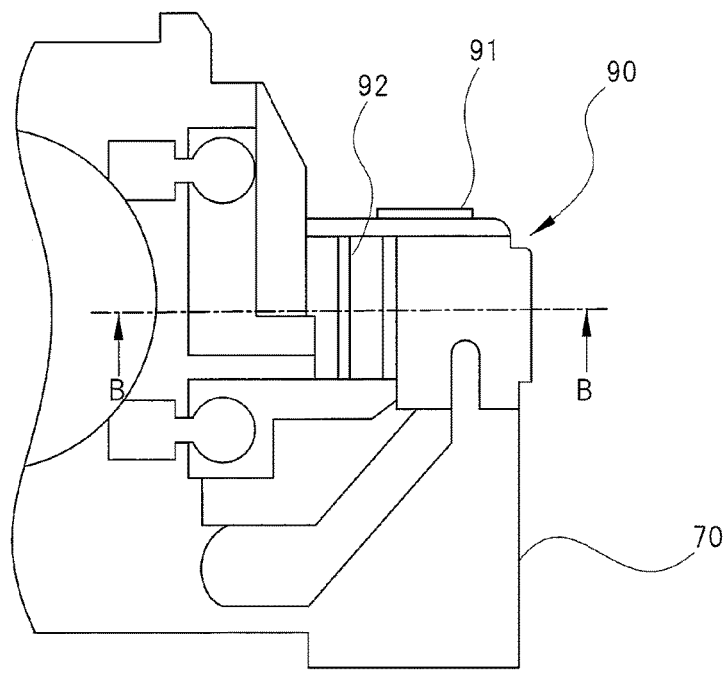
FIG. 13A is a partially-omitted side view of the connector unit.
Figure 13B:
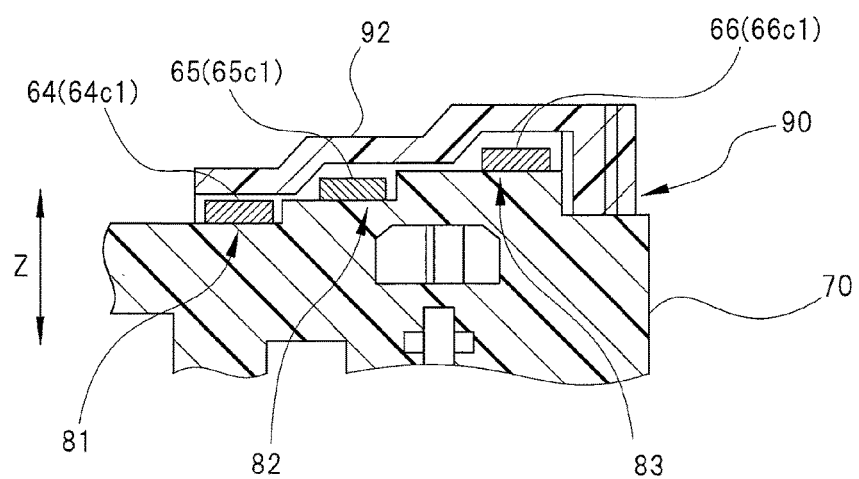
FIG. 13B is an explanatory view showing a section taken along line B-B in FIG. 13A.

Furthermore, an insulating projection 95 with a predetermined shape is integrally formed on an inner face of the main wall portion 91 of the holder member 90. As shown in FIGS. 7 and 8, when the holder member 90 is attached to the connector connecting portion 70 which has been attached with the conductive plates 64, 65 and 66, the insulating projection 95 provided on the holder member 90 advances between the first conductive plate 64 and the second conductive plate 65 adjacent to each other to be interposed therebetween, as shown in FIGS. 12(*a*) and 12(*b*). Thereby, insulation between the first conductive plate 64 and the second conductive plate 65 is secured more securely. Furthermore, as shown in FIGS. 13(*a*) and 13(*b*), the side wall portion 92 of the holder member 90 is formed in a stepped fashion corresponding to the first attaching portion 81, the second attaching portion 82 and the third attaching portion 83 formed in the stepped fashion. Thereby, since the side wall portion 92 of the holder member 90 is arranged along the flat portion 64*c*1 of the first conductive plate 64, the flat portion 65*c*1 of the second conductive plate 65, and the flat portion 66*c*1 of the third conductive portion 66 arranged at the different positions from each other in the second direction (the direction of arrow Z), respectively, insulation between the conductive plates adjacent to each other is secured more securely.

Next, an attaching step to the first conductive plate 64, the second conductive plate 65 and the third conductive plate 66 to the connector connecting portion 70 of the manufacturing steps of the wiper motor 10 having the above structure will be described. As described above, all of the first conductive plate 64, the second conductive plate 65 and the third conductive plate 66 are attached to the connector connecting portion 70 from the same direction (the first direction/the direction of arrow Y) toward the connector connecting portion 70 (see FIG. 9). Furthermore, the respective base-side connecting portions 64*b*, 65*b* and 66*b* of the first conductive plate 64, the second conductive plate 65 and the third conductive plate 66 are arranged at the same position to one another in the second direction (the direction of arrow Z) orthogonal to the first direction (the direction of arrow Y) in a state where these conductive plates 64, 65 and 66 have been attached to the connector connecting portion 70. Thereby, the three conductive plates 64, 65 and 66 are attached to the connector connecting portion 70 in the order from the conductive plate arranged in the deepest position. That is, as shown in FIG. 9, the third conductive plate 66 is first attached, and the second conductive plate 65 and the first conductive plate 64 are then performed in this order. Specifically, the connector-side connecting portion 66*a* of the third conductive plate 66 is inserted into the insertion hole 76 provided in the connector connecting portion 70. At this time, the connector-side connecting portion 66*a* of the third conductive plate 66 is inserted into the insertion hole 76 until a portion (the flat portion 66*c*1) of the intermediate portion 66c abuts on the third positioning face 83b of the third attaching portion 83. That is, positioning of the third conductive plate 66 is performed by the third positioning face 83b of the third attaching portion 83. Incidentally, another portion of the intermediate portion 66c of the third conductive plate 66 is fitted in the holding groove 79 formed along an arrangement direction of the insertion holes 74, 75 and 76.

Next, the connector-side connecting portion 65a of the second conductive plate 65 is inserted into the insertion hole 75 provided in the connector connecting portion 70. At this time, the connector-side connecting portion 65a of the second conductive plate 65 is inserted into the insertion hole 75 until a portion (the flat portion 65c1) of the intermediate portion 65c abuts on the second positioning face 82b of the second attaching portion 82. That is, positioning of the second conductive plate 65 is performed by the second positioning face 82b of the second attaching portion 82.

Thereafter, the connector-side connecting portion 64a of the first conductive plate 64 is inserted into the insertion hole 74 provided in the connector connecting portion 70. At this time, the connector-side connecting portion 64a of the first conductive plate 64 is inserted into the insertion hole 74 until a portion (the flat portion 64c1) of the intermediate portion 64c abuts on the first positioning face 81b of the first attaching portion 81. That is, positioning of the first conductive plate 64 is performed by the first positioning face 81b of the first attaching portion 81.

As described above, by attaching the first conductive plate 64, the second conductive plate 65 and the third conductive plate 66 in a predetermined order, all of the conductive plates 64, 65 and 66 are attached to the connector connecting portion 70 in the same direction (the first direction/the direction of arrow Y). That is, since all of the plurality of conductive plates 64, 65 and 66 bent in a three-dimensional fashion are attached to the connector connecting portion 70 without utilizing insert molding and all of the plurality of conductive plates 64, 65 and 66 are attached to the connector connecting portion 70 from the same direction, the attaching step (assembling step) of the conductive plates 64, 65 and 66 is simplified. Furthermore, since the positioning faces 81b, 82b and 83b corresponding to the respective conductive plates 64, 65 and 66 are prepared, respectively, assemblability of the conductive plates 64, 65 and 66 is improved.

The holder member 90 is attached to the connector connecting portion 70 which has been attached with the conductive plates 64, 65 and 66 in the above manner. The holder member 90 is attached to the connector connecting portion 70 from the same direction as the attaching direction of the conductive plates 64, 65 and 66 to the connector connecting portion 70, namely, the first direction (the direction of arrow Y) toward the connector connecting portion 70. That is, all of the plurality of conductive plates 64, 65 and 66 and the holder member 90 are attached to the connector attaching portion 70 from the same direction. Therefore, the attaching step (assembling step) of the conductive plates 64, 65 and 66 and the holder member 90 to the connector connecting portion 70 is simplified, which results in realization of simplification of the manufacturing steps of the wiper motor 10, size reduction of the wiper motor 10, and the like. Furthermore, since attaching directions of the plurality of conductive plates 64, 65 and 66 and the holder member 90 are the same, automation of the assembling steps of the conductive plates 64, 65 and 66 and the holder member 90 becomes easy.

The present invention is not limited to the above embodiment, but it can be variously modified without departing from the scope of the present invention. For example, in the above embodiment, since the connector unit accommodating portion in which the connector unit is accommodated is provided in the gear case, but the connector unit accommodating portion may be provided at the opening end of the yoke and the connector unit, and accommodated in the connector unit accommodating portion.

Furthermore, the number of conductive members is not limited to three, but a necessary number of conductive members can be provided according to the specification of the motor apparatus (functions). When the number of conductive members is increased, the number of insertion holes and the number of attaching portions, provided in the connector connecting portion, are also increased properly in response to the number of conductive members.

The present invention can be applied to not only the rear wiper but also a drive source of a front wiper apparatus of a vehicle or a drive source of another apparatus other than the wiper apparatus.

Second Embodiment

Hereinafter, a second embodiment of the present invention will be described in detail with reference to the drawings.

Figure 14:
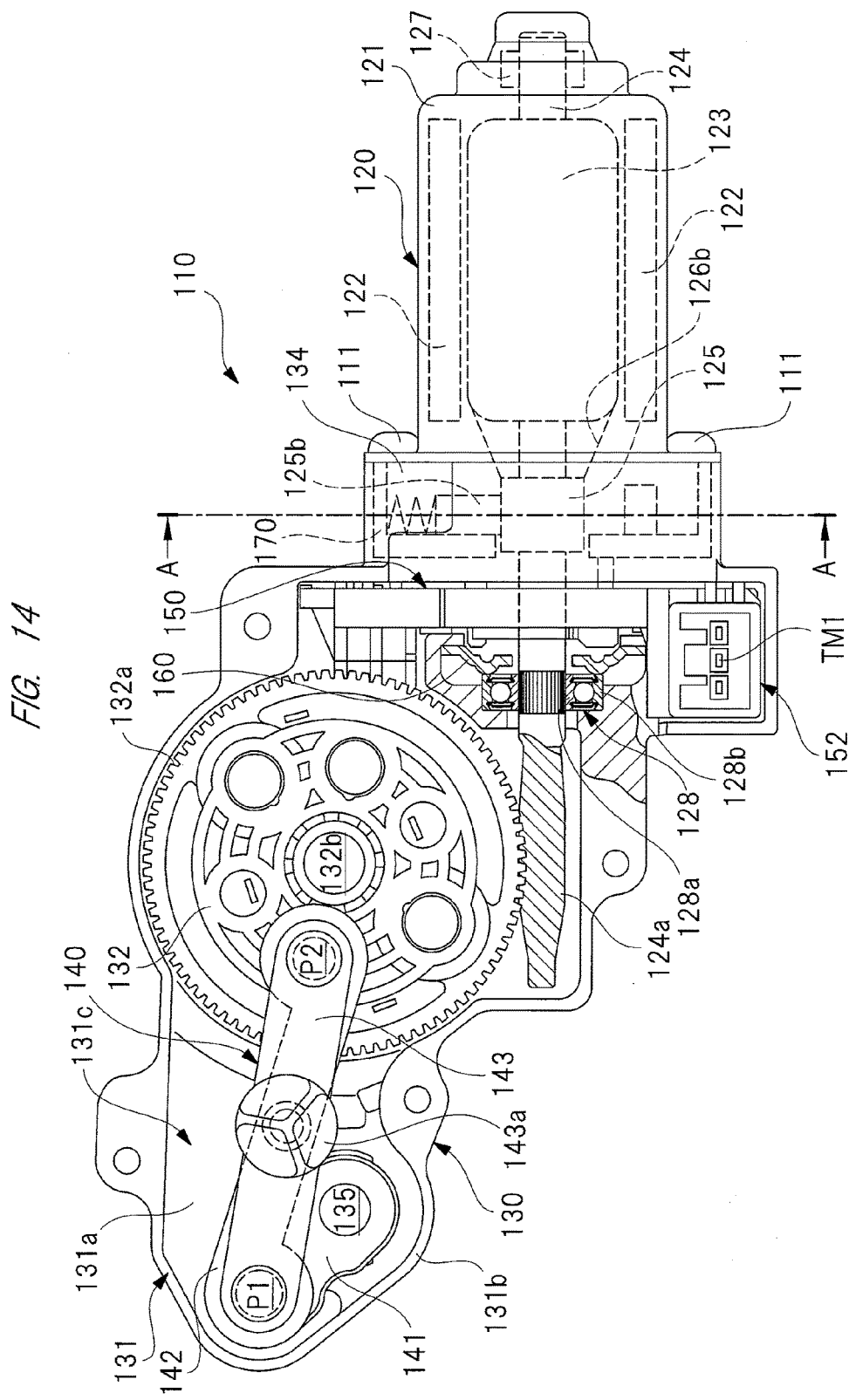
FIG. 14 is a plan view of a wiper motor according to a second embodiment.
Figure 15:
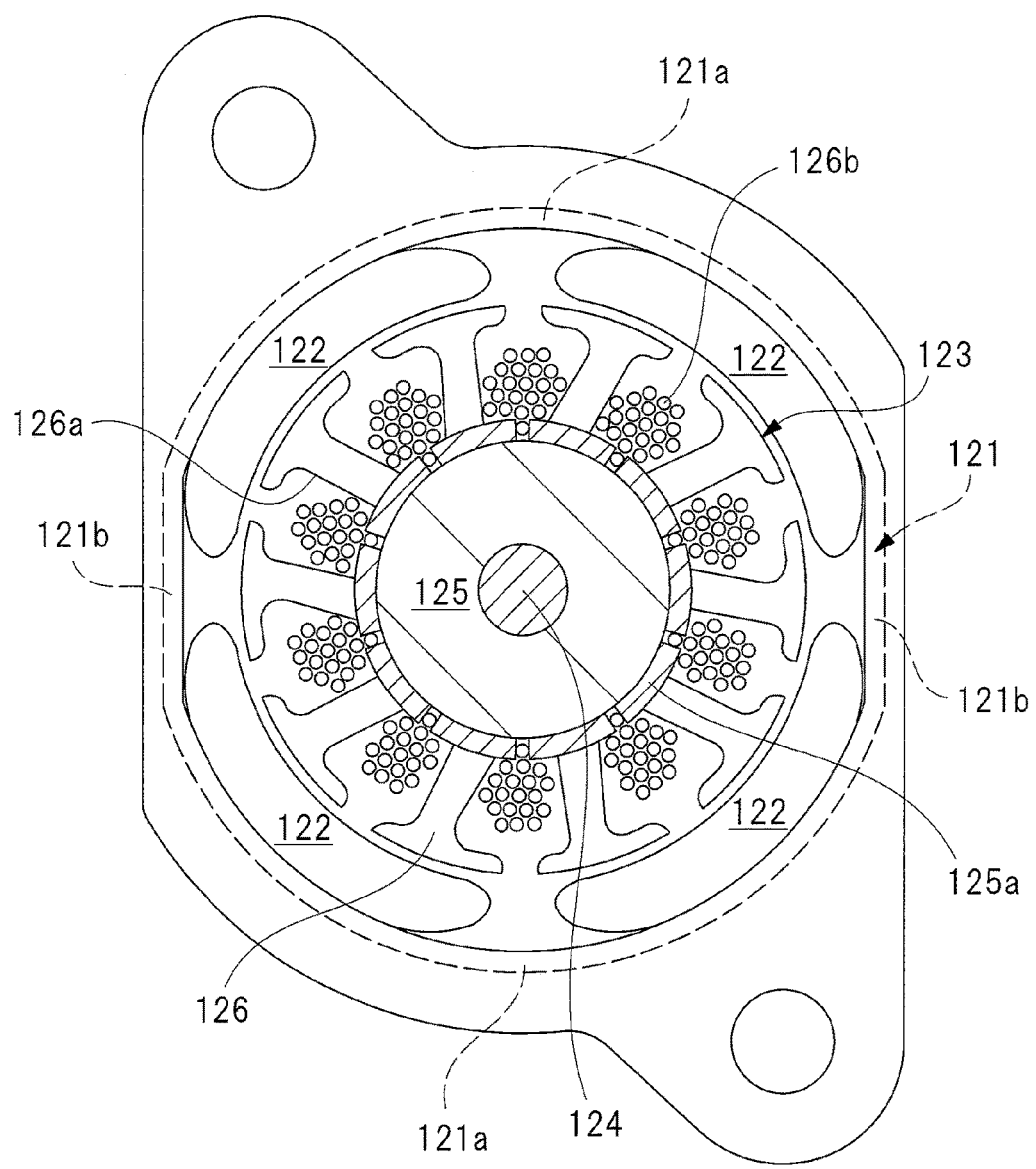
FIG. 15 is a partially-sectional view taken along line A-A in FIG. 14.
Figure 16:
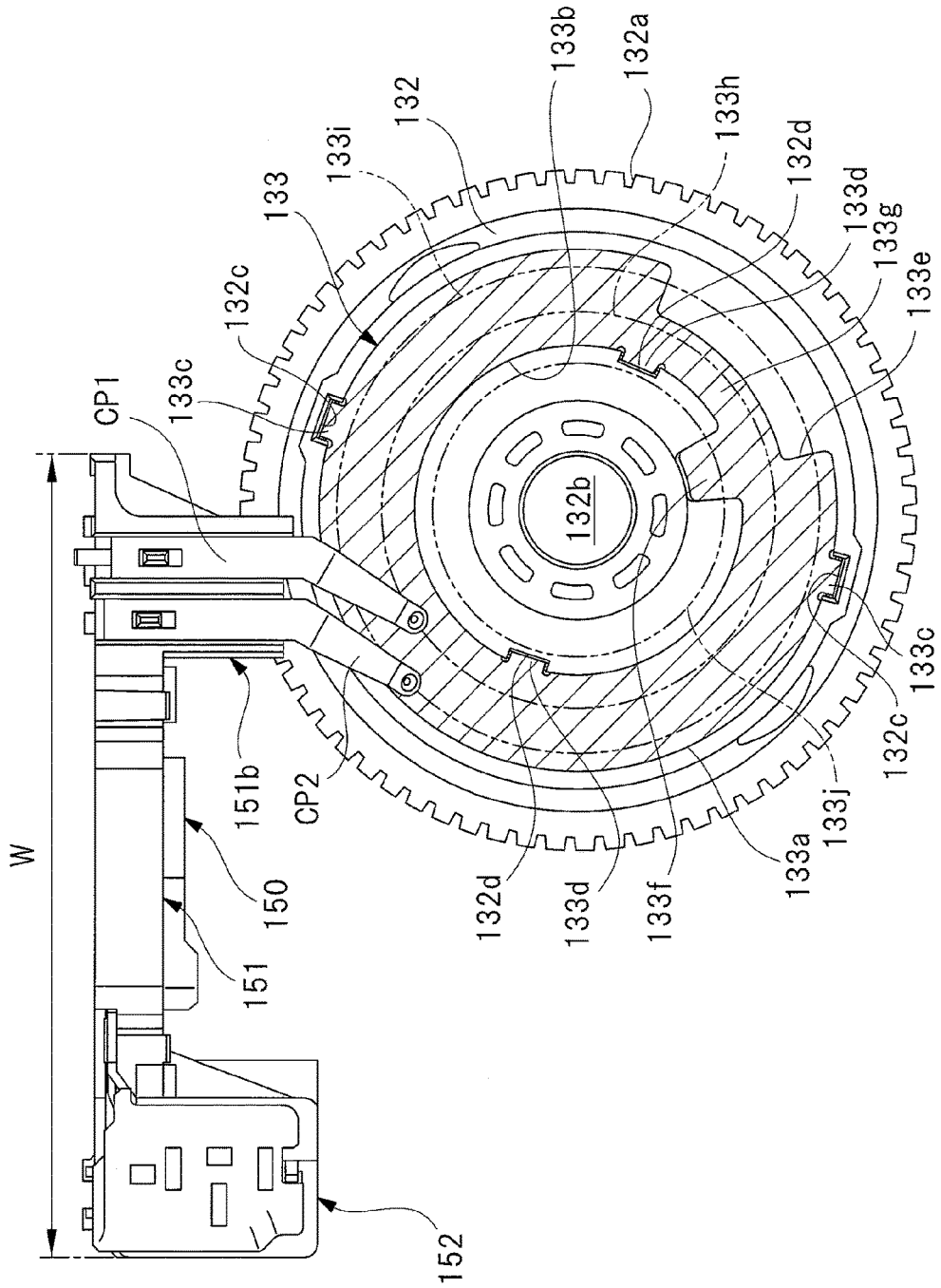
FIG. 16 is a view of a connector unit and a worm wheel as viewed from a back side in FIG. 14.
Figure 17:
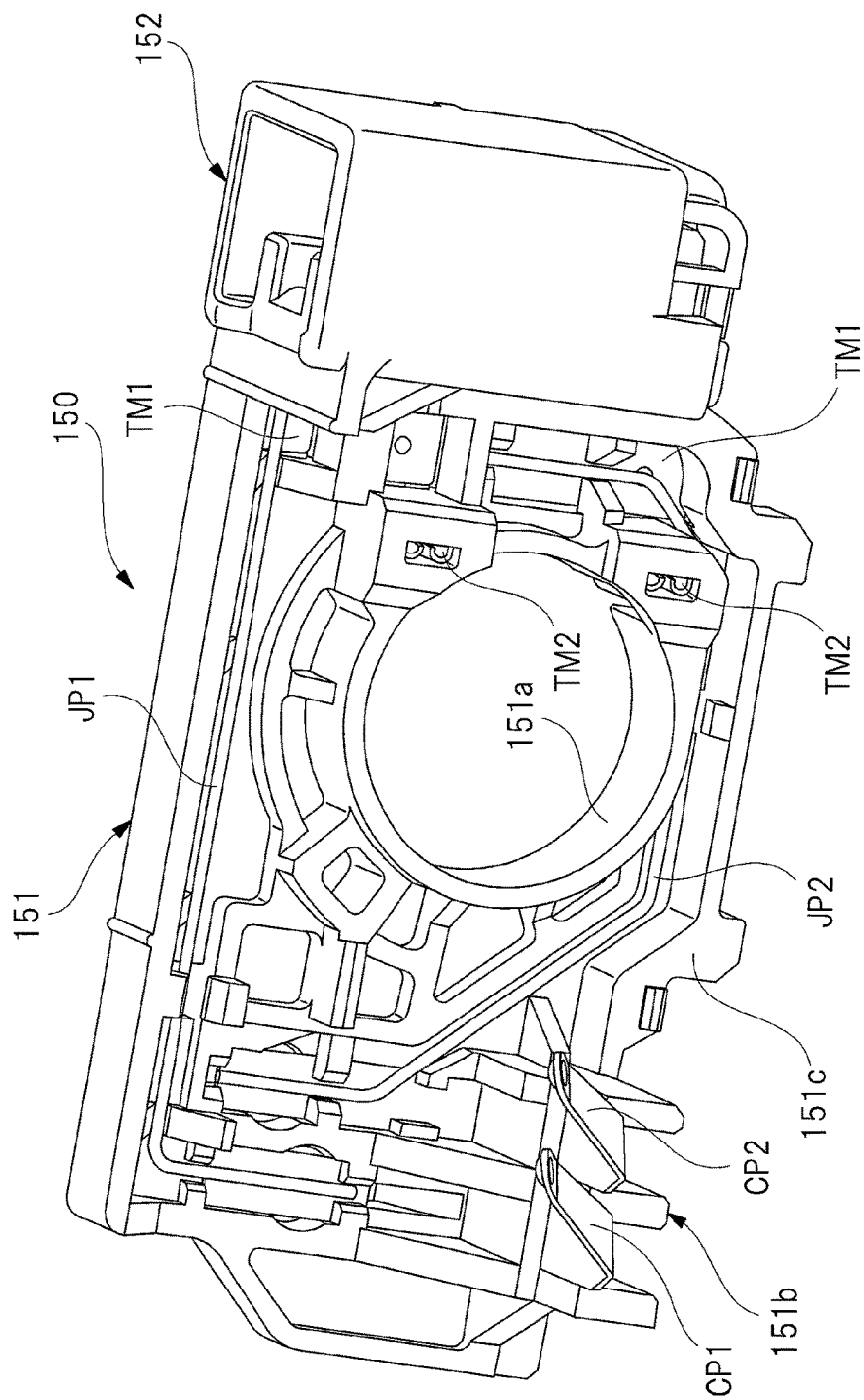
FIG. 17 is a perspective view of the connector unit as viewed from the side of a reduction gear mechanism section.

FIG. 14 shows a plan view of a wiper motor according to the second embodiment, FIG. 15 shows a partially-sectional view taken along line A-A in FIG. 14, FIG. 16 is a view of a connector unit and a worm wheel as viewed from the back side of FIG. 14, FIG. 17 shows a perspective view of the connector unit as viewed from the side of a reduction gear mechanism, and FIG. 18 shows a partially-enlarged view of comparison of a switching plate of the second embodiment and a switching plate of a comparative example.

As shown in FIG. 14, a wiper apparatus 110 as motor apparatus is used as a drive source of a rear wiper apparatus (not shown) mounted on a rear hatch of a vehicle, and provided with a motor section 120 and a reduction gear mechanism section 130. The motor section 120 and the reduction gear mechanism section 130 are integrally coupled to each other by a pair of fastening screws 111. The wiper motor 110 is arranged in a narrow space such as a rear hatch, and configured to cause a wiper blade (not shown) provided on a rear glass (not shown) to perform a reciprocating wiping action (swinging drive) within a predetermined angular range.

As shown in FIGS. 14 and 15, the motor section 120 is constituted as a four-pole motor with brush. The motor section 120 is provided with a motor case 121 and the motor case 121 is formed into a bottomed cylindrical shape by performing deep drawing work to a steel plate which is a magnetic body. The motor case 121 is provided with a pair of arc-shaped portions 121a and a pair of straight portions 121b, and the respective arc-shaped portions 121a and the respective straight portions 121b are arranged so as to face each other via a shaft center (an armature shaft 124) of the motor case 121, respectively. Thereby, a cross-sectional shape of the motor case 121 is formed into an approximately oval shape. Therefore, thinning can be achieved by saving a widthwise size of the motor case 121, namely, a thickness size in a crosswise direction in FIG. 15.

The respective arc-shaped portions 121a and the respective straight portions 121b extend from an opening portion side of the motor case 121 to a bottom portion side thereof. Thereby, the motor case 121 is formed into a straight shape which does not include any stepped portion, which results in improvement of ease of the deep drawing work of the motor case 121. Furthermore, as shown in FIG. 14, since a brush holder 170 does not enter the opening portion side of the motor case 121, a length of the motor case 121 in an axial direction is also suppressed. Thus, the motor case 121 is formed into an advantageous shape regarding improvement of moldability, and size reduction and weight reduction.

A total of four magnets 122 formed into an approximately arc shape in section are attached inside the motor case 121. The respective magnets 122 are ferrite magnets, for example, and they are fixed along a circumferential direction of the motor case 121 at equal intervals (at intervals of 90 degrees) and an armature 123 is rotatably accommodated in the respective magnets 122 with a predetermined gap. A base end side of an armature shaft (rotation shaft) 124 penetrates a rotation center of the armature 123 to be fixed thereto.

A commutator 125 is fixed to an approximately central portion of the armature shaft 124 along an axial direction thereof, and the commutator 125 is provided with ten segments 125a. Furthermore, an armature core 126 forming the armature 123 is fixed on the side of a base end of the armature shaft 124, and the armature core 126 is provided with ten teeth 126a. Slots are formed among the respective teeth 126a. A plurality of armature coils 126a is wound on the respective teeth 126a by a predetermining winding method with a predetermined number of turns. Coil ends of the armature coils 126b are respectively electrically connected to the segments 125a.

A plurality of current-feeding brushes 125b (only one is shown in FIG. 14) comes in sliding contact with each segment 125a of the commutator 125. Each power-supply brush 125b is movably provided on the brush holder 170 accommodated in the brush holder accommodating portion 134 of the housing 131. Driving current from the connector unit 150 is supplied to each power-supply brush 125b. Thus, the motor section 120 and the connector unit 150 are electrically connected via each power-supply brush 125b, the commutator 125 and the armature coil 126b, so that electromagnetic force is generated in the armature coil 126b and the armature 123 (the armature shaft 124) is rotated. Incidentally, in FIG. 15, illustration of each power-supply brush 125b and the brush holder 170 is omitted for convenience of explanation.

The base end side of the armature shaft 124 is rotatably accommodated in the motor case 121, and it is supported by only a radial bearing 127 provided on the bottom portion side of the motor case 121. A thrust bearing supporting the armature shaft 124 from its axial direction is not provided between the base end side of the armature shaft 124 and the motor case 121. Here, the radial bearing 127 is formed into an approximately cylindrical shape from, for example, a sintered material, so that the radial bearing 127 is provided with low noise, impact resistance, and self-lubrication and it is hard to generate friction powder. However, the radial bearing 127 may also be formed of a plastic material excellent in heat resistance or the like instead of the sintered material.

A worm gear 124a (not shown in detail) is integrally provided at a distal end side of the armature shaft 124, and the worm gear 124a is rotated within the housing 131 according to rotation of the armature shaft 124. The worm gear 124a is formed into a spiral shape, and it is caused to mesh with gear teeth 132a of the worm wheel 132. Here, the worm gear 124a and the worm wheel 132 constitute a reduction gear mechanism in the present invention. The worm wheel 132 is rotated in a state speed-reduced from rotation speed of the worm gear 124a according to rotation of the worm gear 124a to reduce rotation speed and output rotation with elevated torque to the output.

An inner wheel member 128a of a ball bearing 128 is fixed between the armature 123 and the worm gear 124a of the armature shaft 124 by press-fitting. Furthermore, an outer wheel member 128b of the ball bearing 128 is held between the housing 131 and a stopper plate 160. Thereby, the armature shaft 124 is rotatably supported by the ball bearing 128 and it is restricted regarding movements in an axial direction and in a radial direction thereof to the housing 131. Thus, the ball bearing 128 is provided with functions serving as a radial bearing and as a thrust bearing. Therefore, a thrust bearing supporting the armature shaft 124 from the axial direction of the armature shaft 124 is not also provided between the distal end side of the armature shaft 124 and the housing 131.

Here, since the wiper motor 110 is constituted as a four-pole motor size-reduced and weight-reduced, for example, it is more in calorific value than a large-sized two-pole motor having the same output as the wiper motor 110. However, since no thrust bearing is provided on both end sides of the armature shaft 124 in the axial direction, sliding loss of the armature shaft 124, namely, frictional resistance between the armature shaft 124 and the thrust bearing is correspondingly removed, so that increase in excessive calorific value is prevented.

As shown in FIG. 14, the reduction gear mechanism section 130 is provided with a housing 131 formed into an approximately bathtub shape by casting molten aluminum material or the like. The housing 131 is provided with a bottom portion 131a and a wall portion 131b, where an opposite side to the bottom portion 131a is formed as an opening portion 131c. The opening portion 131c is closed by a gear cover (not shown) and the worm wheel 132, the connector unit 150, and the like are accommodated within the housing 131 from the opening portion 131c.

A bush holder accommodating portion 134 is integrally provided on the side of the motor portion 120 of the housing 131. The bush holder accommodating portion 134 is formed into a cylindrical shape so as to extend along the axial direction of the armature shaft 124, a cross-sectional shape thereof is formed into an approximately oval shape like the cross-sectional shape of the motor case 121 (see FIG. 15). Thereby, thinning of the brush holder accommodating portion 134 is also achieved in the brush holder accommodating portion 134 by saving a widthwise size of the brush holder accommodating portion 134, namely, a thickness size thereof in a depth direction in FIG. 14.

A worm wheel (a rotating body) 132 shown in FIG. 16 is rotatably provided within the housing 131, and the worm wheel 132 is formed into an approximately disc shape by injection-molding resin material such as plastic. Gear teeth 132a is integrally provided on an outer circumferential portion of the worm wheel 132, and a worm gear 124a (see FIG. 14) is caused to mesh with the gear teeth 132a.

One end side of a wheel shaft 132b composed of a steel rod circular in section in an axial direction thereof is fixed to a rotation center of the worm wheel 132, and the other end side of the wheel shaft 132b is pivotally supported by a boss portion (not shown) provided on the bottom portion 131a of the housing 131.

A pair of outer circumferential side engagement holes 132c facing each other so as to sandwich the wheel shaft 132b are provided on the worm wheel 132 nearer to the gear teeth 132a than the wheel shaft 132b. Furthermore, a pair of inner circumferential side engagement holes 132d facing each other so as to sandwich the wheel shaft 132b is provided on the worm wheel 132 nearer to the wheel shaft 132b than the gear teeth 132a. The respective outer circumferential side engagement holes 132c and the respective inner circumferential side engagement holes 132d are arranged at positions rotated relative to each other about the axial center of the wheel shaft 132b by about an angle of 90 degrees.

Respective fixing claws 133c and 133d for fixing the switching plate 133 to the worm wheel 132 are inserted into respective engagement holes 132c and 132d to be attached thereto. Thereby, the outer circumferential portion 133a and the inner circumferential portion 133b of the switching plate 133 can be firmly fixed to the worm wheel 132 without causing chattering.

A switching plate (a conductive plate) composed of a steel plate having conductivity is provided on the side of the bottom portion 131a of the worm wheel 132, as shown by a slanted line portion in FIG. 16. The switching plate 33 is formed of brass excellent in conductivity or the like, and it is formed in an approximately annular shape by performing press work (punching or the like).

Outer circumferential side fixing claws (fixing claws) 133c and inner circumferential side fixing claws (fixing claws) 133d bent at an approximately right angle in a plate thickness direction of the switching plate 133 are provided by twos on the outer circumferential portion 133a and the inner circumferential portion 133b of the switching plate 133, respectively. The respective fixing claws 133c and the respective fixing claws 133d are provided corresponding to the respective engagement holes 132c and the respective engagement holes 132d. That is, the respective outer circumferential side fixing claws 133c and the respective inner circumferential side fixing claws 133d are arranged at positions rotated relative to each other about the axial center of the wheel shaft 132b by about an angle of 90 degrees.

A recessed portion 133e recessed inwardly in a diametrical direction of the switching plate 133 is provided at one portion of the outer circumferential portion 133a of the switching plate 133. Furthermore, a projection portion 133f projecting inwardly in a diametrical direction of the switching plate 133 is provided at one portion of the inner circumferential portion 133b of the switching plate 133. Furthermore, an annular plate main body 133g which is not provided with a projection and a recess is provided between the outer circumferential portion 133a and the inner circumferential portion 133b along the diametrical direction of the switching plate 133.

A first sliding contact portion 133h, a second sliding contact portion 133i and a third sliding contact portion 133j (two-dot chain lines in FIG. 16) extending in the circumferential direction of the switching plate 133 are formed at a portion corresponding to the plate main body 133g of the switching plate 133, a portion corresponding to the recessed portion 133e, and a portion corresponding to the projection portion 133f, respectively. Distal end portions of a first contact plate CP1 and a second contact plate CP2 provided on the contact unit 150 come in sliding contact with the first sliding contact portion 133h and the second sliding contact portion 133i according to rotation of the worm wheel 132, respectively.

Here, in this embodiment, no member comes in sliding contact with the third sliding contact portion 133j. That is, this embodiment has a structure which is not provided with a function of performing braking by generating counter electromotive force in the motor section 120. However, since the embodiment has the third sliding contact portion 133j corresponding to the projection portion 133f, when a braking function based upon the counter electromotive force is required, such a requirement can be easily satisfied by only replacing the connector unit with another connector unit capable of exhibiting the function, namely, a contact plate provided with first to third contact plates. Thus, in the wiper motor 110, common uses of constituent parts can be achieved and cost reduction is realized. Incidentally, as an electrical circuit exhibiting the braking function based upon the counter electromotive force, an electrical circuit (not shown) configured such that a closed loop circuit is formed in response to a rotation position of the worm wheel 132 is used.

Thus, by providing the first contact plate CP1 coming in sliding contact with the first sliding contact portion 133h to be always connected to the switching plate 133 and the second contact plate CP2 coming in sliding contact with the second sliding contact portion 133i to be disconnected from the switching plate 133 by the recessed portion 133e, conduction states and non-conduction states of the respective contact plates CP1 and CP2 are fed to a vehicle-mounted controller (not shown) via the connector 150. Thereby, the vehicle-mounted controller detects that a wiper switch (not shown) has been turned off by a driver and that the respective contact plates CP1 and CP2 have been changed to non-conduction states (the second contact plate CP2 has reached the recessed portion 133e), thereby stopping supply of driving current to the motor section 20. Thereby, the wiper blade can be stopped at a predetermined position.

As shown in FIG. 14, an output shaft 135 composed of a steel rod circular in section is accommodated in a portion (the left side in FIG. 14) of the housing 131 separated from the worm wheel 132. The output shaft 135 is pivotally supported by a boss portion (not shown) provided on a bottom portion 131a of the housing 131. A base end portion of the wiper blade is fixed to an extension portion (not shown) of the output shaft 135 extending outside.

A motion converting mechanism 140 for converting a rotation motion of the worm wheel 132 to a swinging motion of the output shaft 135 is provided between the base end side of the output shaft 135 and the worm wheel 132 within the housing 131. The motion converting mechanism 140 is provided with a swinging link 141, a coupling plate 142 and a sliding contact plate 143.

The swinging link 141 is formed into a plate shape by punching a steel plate or the like, one end side of the swinging link 141 in an longitudinal direction thereof is fixed to the base end side of the output shaft 135. On the other hand, the other end side of the swinging link 141 in the longitudinal direction is pivotally coupled to one end side of the coupling plate 142 in the longitudinal direction via a first coupling pin P1. The other end side of the coupling plate 142 in the longitudinal direction is pivotally coupled at a position on the worm wheel 132 deviated from the rotation center of the worm wheel 132 via a second coupling pin P2. Here, a length size of the swinging link 141 is set to a length size of approximately half (approximately ½) of a length size of the coupling plate 142. Furthermore, the coupling plate 142 is also formed into a plate shape by punching a steel plate or the like in the same manner as the swinging link 141.

Thus, by providing the motion converting mechanism between the output shaft 135 and the worm wheel 132, the output shaft 135 can be swung in a predetermined angular range according to rotation of the worm wheel 132 in one direction. Specifically, a rotation force reduced in speed and having raised torque is transmitted to the second coupling pin P2 and the second coupling pin P2 is rotated about the wheel shaft 132b. Thereby, the other end side of the coupling plate 142 in the longitudinal direction is also rotated about the wheel shaft 132b, so that the one end side of the coupling plate 142 in the longitudinal direction is swung about the output shaft 135 in a state where it has been restricted by the swinging link 141 via the first coupling pin P1.

The sliding contact plate 143 is formed into a plate shape from resin material such as plastic excellent in self-lubricity, and it is attached to the gear cover side (on the near side in FIG. 14) of the coupling plate 142. A sliding contact portion 143a coming in sliding contact with the gear cover is integrally provided at a central portion of the sliding contact plate 143 in the longitudinal direction, and grease (not shown) is applied to the sliding contact portion 143a. Thereby, motion of the motion converting mechanism 140 within the housing 131 is made smooth and the motion converting mechanism 140 is prevented from chattering along the axial direction (the depth direction in FIG. 14) of the output shaft 135.

As shown in FIG. 17, the connector unit 150 is formed into a predetermined shape by injection-molding resin material such as plastic and it is provided with a connector main body 151 formed into a plate shape and a connector connecting portion 152 formed into a box shape having a bottom.

The connector unit 150 is provided so as to stride over the armature shaft 124, and a through cylindrical portion 151a extending through the armature shaft 124 (see FIG. 14) is formed at an approximately central portion of the connector main body 151. An inner diametrical size of the through cylindrical portion 151a is set to a size slightly larger than an outer diametrical size of the ball bearing 128 (see FIG. 14). Thereby, at an assembling time of the wiper motor 110, the armature shaft 124 provided with the ball bearing 128 can pass through the connector main body 151.

A connector connecting portion 152 is arranged on one side of the connector main body 151 regarding armature shaft 124 (the right side in FIG. 17). On the other hand, a contact plate supporting portion 151b is integrally provided on the other side of the connector main body 151 regarding the armature shaft 124 (the left side in FIG. 17), and the contact plate supporting portion 151b is protruded from a surface 151c of the connector main body 151 in the axial direction of the armature shaft 124.

A first contact plate CP1 and a second contact plate CP1 for performing switching of conduction state to the motor section 120 (see FIGS. 14 and 15) are attached on the contact plate supporting portion 151b in parallel so as to align in the diametrical direction of the armature shaft 124. The respective contact plates CP1 and CP2 are plugged in from one side of the connector main body 151 in a short direction (from a lower side in FIG. 17) to be fixed to the connector main body 151.

The first contact plate CP1 is always brought into sliding contact with the switching plate 133 regardless of the rotation position of the worm wheel 132, and it is arranged on the side of the connector unit 150 opposite to the side of the connector connecting portion 152. On the other hand, the second contact plate CP2 passes through the recessed portion 133e of the switching plate 133 according to rotation of the worm wheel 132, and it is arranged on a portion of the connector unit 150 close to the connector connecting portion 152.

Thereby, the second jumper wire JP2 corresponding to the second contact plate CP2 is shorter that the first jumper wire JP1 corresponding to the first contact plate CP1. Here, the respective jumper wires JP1 and JP2 are conductor wires electrically connecting the respective contact plates CP1 and CP2 and base end sides of respective male type terminals TM1 or base end sides of respective female type terminals TM2 provided on the side of the connector connecting portion 152, and these members are connected to each other by a spot welding or the like, respectively.

A plurality of male type terminals TM1 and a plurality of female type terminals TM2 are provided on the side of the connector connecting portion 152. An external connector (not shown) on the side of a vehicle connected to the connector connecting portion 152 is electrically connected to distal end sides of the respective male type terminals TM1, and respective male type terminals (not shown) provided in the brush holder 170 are plugged in distal end sides of the respective female type terminals TM2 to be connected thereto.

Here, the connector unit 150 is not provided with an electrical circuit exhibiting a braking function based upon the counter electromotive force as described above, and it is provided with only two of the first contact plate CP1 and the second contact plate CP2. Therefore, as shown in FIG. 16, the widthwise size W of the connector unit 150 is shortened, which results in size reduction and weight reduction of the wiper motor 110. Incidentally, when a third contact plate (not shown) exhibiting a braking function based upon a counter electromotive force is provided, the widthwise size of the connector unit becomes large because it is necessary to bring the third contact plate into sliding contact with the third sliding contact portion 133j.

Next, such a point that a stop position accuracy of the wiper motor 110 formed in the above manner (the braking function based upon the counter electromotive force is absent) is improved as compared with a comparative example will be described in detail with reference to the drawings.

As shown in the second Embodiment in FIG. 18(a), when the wiper switch is turned off from a state where the worm wheel 132 is rotating in a direction of arrow R (in a counterclockwise direction) by a driver, supply of driving current to the motor portion 120 (see FIGS. 14 and 15) is continuously performed in such a case that the second contact plate CP2 (see FIG. 16) is in sliding contact with the second sliding contact portion 133i and it is being electrically connected to the switching plate 133 (in the case of the conduction state). That is, though the wiper switch has been turned off, the wiper motor 110 (see FIG. 14) is continuously driven. Thereby, the wiper blade is moved toward the predetermined stop position.

Thereafter, when the second contact plate PC2 reaches the recessed portion 133e, the supply of driving current to the motor section 120 is stopped and the wiper motor 110 is stopped. At this time, the worm wheel 132 is rotated by inertia, and the second contact plate CP2 advances within the recessed portion 133e by a distance L1 to be stopped at a stop point SP. Thereby, the wiper blade is stopped at the predetermined stop position. Here, the distance L1 where the second contact plate CP2 has advanced within the recessed portion 133e by inertia is, for example, 3.0 mm, and a rotation angle of the worm wheel 132 is $\beta°$ (about 12°) corresponding to the advance.

On the other hand, as shown in [Comparative Example] in FIG. 18(b), since a recessed portion "b" corresponding to a second sliding contact portion "a" is in the inner circumferential portion of a switching plate "c", if the second contact plate advances within the recessed portion "b" by a distance L1 (for example, 3.0 mm) to be stopped at the stop point SP, a rotation angle of a worm wheel "d" becomes an angle $\gamma°$ (about an angle of 24 degrees) larger than the above $\beta°$ (about an angle of 12 degrees) ($\gamma°>\beta°$).

This means that when fluctuation occurs in the magnitude of the distance L1 due to the magnitude of an external force loaded on the wiper blade, the comparative example can be deteriorated in stop position accuracy as compared with the second embodiment. Furthermore, as shown in FIGS. 18(*a*) and 18(*b*), the respective recessed portions 133*e* and "b" are formed at the same angle range $\alpha°$ of the respective worm wheels 132 and "d", and a length size L2 of the recessed portion 133*e* along the circumferential direction (the second embodiment) can be set to a length size longer than a length size L3 of the recessed portion "b" in the circumferential direction (the comparative example) (L2>L3).

Therefore, even if the worm wheel 132 is largely rotated by inertia, the second contact plate CP2 is not rotated beyond the recessed portion 133*e* so that the wiper motor 110 can be securely stopped in the second embodiment. On the other hand, in the comparative example, since there can occur a possibility that when the worm wheel "d" is largely rotated by inertia, the second contact plate moves beyond the recessed portion "b", the braking function based upon the counter electromotive force is required.

As described in detail, according to the wiper motor 110 according to the second embodiment, since the recessed portion 133*e* through which the second contact plate CP2 passes according to rotation of the worm wheel 132 is provided at a portion of the outer circumferential portion 133*a* of the switching plate 133, the rotation angle $\beta°$ of the worm wheel 132 can be made small relative to the distance L1 (for example, 3.0 mm) where the second contact plate CP2 advances within the recessed portion 133*e* by inertia, which results in that fluctuation of the stop position of the worm wheel 132 becomes hard to occur as compared with the comparative example. Thereby, it becomes possible to not only achieve size reduction and weight reduction of the wiper motor 110 but also improve the stop position accuracy of the worm wheel 132.

Furthermore, according to the wiper motor 110 according to the second embodiment, since the projection portion 133*f* projecting inwardly in the diametrical direction of the switching plate 133 is provided on one portion of the inner circumferential portion 133*b* of the switching plate 133, a function of generating a counter electromotive force to perform braking can be added to the motor section 120, which can accommodate various needs.

Furthermore, according to the wiper motor 110 according to the second embodiment, since the recessed portion 133*e* is formed at one portion of the outer circumferential portion 133*a* of the switching plate 133, generation of a useless portion of a base material (a material) of the switching plate can be suppressed as compared with the case where the projection portion has been formed at one portion of the outer circumferential portion of the switching plate of the comparative example (see FIG. 18(*b*)), so that yield can be improved.

Third Embodiment

Hereinafter, a third embodiment of the present invention will be described in detail with reference to the drawings. Portions of the third embodiment having functions similar to those of the above-described second embodiment are attached with same reference signs and detailed explanation thereof is omitted.

Figure 19:
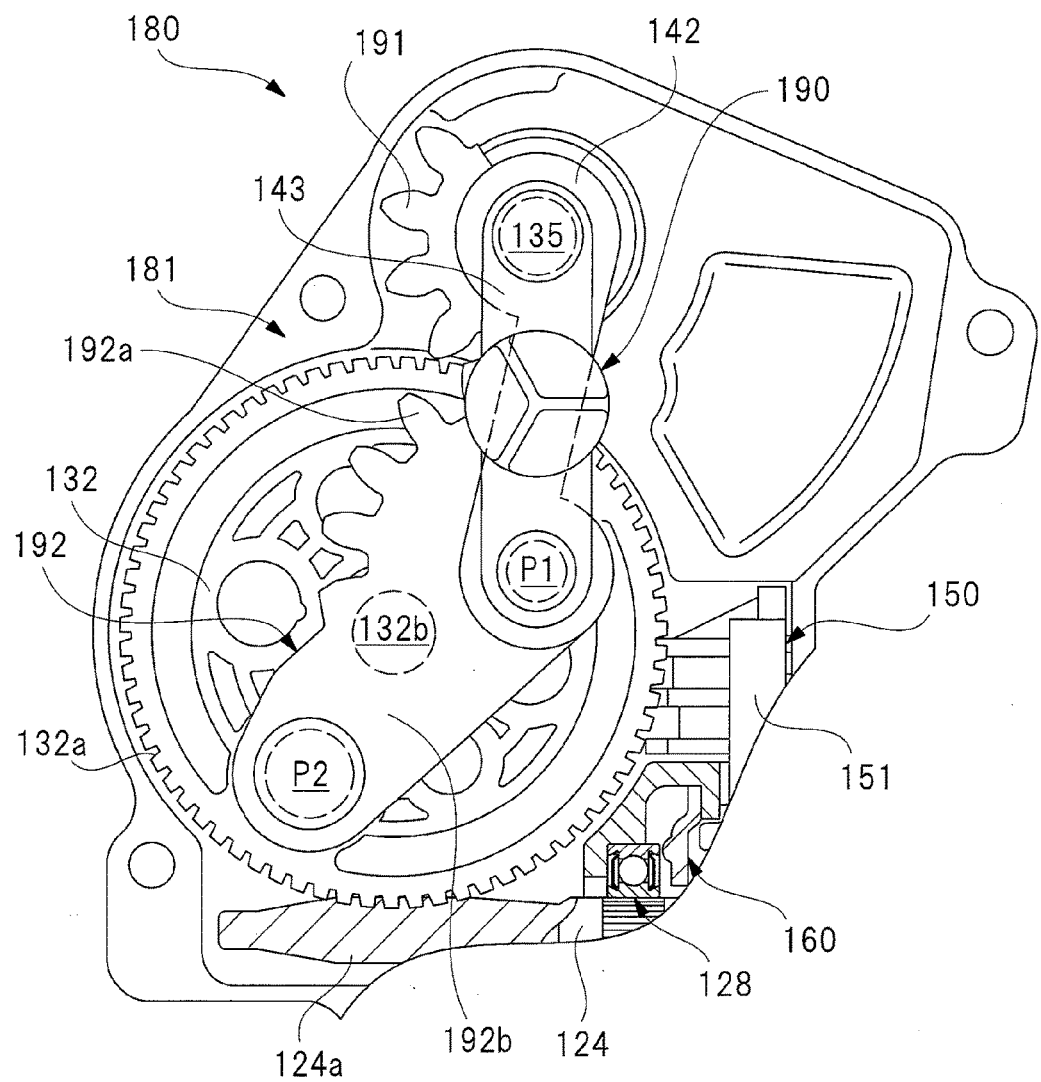
FIG. 19 is a plan view showing a reduction gear mechanism section of a wiper motor according to a third embodiment.

FIG. 19 shows a plan view showing a reduction gear mechanism section of a wiper motor according to the third embodiment.

As shown in FIG. 19, a wiper motor (a motor apparatus) 180 according to the third embodiment is different in a position of an output shaft 135 and a structure of a motion converting mechanism 190 from the wiper motor 110 (see FIG. 14) according to the second embodiment.

The output shaft 135 of the wiper motor 180 is arranged on the opposite side of the worm wheel 132 from an armature shaft 124. Thereby, a size of the wiper motor 180 along the axial direction of a armature shaft 124 can be reduced as compared with that of the second embodiment.

The motion converting mechanism 190 of the wiper motor 180 is provided with a pinion gear 191, a motion converting member 192, a coupling plate 142 and a sliding contact plate 143. The pinion gear 191 is fixed to a base end portion of the output shaft 135, and it is swung together with the output shaft 135.

The motion converting mechanism 192 is provided with a sector gear 192*a* meshing with the pinion gear 191 and an arm portion 192*b* pivotally coupled at an eccentric position on the worm wheel 132 via a second coupling pin P2. A first coupling pin P1 is provided at a central portion of the sector gear 192*a*, and the coupling plate 142 is provided between the first coupling pin P1 and the output shaft 135. Specifically, one end side of the coupling plate 142 in a longitudinal direction thereof is pivotally coupled to a base end side of the output shaft 135, and the other end side of the coupling plate 142 in the longitudinal direction is pivotally coupled to the first coupling pin P1. Thus, the coupling plate 142 according to the third embodiment keeps a distance between the output shaft 135 and the first coupling pin P1 constant to maintain meshing of the pinion gear 191 and the sector gear 192*a* with each other.

In the motion converting mechanism 190 of the wiper motor 180, the rotating motion of the worm wheel 132 is also converted to the swinging motion of the output shaft 135. Specifically, when the second coupling pin P2 is rotated about a wheel shaft 132*b* according to rotation of the worm wheel 132, an arm portion 192*b* of the motion converting member 192 is also rotated about the wheel shaft 132*b*. Thereby, the sector gear 192*a* is swung about the first coupling pin P1, so that the pinion gear 191 meshing with the sector gear 192*a*, namely the output shaft 135 is swung.

As described above in detail, the wiper motor 180 according to the third embodiment also achieves function and advantageous effect similar to those of the above-described second embodiment.

The present invention is not limited to the above embodiment, and it goes without saying that the present invention can be variously modified without departing from the gist thereof. For example, in the above embodiment, the motor case 121 and the brush holder accommodating portion 134 whose cross-sectional shapes have been formed into an oval shape, respectively have been shown, but the present invention is not limited to this shape, and the motor case 121 and the brush holder accommodating portion 134 can be formed into an elliptical shape, a rectangular shape, or the like.

Furthermore, in the above-described embodiment, the configuration adopting the reduction gear mechanism (the worm reducer) composed of the worm gear 124*a* and the worm wheel 132 has been shown, but the present invention is not limited to this reduction gear mechanism, and, for example, a planetary gear reducer can be adopted as the reduction gear mechanism. In this case, for example, such a configuration can be adopted that a sun gear is used an input side (on the same side as the armature shaft 124) gear while a ring rear is used as a gear on the output side (on the same side as the output shaft 135).

In addition, in the above-described embodiment, such a case has been shown that a ferrite magnet is adopted as each magnet 122, but the present invention is not limited to the case and a plate-like magnet composed of neodymium magnet or the like can be adopted. The number of magnets, the number of segments, the number of teeth and the like can be arbitrarily set in response to the specification required for the motor section.

Fourth Embodiment

Hereinafter, a fourth embodiment of the present invention will be described in detail with reference to the attached drawings.

Figure 20:
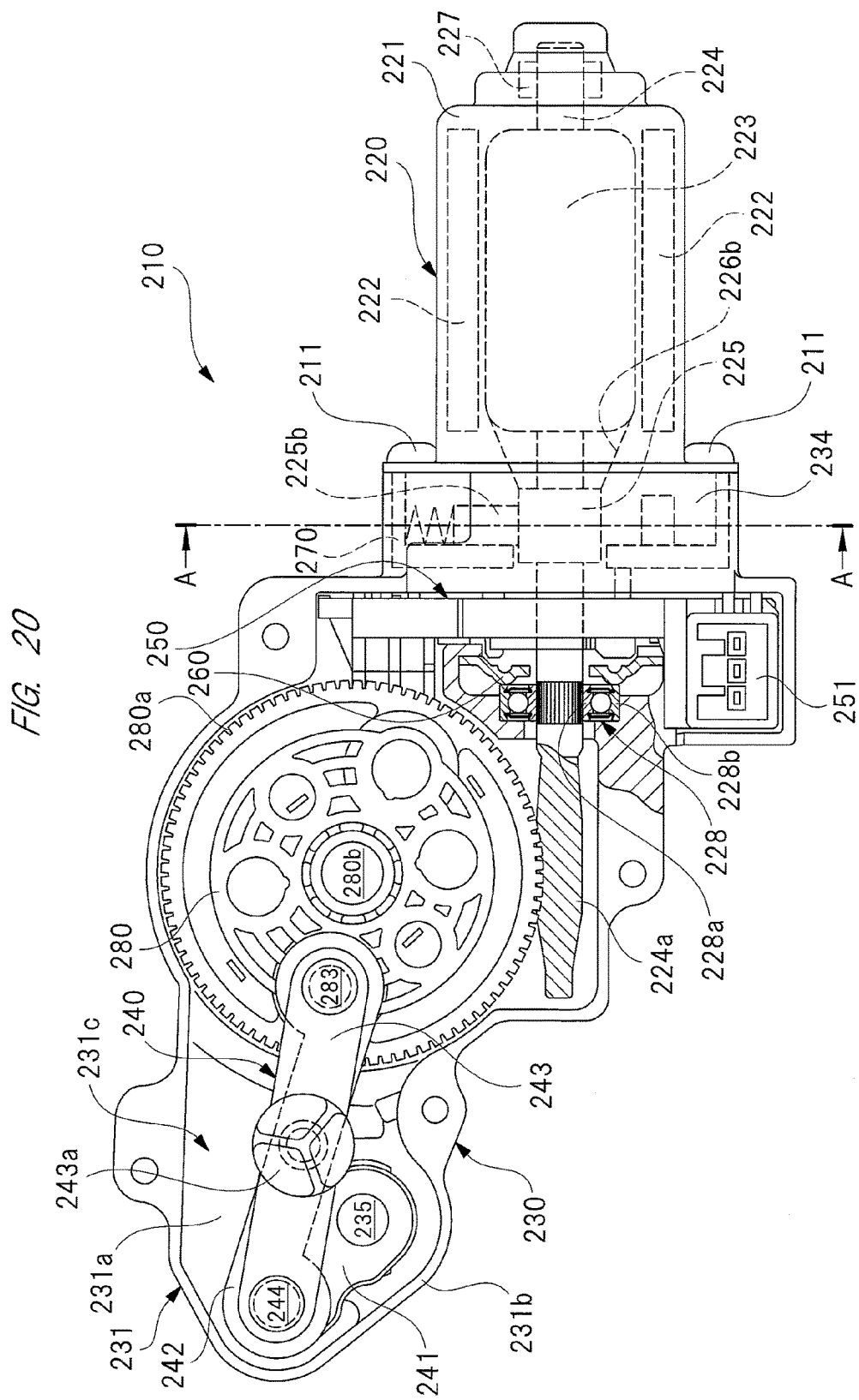
FIG. 20 is a plan view of a wiper motor according to a fourth embodiment.
Figure 21:
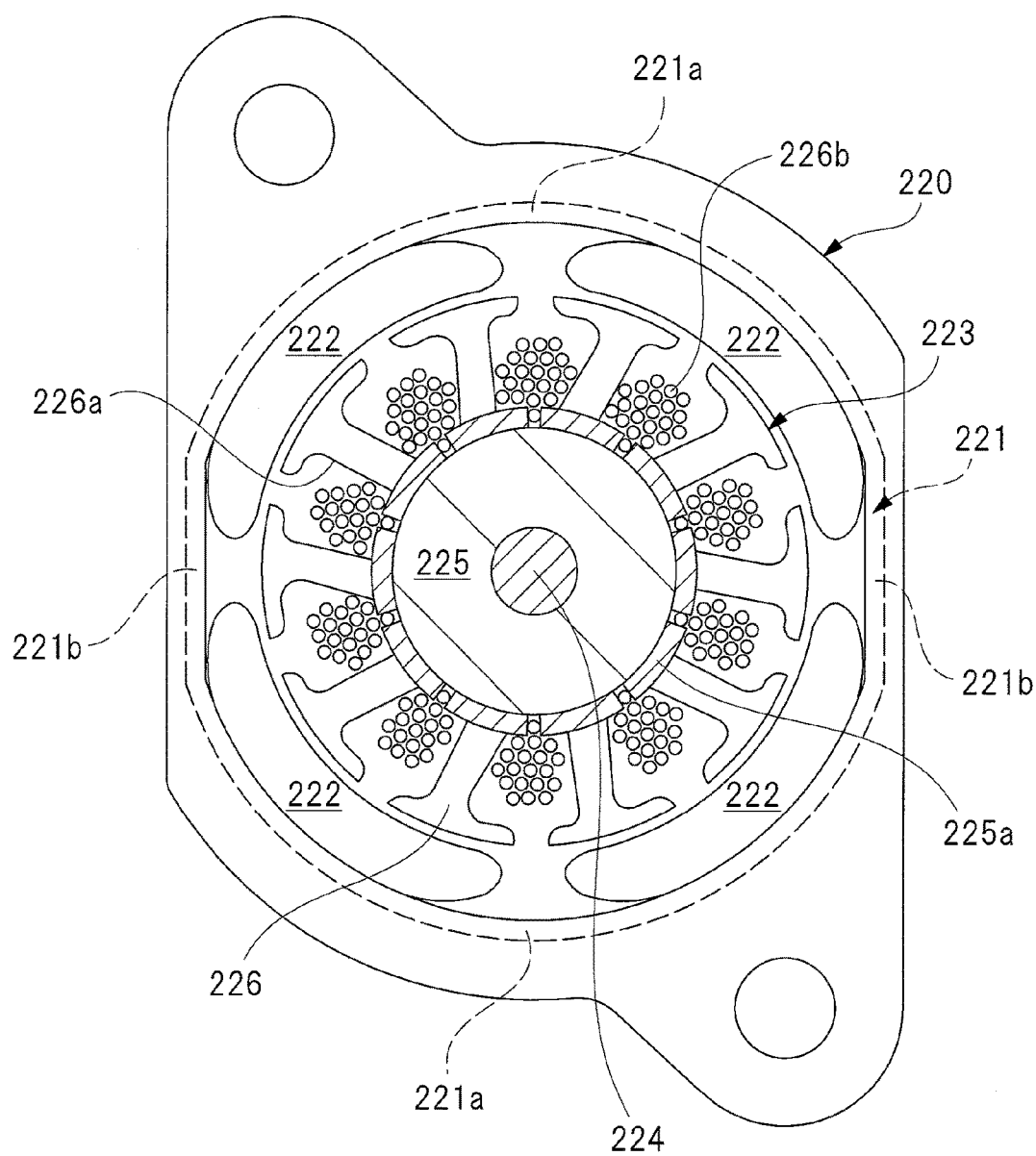
FIG. 21 is a partially-sectional view taken along line A-A I FIG. 20.
Figure 22:
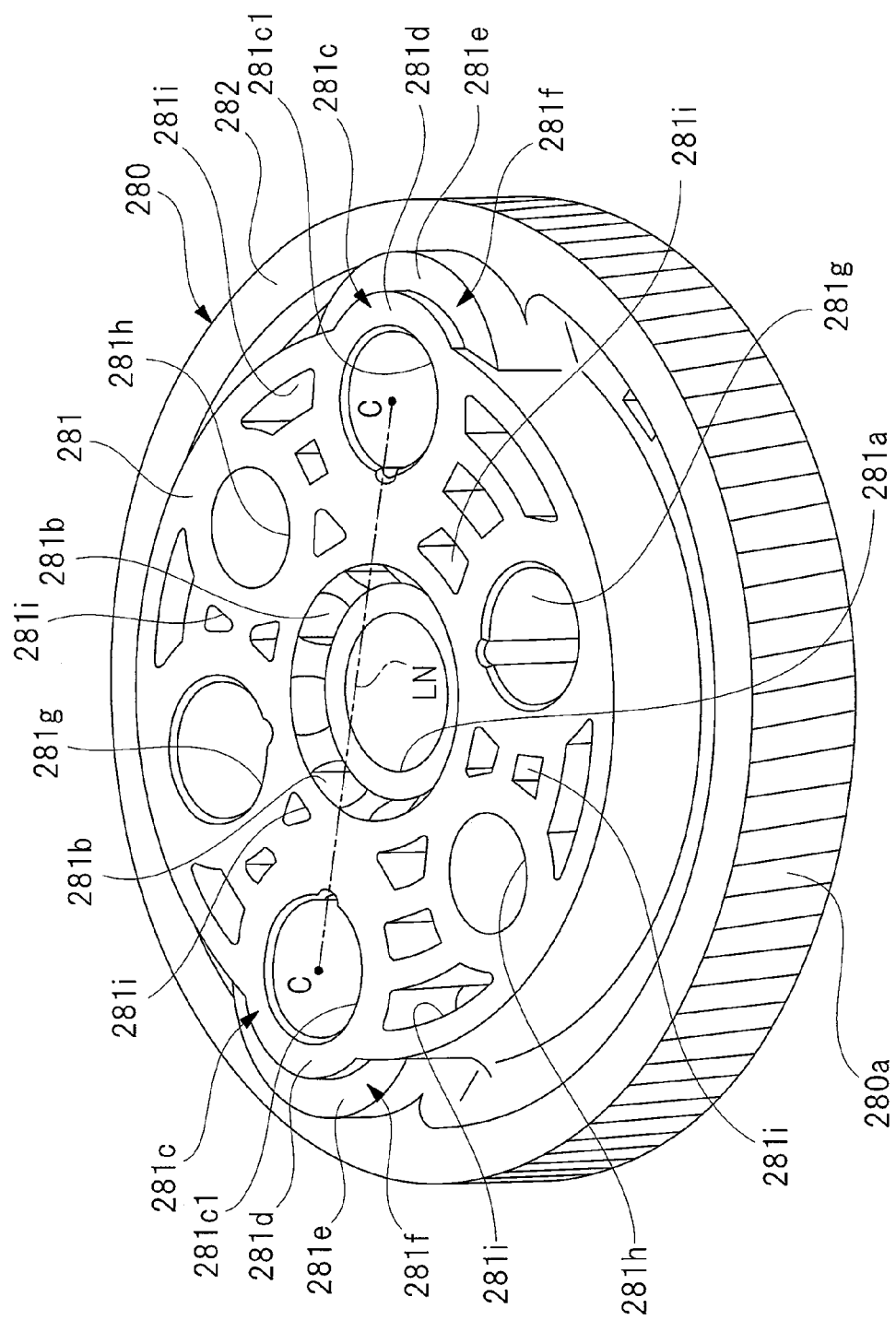
FIG. 22 is a perspective view of a worm wheel component as viewed from a surface side.
Figure 23:
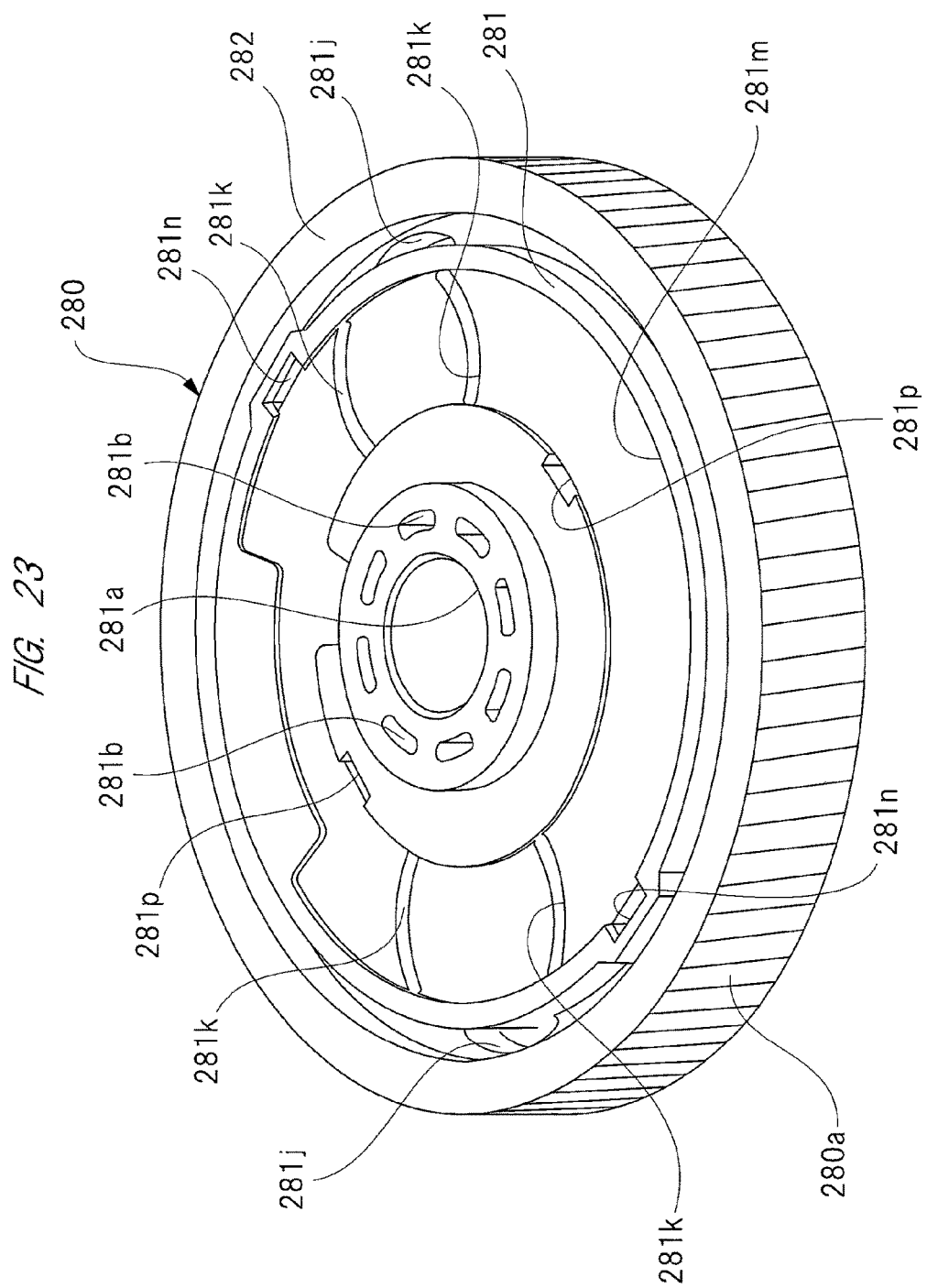
FIG. 23 is a perspective view of the worm wheel component as viewed from a back side.
Figure 24:
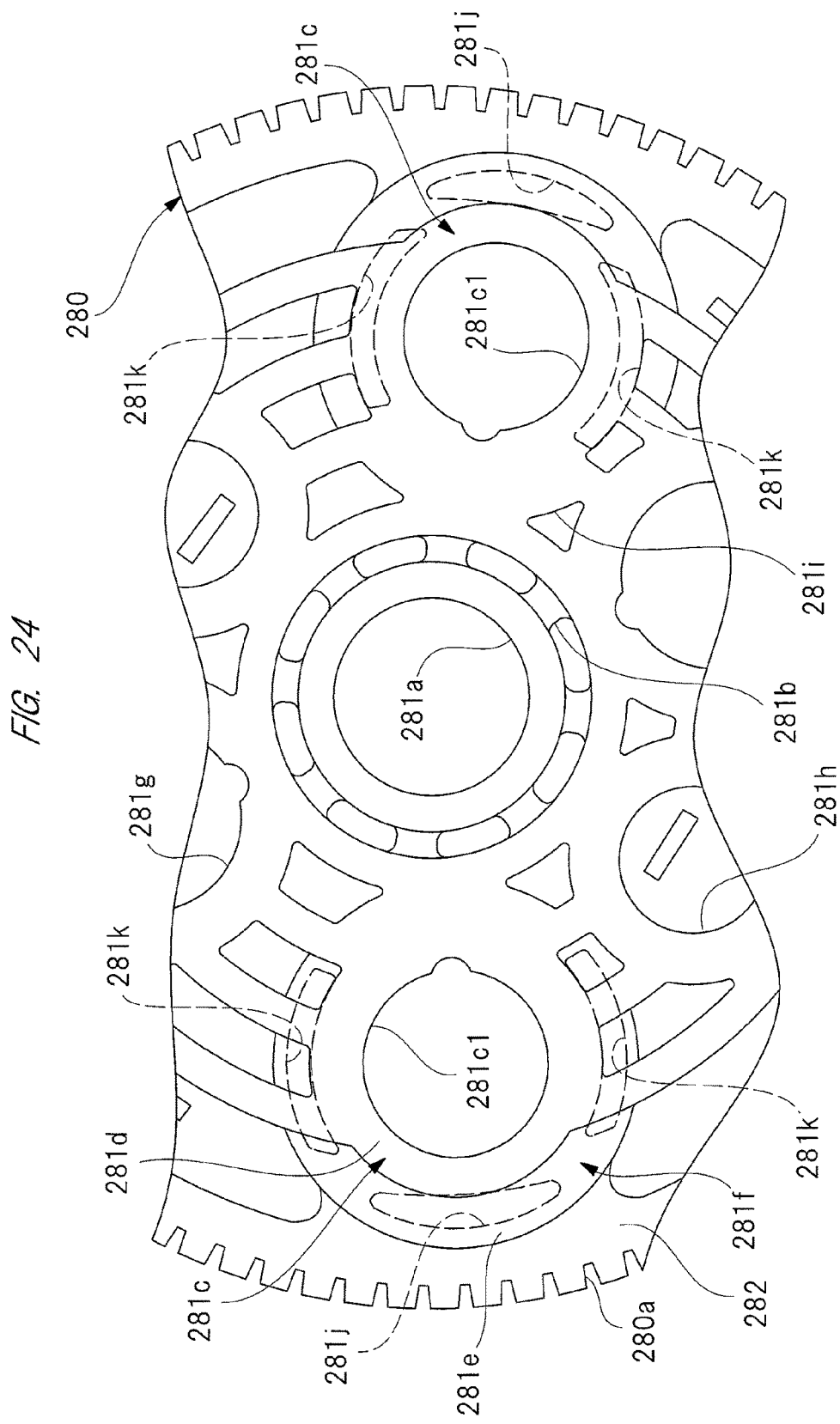
FIG. 24 is a partially-enlarged view for explaining a positional relationship of a coupling portion, a recessed portion close to a gear portion, and a recessed portion close to a wheel shaft fixing hole.
Figure 25:
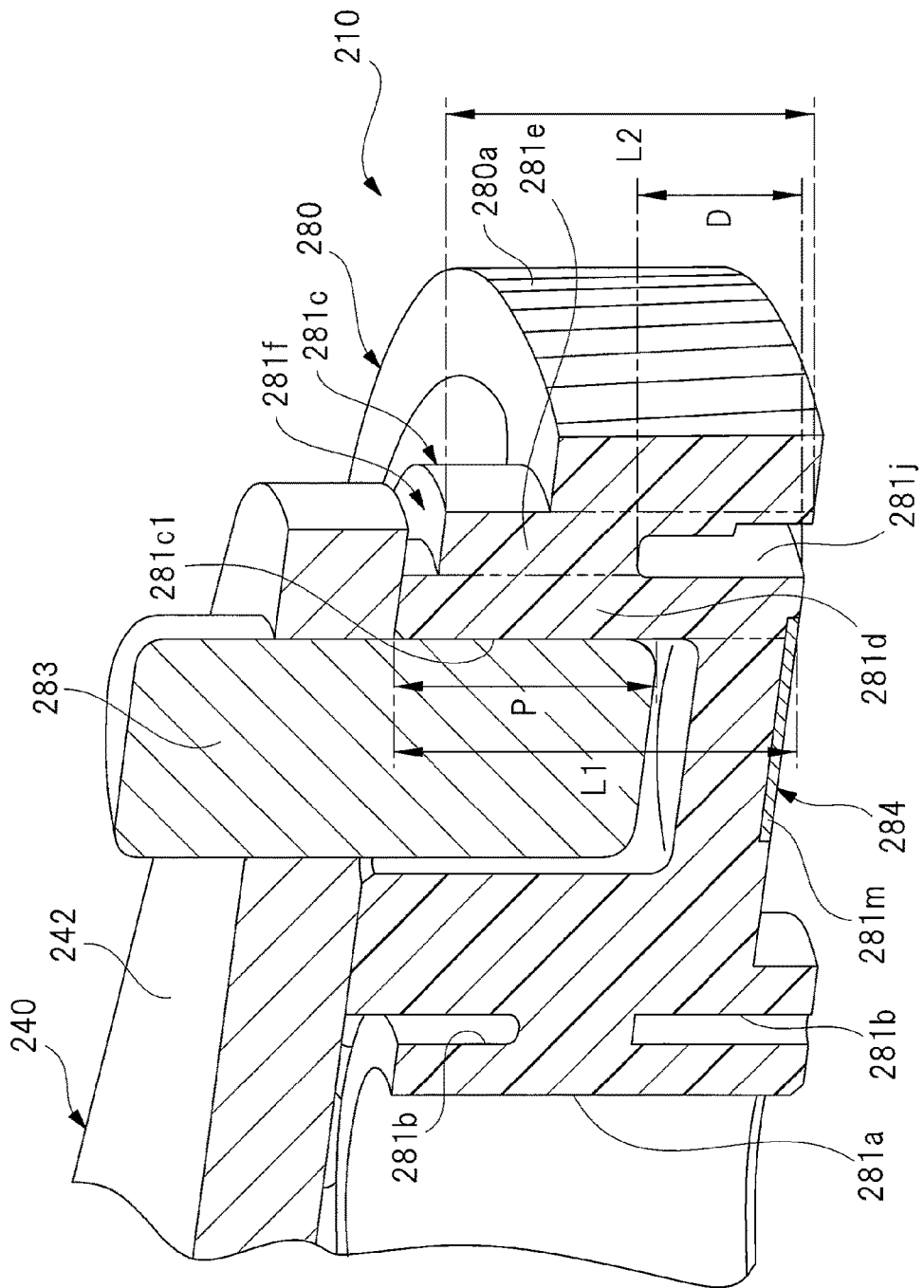
FIG. 25 is an explanatory view for explaining a size relationship of a first cylindrical portion, a second cylindrical portion, and the recessed portion close to the gear portion.
Figure 26:
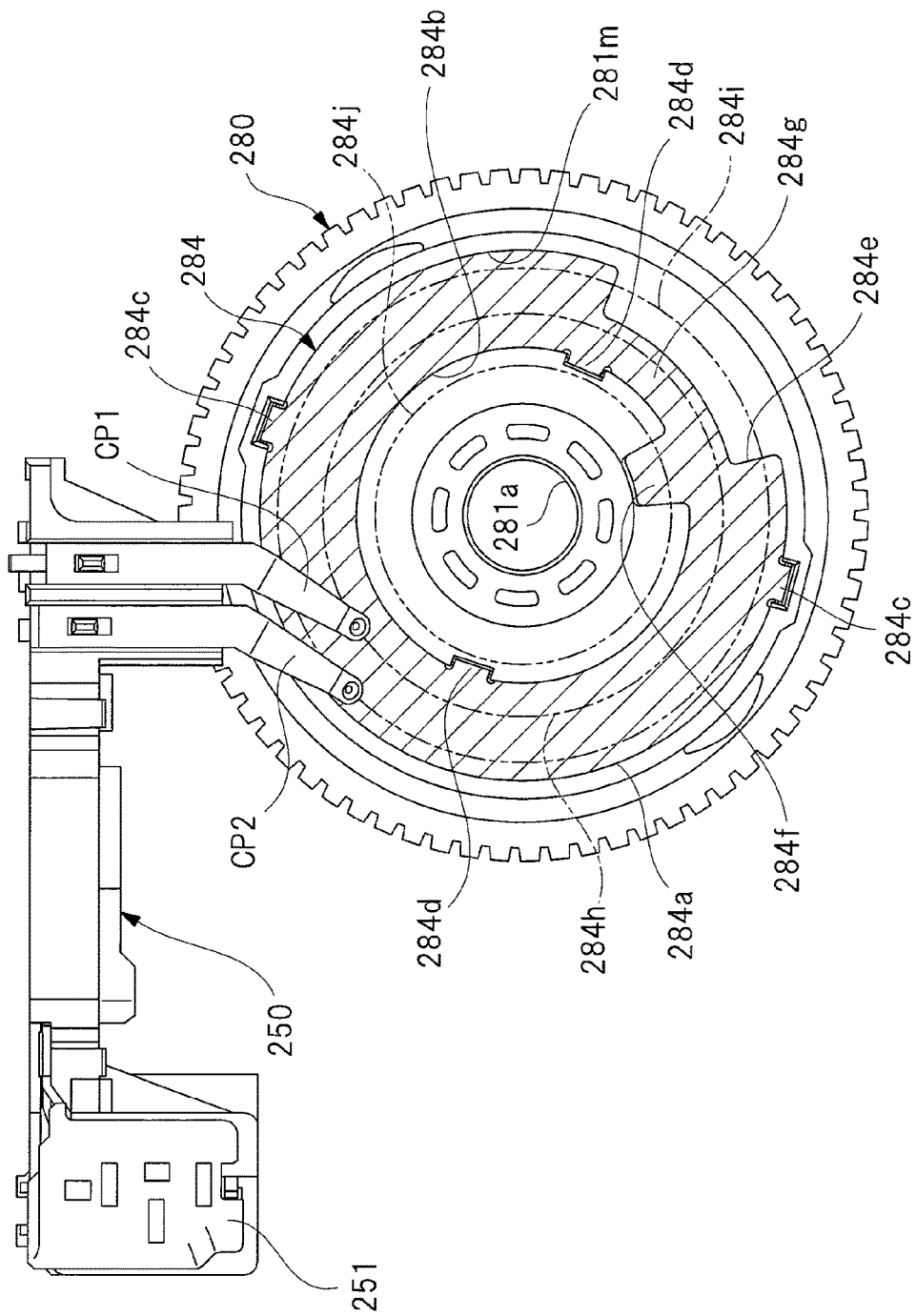
FIG. 26 is a view of a connector unit and a worm wheel as viewed from a back side in FIG. 20.

FIG. 20 is a plan view of a wiper motor according to a fourth embodiment, FIG. 21 is a partially-sectional view taken along line A-A I FIG. 20, FIG. 22 is a perspective view of a worm wheel component as viewed from a surface side, FIG. 23 is a perspective view of the worm wheel component as viewed from a back side, FIG. 24 is a partially-enlarged view for explaining a positional relationship of a coupling portion, a recessed portion close to a gear portion, and a recessed portion close to a wheel shaft fixing hole, FIG. 25 is an explanatory view for explaining a size relationship of a first cylindrical portion, a second cylindrical portion, and the recessed portion close to the gear portion, and FIG. 26 is a view of a connector unit and a worm wheel as viewed from a back side in FIG. 20.

As shown in FIG. 20, a wiper apparatus 210 as motor apparatus is used as a drive source of a rear wiper apparatus (not shown) mounted on a rear hatch of a vehicle, and provided with a motor section 220 and a reduction gear mechanism section 230. The motor section 220 and the reduction gear mechanism section 230 are integrally coupled to each other by a pair of fastening screws 211. The wiper motor 210 is arranged in a narrow space such as a rear hatch, and configured to cause a wiper blade (not shown) provided on a rear glass (not shown) to perform a reciprocating wiping action (swinging drive) within a predetermined angular range.

As shown in FIGS. 20 and 21, the motor section 220 is constituted as a four-pole motor with brush. The motor section 220 is provided with a motor case 221, and the motor case 221 is formed into a bottomed cylindrical shape by performing deep drawing work to a steel plate which is a magnetic body. The motor case 221 is provided with a pair of arc-shaped portions 221a and a pair of straight portions 121b, and the respective arc-shaped portions 221a and the respective straight portions 221b are arranged so as to face each other via a shaft center (an armature shaft 224) of the motor case 221, respectively. Thereby, a cross-sectional shape of the motor case 221 is formed into an approximately oval shape. Therefore, thinning can be achieved by saving a widthwise size of the motor case 221, namely, a thickness size in a crosswise direction in FIG. 21.

The respective arc-shaped portions 221a and the respective straight portions 221b extend from an opening portion side of the motor case 221 to a bottom portion side thereof. Thereby, the motor case 221 is formed into a straight shape which does not include any stepped portion, which results in improvement of ease of the deep drawing work of the motor case 221. Furthermore, as shown in FIG. 20, since a brush holder 270 does not enter the opening portion side of the motor case 221, a length of the motor case 221 in an axial direction is also suppressed. Thus, the motor case 221 is formed into an advantageous shape regarding improvement of moldability, and size reduction and weight reduction.

A total of four magnets 222 formed into an approximately arc shape in section are attached inside the motor case 221. The respective magnets 222 are ferrite magnets, for example, and they are fixed along a circumferential direction of the motor case 221 at equal intervals (at intervals of 90 degrees) and an armature 223 is rotatably accommodated in the respective magnets 222 with a predetermined gap. A base end side of an armature shaft (rotation shaft) 224 penetrates a rotation center of the armature 223, and is fixed to it.

A commutator 225 is fixed to an approximately central portion of the armature shaft 224 along an axial direction thereof, and the commutator 225 is provided with ten segments 225a. Furthermore, an armature core 226 forming the armature 223 is fixed on the side of a base end of the armature shaft 224, and the armature core 226 is provided with ten teeth 226a. Slots are formed among the respective teeth 226a. A plurality of armature coils 226a is wound on the respective teeth 226a by a predetermining winding method with a predetermined number of turns. Coil ends of the armature coils 226b are respectively electrically connected to the segments 225a.

A plurality of current-feeding brushes 225b (only one is shown in FIG. 20) comes in sliding contact with each segment 225a of the commutator 225. Each power-supply brush 225b is movably provided on the brush holder 270 accommodated in the brush holder accommodating portion 234 of the housing 231. Driving current from the connector unit 250 is supplied to each power-supply brush 225b. Thus, the motor section 220 and the connector unit 250 are electrically connected via each power-supply brush 225b, the commutator 225 and the armature coil 226b, so that electromagnetic force is generated in the armature coil 226b and the armature 223 (the armature shaft 224) is rotated. Incidentally, in FIG. 20, illustration of each power-supply brush 225b and the brush holder 270 is omitted for convenience of explanation.

The base end side of the armature shaft 224 is rotatably accommodated in the motor case 221, and it is supported by only a radial bearing 227 provided on the bottom portion side of the motor case 221. A thrust bearing supporting the armature shaft 224 from its axial direction is not provided between the base end side of the armature shaft 224 and the motor case 221. Here, the radial bearing 227 is formed into an approximately cylindrical shape from, for example, a sintered material, so that the radial bearing 227 is provided with low noise, impact resistance, and self-lubrication and it is hard to generate friction powder. However, the radial bearing 227 may also be formed of a plastic material excellent in heat resistance or the like instead of the sintered material.

A worm gear 224a (not shown in detail) is integrally provided at a distal end side of the armature shaft 224, and the worm gear 224a is rotated within the housing 231 according to rotation of the armature shaft 224. The worm gear 224a is formed into a spiral shape, and it is caused to mesh with gear teeth 280a of the worm wheel 280. Here, the worm gear 224a and the worm wheel 280 constitute a reduction gear mechanism. The worm wheel 280 is rotated in a state speed-reduced from rotation speed of the worm gear 224a according to rotation of the worm gear 224a to reduce rotation speed and output rotation with elevated torque to the output.

An inner wheel member 228a of a ball bearing 228 is fixed between the armature 223 and the worm gear 224a of the armature shaft 224 by press-fitting. Furthermore, an outer wheel member 228*b* of the ball bearing 228 is held between the housing 231 and a stopper plate 260. Thereby, the armature shaft 224 is rotatably supported by the ball bearing 228 and it is restricted regarding movements in an axial direction and in a radial direction thereof to the housing 231. Thus, the ball bearing 228 is provided with functions serving as a radial bearing and as a thrust bearing. Therefore, a thrust bearing supporting the armature shaft 224 from the axial direction of the armature shaft 224 is not also provided between the distal end side of the armature shaft 224 and the housing 231.

Here, since the wiper motor 210 is constituted as a four-pole motor size-reduced and weight-reduced, for example, it is more in calorific value than a large-sized two-pole motor having the same output as the wiper motor 210. However, since no thrust bearing is provided on both end sides of the armature shaft 224 in the axial direction, sliding loss of the armature shaft 224, namely, frictional resistance between the armature shaft 224 and the thrust bearing is correspondingly removed, so that increase in excessive calorific value is prevented.

As shown in FIG. 20, the reduction gear mechanism section 230 is provided with a housing 231 formed into an approximately bathtub shape by casting molten aluminum material or the like. The housing 231 is provided with a bottom portion 231*a* and a wall portion 231*b*, where an opposite side to the bottom portion 231*a* is formed as an opening portion 231*c*. The opening portion 231*c* is closed by a gear cover (not shown) and the worm wheel 280, the connector unit 250, and the like are accommodated within the housing 231 from the opening portion 231*c*.

A bush holder accommodating portion 234 is integrally provided on the same side of the housing 231 as the motor portion 220. The bush holder accommodating portion 234 is formed into a cylindrical shape so as to extend along the axial direction of the armature shaft 224, a cross-sectional shape thereof is formed into an approximately oval shape like the cross-sectional shape of the motor case 221 (see FIG. 21). Thereby, thinning of the brush holder accommodating portion 234 is also achieved in the brush holder accommodating portion 234 by saving a widthwise size of the brush holder accommodating portion 234, namely, a thickness size thereof in a depth direction in FIG. 20.

The worm wheel 280 as a rotating body shown in FIGS. 22 and 23 is rotatably provided within the housing 231, and the worm wheel 280 is formed into an approximately disc shape by injection-molding resin material such as plastic. The worm wheel 280 are provided with a main body portion 281 and a gear wheel portion 282 larger in diameter and smaller in axial thickness than the main body portion 281. Gear teeth 280*a* is integrally provided on an outer circumferential portion of gear wheel portion 282, and a worm gear 224*a* (see FIG. 20) is caused to mesh with the gear teeth 280*a*.

A wheel shaft fixing hole 281*a* is provided at a rotation center of the main body portion 281, and one end side of a wheel shaft 280*b* (see FIG. 20) composed of a steel rod circular in section in the axial direction is fixed to the wheel shaft fixing hole 281*a*. Here, the other end side of the wheel shaft 280*b* in the axial direction is pivotally supported at a boss portion (not shown) provided on a bottom portion 231*a* of the housing 231.

Furthermore, peripheries of one side and the other side of the wheel shaft fixing hole 281*a* in the axial direction thereof are formed with a plurality of first recessed portions 281*b* recessed in the axial direction of the main body portion 281.

Each first recessed portion 281*b* functions as the so-called "thickness reduction" and it suppresses occurrence of shrinkage, warp or the like about the wheel shaft fixing hole 281*a* in the main body portion 281, thereby improving a molding precision of the wheel shaft fixing hole 281*a*. Thereby, the worm wheel 280 can be rotated smoothly without being strained, so that reduction of operating noises of the wiper motor 210 or the like can be achieved.

As shown in FIG. 22, a pair of coupling portions 281*c* provided with plug-in holes 281*c*1 are provided on one side of the main body portion 281 in the axial direction. The coupling pin 283 (see FIGS. 20 and 25) coupled with on side (the right side in FIG. 20) of the motion converting mechanism 240 driven according to rotation of the worm wheel 280 is plugged in either one of the respective plug-in holes 281*c*1. That is, the coupling pin 283 is attached to either one of the respective coupling portions 281*c*. The respective coupling portions 281*c* are arranged at positions spaced away from the wheel shaft fixing hole 281*a* which is the rotation center of the worm wheel 280 so as to be opposed to each other through the wheel shaft fixing hole 281*a*. The respective coupling portions 281*c* are provided nearer to a gear wheel portion 282 on the diametrical-direction outside of the main body portion 281.

Here, the attaching position of the coupling pin 283 can be changed to one or the other of the respective coupling portions 281*c*, but this is because various specifications of the wiper motor 210 can be accommodated. Specifically, for example, when the coupling pin 283 is attached to either one of the respective coupling portions 281*c*, the stop position of the wiper blade faces right, and when the coupling pin 283 is attached to the other of the respective coupling portions 281*c*, the stop position of the wiper blade faces left. In other words, the worm wheel 280 is formed into a shape allowing common use of a part, which contributes to manufacturing cost reduction of the wiper motor 210.

As shown in FIG. 25, the coupling portion 281*c* is provided with a first cylindrical portion 281*d* arranged inwardly in a diametrical diction thereof and a second cylindrical portion 281*e* arranged outwardly in the diametrical direction. Here, for clarifying the positional relationship between the first cylindrical portion 281*d* and the second cylindrical portion 281*e*, a two-dot chain line is applied to a boundary between these portions 281*d* and 281*e*.

The first cylindrical portion 281*d* is configured to pivotally support the coupling pin 283, and an axial-direction size thereof is set to U. On the other hand, the second cylindrical portion 281*e* is provided around the first cylindrical portion 281*d* to partially reinforce the first cylindrical portion 281*d*, and a axial-direction size thereof is set to an axial-direction size L2 shorter than that of the first cylindrical portion 281*d* (L2<L1). Here, the second cylindrical portion 281*e* particularly partially reinforces a supporting portion "P" supporting the coupling pin 283 of the first cylindrical portion 281*d*, thereby, making rigidity of the portion supporting the coupling pin 283 of the coupling portion 281*c* sufficient.

Furthermore, by setting the axial-direction size L1 of the first cylindrical portion 281*d* to be longer than the axial-direction size L2 of the second cylindrical portion 281*e*, a step-like step difference portion 281*f* is formed on one side (the upper side in FIG. 25) of the second cylindrical portion 281*e* in the axial direction. That is, a thickness size along the diametrical direction (corresponding to a thickness size of the first cylindrical portion 281*d*) is made thin in a portion corresponding to the step difference portion 281*f* of the coupling portion 281c, so that occurrence of shrinkage, warp, or the like at a molding time of the coupling portion 281c can be suppressed.

As shown in FIG. 22, a large-diameter hole portion 281g serving as the second recessed portion and a small-diameter hole portion 281h smaller in diameter than the large-diameter hole portion 281g are provided one by one on one side (an upper side in FIG. 22) of the main body portion 281 regarding a line segment LN formed by connecting the centers C of the respective coupling portions 281c. Furthermore, a large-diameter hole portion 281g serving as the second recessed portion and a small-diameter hole portion 281h are provided one by one on the other side (a lower side in FIG. 22) of the main body portion 281 regarding the line segment LN. A pair of large-diameter hole portions 281g are arranged so to be opposed to each other through the wheel shaft fixing hole 281a, while a pair of small-diameter hole portions 281h are arranged so as to be opposed to each other through the wheel shaft fixing hole 281a.

Thus, by providing the same number of large-diameter hole portions 281g and the same number of small-diameter hole portions 281h which are recessed in the axial direction of the main body portion 281 (one by one) on the one side of the main body portion 281 regarding the line segment LN and the other side of the main body portion 281 regarding the ling segment LN, and causing the large-diameter hole portions 281g and the small-diameter hole portions 281h to be opposed to each other through the wheel shaft fixing hole 281a, balance of the worm wheel 280 about the wheel shaft fixing hole 281a is made excellent. Thereby, rotation wobbling of the worm wheel 280 is suppressed.

Furthermore, since the respective large-diameter hole portions 281g and the small-diameter hole portions 281h reduce the weight of the worm wheel, but function as "thickness reduction", shrinkage, warp or the like is prevented from occurring in the worm wheel 280, so that a molding precision of the worm wheel 280 is improved. However, the embodiment is not limited to the case where the large-diameter hole portions 281g and the small-diameter hole portions 281h are provided one by one on one side and the other side of the main body portion 281 regarding the line segment LN, respectively, and they may be provided two by two. Furthermore, only the large-diameter hole portions 281g may be provided, and only the small-diameter hole portions 281h may be provided.

Furthermore, a plurality of second recessed portions 281i recessed in the axial direction of the main body portion 281 is provided on the one side of the main body portion 281 regarding the line segment LN and the other side of the main body portion 281 regarding the line segment LN in addition to the respective holes 281g, 281h. The respective second recessed portions 281i also serve as "thickness reduction", and they prevent occurrence of shrinkage, warp, or the like in the worm wheel 280.

Here, inner diametrical sizes of the respective large-diameter hole portions 281g and inner diametrical sizes (diameter sizes of the plug-in holes 281c1) of the respective first cylindrical portions 281d are set to the same size, respectively, so that the coupling pin 283 can also be pivotally plugged in the respective large-diameter hole portions 281g. That is, the respective large-diameter hole portions 281g are also provided with functions for accommodating various specifications of the wiper motor 210. Specifically, the respective large-diameter hole portions 281g are arranged internally in the diametrical direction rather than the respective first cylindrical portions 281d. Therefore, in the case where the respective large-diameter hole portions 281g are selected, the wiping range (the swinging range) of the wiper blade can be set to be an angle narrower than that in the case where the respective first cylindrical portions 281d are selected.

As shown in FIG. 23, gear wheel-side recessed portions 281j and wheel shaft-side recessed portions 281k are provided as the first recessed portion on the other side of the main body portion 281 in the axial-direction at portions corresponding to the respective coupling portions 281c (see FIG. 22), respectively. As shown in FIG. 24, the respective gear wheel-side recessed portions 281j and the respective wheel shaft-side recessed portions 281k are formed into an approximately arc shape in cross-sectional shape, and they are arranged along the circumferential directions of the respective coupling portions 281c.

Here, the respective gear wheel-side recessed portions 281j and the respective wheel shaft-side recessed portions 281k are recessed toward one side of the main body portion 281 in the axial direction, thereby reducing the volumes of the respective coupling portions 281c. Depth sizes, namely, sizes in the axial direction, of the respective gear wheel-side recessed portions 281j and the respective wheel shaft-side recessed portions 281k are set to a depth size D slightly reaching the supporting portion "P" so as to be capable of suppressing occurrence of shrinkage, warp, the like at a molding time of the coupling portions 281c without lowering the rigidity of a portion of the coupling portions 281c supporting the coupling pin 283.

Furthermore, as shown in FIG. 23, an annular recessed portion 281m attached with a switching plate 284 (see FIG. 26) is formed on the other side of the main body portion 281 in the axial direction. A depth size (a size in the axial direction) of the annular recessed portion 281m is set to the same size as a thickness size (not shown) of the switching plate 284 composed of a steel plate having conductivity. Therefore, a face of the other side of the main body portion 281 in the axial direction becomes flush in the state where the switching plate 284 has been attached to the annular recessed portion 281m.

A pair of outer circumferential side engagement holes 281n facing each other so as to sandwich the wheel shaft fixing hole 281a are provided nearer to the gear teeth 280a of the main body portion 281. Furthermore, a pair of inner circumferential side engagement holes 281p facing each other so as to sandwich the wheel shaft fixing hole 281a is provided nearer to the gear teeth 280a of the main body portion 281. The respective outer circumferential side engagement holes 281n and the respective inner circumferential side engagement holes 281p are arranged at positions rotated relative to each other about the axial center of the wheel shaft fixing hole 281a by about an angle of 90 degrees.

Respective fixing claws 284c and 284d (see FIG. 26) for fixing the switching plate 284 to the annular recessed portion 281m are inserted and fixed to the respective engagement holes 281n and 281p. Thereby, the outer circumferential portion 284a and the inner circumferential portion 284b (see FIG. 26) of the switching plate 284 can be firmly fixed to the worm wheel 280 without causing chattering.

A switching plate 284 which is a conductive plate is provided on the other side of the worm wheel 280 in its axial direction (on the near side in this figure), as shown by a slanted line portion in FIG. 26. The switching plate 284 is formed of brass excellent in conductivity or the like, and it is formed into an approximately annular shape by performing press work (punching or the like). Furthermore, the switching plate 284 is fixed to the annular recessed portion 281m on the other side of the worm wheel 280 in its axial direction.

Two outer circumferential side fixing claws 284c and two inner circumferential side fixing claws 284d bent at an approximately right angle in a plate thickness direction of the switching plate 284 are provided on the outer circumferential portion 280a and the inner circumferential portion 280b of the switching plate 284, respectively. The fixing claws 284c and 284d for fixing the switching plate 284 to the worm wheel 280 are respectively provided to the corresponding engagement holes 281n and 281p. That is, the respective outer circumferential side fixing claws 284c and the respective inner circumferential side fixing claws 284d are arranged at positions rotated relative to each other about the axial center of the wheel shaft fixing hole 281a by about an angle of 90 degrees.

A recessed portion 284e recessed inwardly in a diametrical direction of the switching plate 284 is provided at one portion of the outer circumferential portion 284a of the switching plate 284. Furthermore, a projection portion 284f projecting inwardly in a diametrical direction of the switching plate 284 is provided at one portion of the inner circumferential portion 284b of the switching plate 284. Furthermore, an annular plate main body 284g which is not provided with a projection and a recess is provided between the outer circumferential portion 284a and the inner circumferential portion 284b along the diametrical direction of the switching plate 284.

A first sliding contact portion 284h, a second sliding contact portion 284i and a third sliding contact portion 284j (two-dot chain lines in this figure) extending in the circumferential direction of the switching plate 284 are respectively formed at a portion corresponding to the plate main body 284g of the switching plate 284, a portion corresponding to the recessed portion 284e, and a portion corresponding to the projection portion 284f. Distal end portions of a first contact plate CP21 and a second contact plate CP22 provided on the contact unit 250 come in sliding contact with the first sliding contact portion 284h and the second sliding contact portion 284i according to rotation of the worm wheel 280, respectively.

Thereby, conduction states and non-conduction states of the respective contact plates CP21 and CP22 are fed to a vehicle-mounted controller (not shown) through the connection unit 250. Thereby, the vehicle-mounted controller stops supply of diving current to the motor section 220 by detecting that a wiper switch (not shown) has been turned off by a driver and that the respective contact plates CP21 and CP22 have been changed to a non-conductive state, namely, that the second contact plate CP22 has reached the recessed portion 284e. Thereby, the wiper blade can be automatically stopped at the predetermined stop position (auto stop).

Here, a connector connecting portion 251 is integrally provided in the connector unit 250, and an external connector (not shown) on the vehicle side is electrically connected to the connector connecting portion 251. Thereby, conduction states and non-conduction states of the respective contact plates CP21 and CP22 can be fed to the vehicle-mounted controller, and driving current can be supplied from the vehicle-mounted controller to a brush holder 270 (the motor section 220).

As shown in FIG. 20, an output shaft 235 composed of a steel rod circular in section is accommodated in a portion (on the left side in this figure) of the housing 231 separated from the worm wheel 280. The output shaft 235 is pivotally supported by a boss portion (not shown) provided on a bottom portion 231a of the housing 231. A base end portion of the wiper blade is fixed to an extension portion (not shown) of the output shaft 235 extending outside.

A motion converting mechanism (power transmission member) 240 for converting a rotation motion of the worm wheel 280 to a swinging motion of the output shaft 235 is provided between the base end side of the output shaft 235 and the worm wheel 280 within the housing 231. The motion converting mechanism 240 is provided with a swinging link 241, a coupling plate 242 and a sliding contact plate 243.

The swinging link 241 is formed into a plate shape by punching a steel plate or the like, one end side of the swinging link 241 in an longitudinal direction thereof is fixed to the base end side of the output shaft 235. On the other hand, the other end side of the swinging link 241 in the longitudinal direction is pivotally coupled to one end side of the coupling plate 242 in the longitudinal direction via a pin member 244. The other end side of the coupling plate 242 in the longitudinal direction is pivotally coupled to one coupling portion 281c (see FIG. 22) at a position deviated from the rotation center of the worm wheel 280 via a coupling pin 283.

That is, one side (the right side of this figure) of the power converting mechanism 240 is coupled to the coupling pin 283, and the other side (the left side of this figure) of the power converting mechanism 240 is coupled to the output shaft 235. Here, a length size of the swinging link 241 is set to a length size of approximately half (approximately ½) of a length size of the coupling plate 242. Furthermore, the coupling plate 242 is also formed into a plate shape by punching a steel plate or the like in the same manner as the swinging link 241.

Thus, by providing the motion converting mechanism 240 between the output shaft 235 and the worm wheel 280, the output shaft 235 can be swung in a predetermined angular range according to rotation of the worm wheel 280 in one direction. Specifically, a rotation force reduced in speed by the rotation of the worm gear 224a and the worm wheel 280 and having raised torque is transmitted to the coupling pin 283, and the coupling pin 283 is rotated about the wheel shaft 280b. Thereby, the other end side of the coupling plate 242 in the longitudinal direction is also rotated about the wheel shaft 280b, so that the one end side of the coupling plate 242 in the longitudinal direction is swung about the output shaft 235 in a state where it has been restricted by the swinging link 241 via the pin member 244.

The sliding contact plate 243 is formed into a plate shape from resin material such as plastic excellent in self-lubricity, and it is attached to the gear cover side (on the near side in FIG. 20) of the coupling plate 242. A sliding contact portion 243a coming in sliding contact with the gear cover is integrally provided at a central portion of the sliding contact plate 243 in the longitudinal direction, and grease (not shown) is applied to the sliding contact portion 243a. Thereby, motion of the motion converting mechanism 240 within the housing 231 is made smooth, the motion converting mechanism 240 is prevented from chattering along the axial direction (the depth direction in FIG. 20) of the output shaft 235, and it is possible to achieve a reduction of operating noises of the wiper motor 210. In addition, the sliding contact plate 243 is not shown in FIG. 25.

As described above in detail, according to the wiper motor 210 according to the fourth embodiment, since the coupling portion 281c is formed of the first cylindrical portion 281d pivotally supporting the coupling pin 283 and the second cylindrical portion 281e provided about the first cylindrical portion 281d and set to the axial-direction size L2 shorter than that of the first cylindrical portion 281d, the first cylindrical portion 281d can be reinforced by the second cylindrical portion 281e. In this case, since the axial-direction sizes of the first cylindrical portion 281d and the second cylindrical portion 281e are made different from each other, a diameter-direction thickness size of the first cylindrical portion 281d can be partially suppressed by forming the first cylindrical portion 281d and the second cylindrical portion 281e in a stepped fashion. Thereby, by reducing the volume of the coupling portion 281c while securing the rigidity thereof, deformation of resin such as shrinkage or warp can be suppressed, which results in achievement of reduction of operating noises of the wiper motor 210 and a long life thereof.

Fifth Embodiment

Hereinafter, a fifth embodiment of the present invention will be described in detail with reference to the drawings. Portions of the fifth embodiment having functions similar to those of the above-described fourth embodiment are attached with same reference signs and detailed explanation thereof is omitted.

Figure 27:
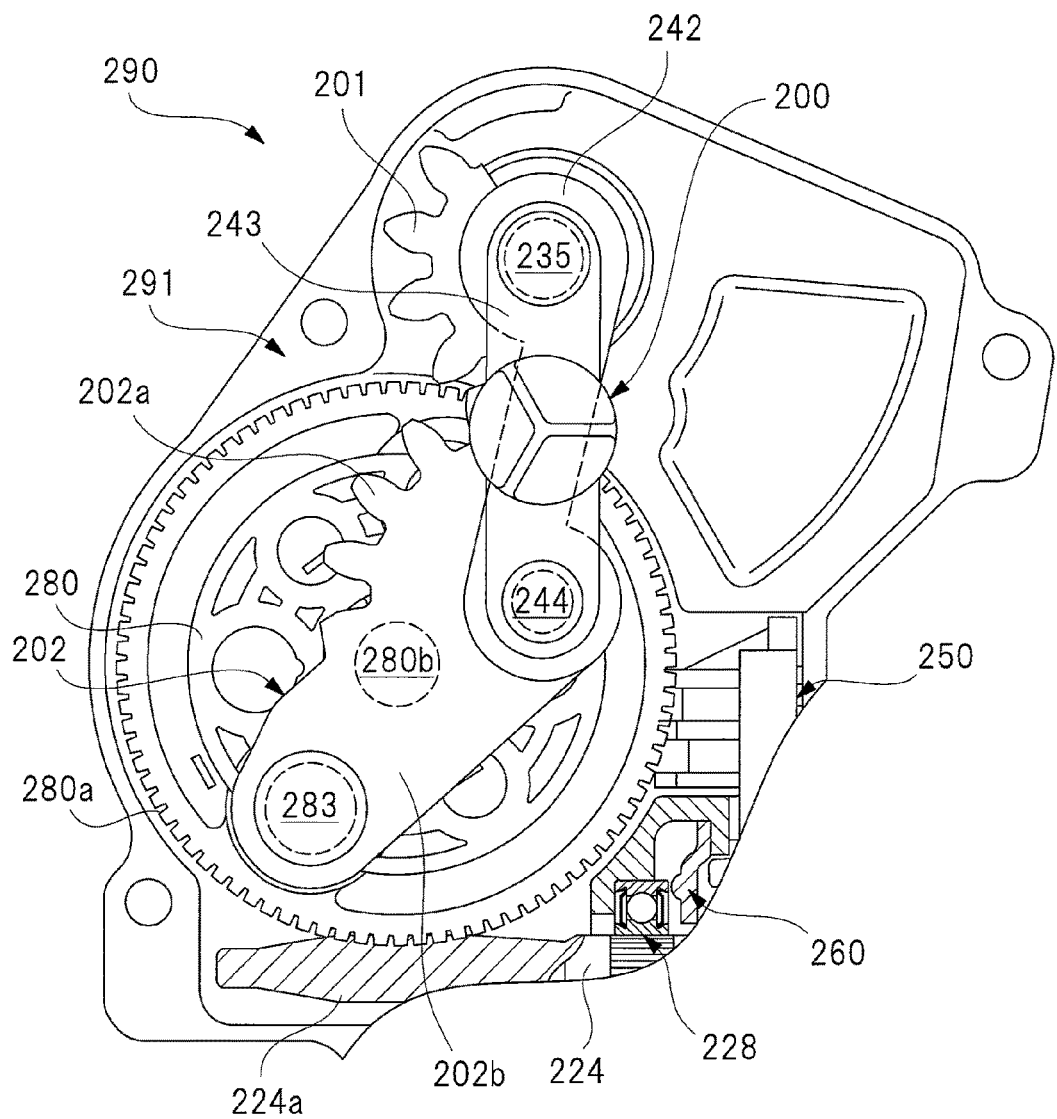
FIG. 27 is a plan view showing a reduction gear mechanism section of a wiper motor according to a fifth embodiment.

FIG. 27 shows a plan view showing a reduction gear mechanism section of a wiper motor according to the fifth embodiment.

As shown in FIG. 27, a wiper motor (a motor apparatus) 290 according to the fifth embodiment is different in a position of an output shaft 235 and a structure of a motion converting mechanism (power transmission member) 200 from the wiper motor 210 (see FIG. 20) according to the fourth embodiment.

The output shaft 235 of the wiper motor 290 is arranged on the opposite side of the worm wheel 280 from an armature shaft 224, whereby the wiper motor 290 can be reduced in length along the axial direction of the armature shaft 224 as compared with that of the fourth embodiment.

The motion converting mechanism 200 of the wiper motor 290 is provided with a pinion gear 201, a motion converting member 202, a coupling plate 242 and a sliding contact plate 243. The pinion gear 201 is fixed to a base end side of the output shaft 235, and it is swung together with the output shaft 235.

The motion converting mechanism 202 is provided with a sector gear 202a meshing with the pinion gear 201 and an arm portion 202b pivotally coupled at an eccentric position of the worm wheel 280 via a coupling pin 283. A pin member 244 is provided at a central portion of the sector gear 202a, and the coupling plate 242 is provided between the pin member 244 and the output shaft 235. Specifically, one end side of the coupling plate 242 in a longitudinal direction thereof is pivotally coupled to a base end side of the output shaft 235, and the other end side of the coupling plate 242 in the longitudinal direction is pivotally coupled to the pin member 244. Thus, the coupling plate 242 according to the fifth embodiment keeps a distance between the output shaft 235 and the pin member 244 constant to maintain meshing of the pinion gear 201 and the sector gear 202a with each other.

In the motion converting mechanism 200 of the wiper motor 290, the rotating motion of the worm wheel 280 is also converted to the swinging motion of the output shaft 235. Specifically, when the coupling pin 283 is rotated about a wheel shaft 282b according to rotation of the worm wheel 280, the arm portion 202b of the motion converting member 202 is also rotated about the wheel shaft 282b. Thereby, the sector gear 202a is swung about the pin member 244, so that the pinion gear 201 meshing with the sector gear 202a, namely the output shaft 235 is swung.

As described above in detail, the wiper motor 290 according to the fifth embodiment also achieves function and advantageous effect similar to those of the above-described fourth embodiment.

The present invention is not limited to the above embodiment, and it goes without saying that the present invention can be variously modified without departing from the gist thereof. For example, in the above embodiment, the motor case 221 and the brush holder accommodating portion 234, each of which is formed into an oval shape in cross section as shown, but the present invention is not limited to this shape, and the motor case 221 and the brush holder accommodating portion 234 can be formed into an elliptical shape, a rectangular shape, or the like.

Furthermore, in the above-described embodiment, the configuration adopting the reduction gear mechanism (the worm reducer) composed of the worm gear 224a and the worm wheel 280 has been shown, but the present invention is not limited to this reduction gear mechanism, and, for example, a planetary gear reducer can be adopted as the reduction gear mechanism. In this case, for example, such a configuration can be adopted that a sun gear is used an input side (on the same side as the armature shaft 224) gear while a ring rear is used as a gear on the output side (on the same side as the output shaft 235).

In addition, in the above-described embodiment, such a case has been shown that a ferrite magnet is adopted as each magnet 222, but the present invention is not limited to the case and a plate-like magnet composed of neodymium magnet or the like can be adopted. The number of magnets, the number of segments, the number of teeth and the like can be arbitrarily set in response to the specification required for the motor section.

Sixth Embodiment

Hereinafter, a sixth embodiment of the present invention will be described in detail with reference to the drawings.

Figure 28:
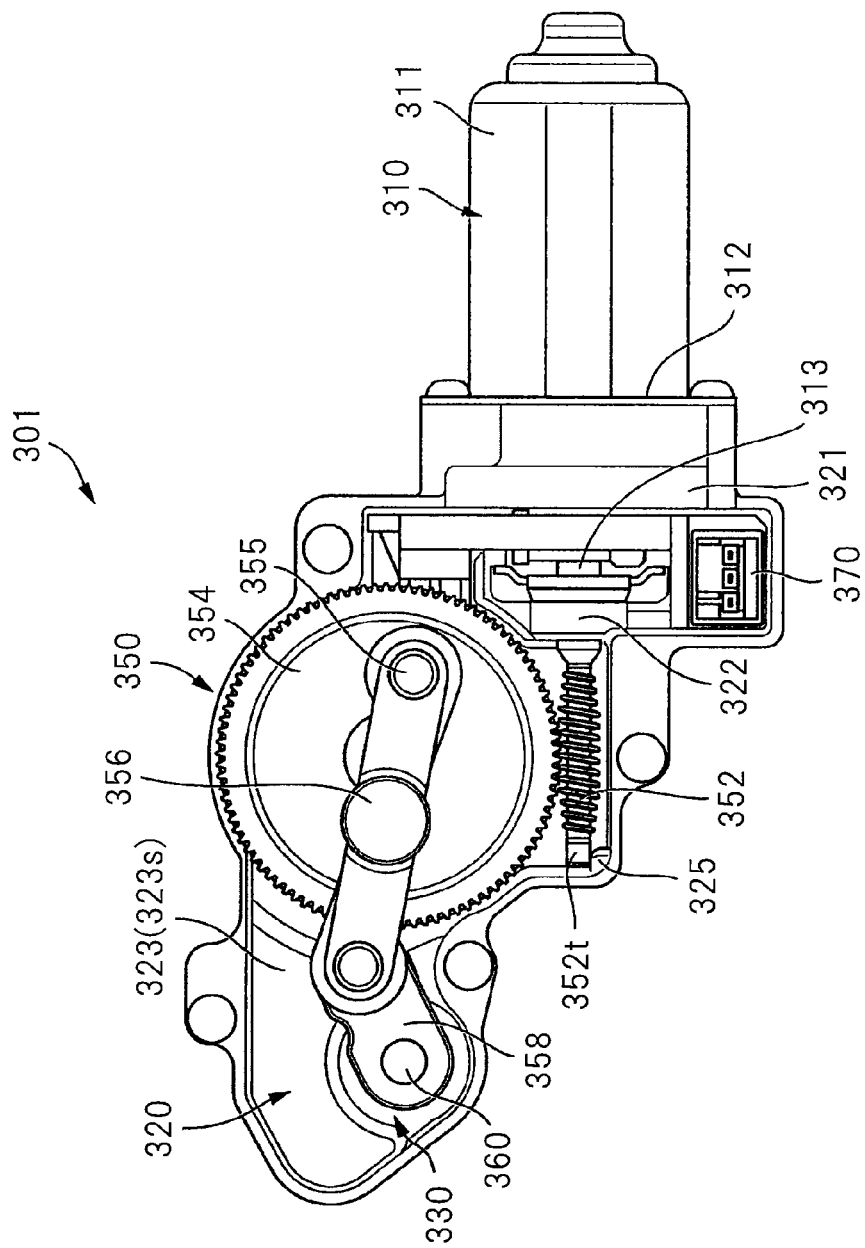
FIG. 28 is a plan view of an electric motor apparatus 301 according to a sixth embodiment.

FIG. 28 is a plan view of an electric motor apparatus 301 according to a sixth embodiment. FIG. 28 shows it with a housing cover off which will be described below.

The electric motor apparatus (motor apparatus) 301 is used, for example, as an electric motor apparatus for rear wiper driving (a wiper motor) pivoting a wiper arm such as a rear wiper (not shown). The electric motor 301 is provided on a back door of a vehicle. A rear wiper (a wiper arm (not shown)) wiping a rear window glass of the vehicle is attached to an output shaft 360 of the electric motor apparatus 301.

The electric motor apparatus 301 is provided with an electric motor section (a motor section) 310, a housing 320, a transmission mechanism 350, an output shaft 360, and the like.

The electric motor section 310 is a drive source swinging the rear wiper. The housing 320 accommodates the transmission mechanism 350 and supports the electric motor section 310 and the output shaft 360. The transmission mechanism 350 is connected to the electric motor section 310 to transmit a rotation force of the electric motor section 310. The output shaft 360 is coupled to the transmission mechanism 350 to transmit the rotation force of the electric motor section 310 to the rear wiper.

(Electric Motor Section)

The electric motor section 310 is a so-called "motor with brush" supplying power using a brush.

The electric motor section 310 is provided with a bottomed cylindrical motor housing 311, an armature (not shown) rotatably arranged within the motor housing 311, and the like.

The motor housing 311 is a member made of metal such as iron, and it is formed by press work for performing deep drawing or the like. A plurality of magnets is attached to an inner circumferential face of the motor housing 311 by adhesive or the like.

A flange 312 is formed on an opening end of the motor housing 311. The motor housing 311 is fixed to the housing 320 by bolts inserted into attaching holes (not shown) of the flange 312.

The armature has a motor shaft 313 and the like. The motor shaft 313 is a rod-shaped member made of metal such as iron. One end (not shown) of the motor shaft 313 is supported at a bottom portion of the motor housing 311. A distal end of the motor shaft 313 is rotatably supported by the housing 320 through a sliding bearing (a third bearing) 322.

(Housing)

The housing 320 is a member made of, for example, aluminum or the like. The housing 320 is formed by aluminum die-casting. The housing 320 has a motor attaching portion 321, a transmission mechanism accommodating portion 323, and a sleeve 330, which are formed integrally.

The electric motor section 310 is attached to the motor attaching portion 321. The motor attaching portion 321 and the transmission mechanism accommodating portion 323 communicate with each other through a through-hole (not shown). A motor shaft 313 (a worm shaft 352) is inserted into the through-hole.

A connector member (a connector unit) 370 for supplying power to the electric motor section 310 is assembled to the motor attaching portion 321. A harness (an external connector, not shown) extending from a power source (not shown) such as a battery is connected to the connector housing 370. Thereby, power is supplied to the electric motor section 310.

A sliding bearing 322 is formed on the motor attaching portion 321. The sliding bearing 322 is formed by cutting work. The sliding bearing 322 is arranged coaxially with the through-hole causing the motor attaching portion 321 and the transmission mechanism accommodating portion 323 to communicate with each other.

The transmission mechanism accommodating portion 323 is a bottomed box-shaped region whose one face is opened and it accommodates the transmission mechanism 350. The transmission mechanism 350 is arranged on a bottom face 323s of the transmission mechanism accommodating portion 323. A plate-shaped housing cover (not shown) is attached to an opening of the transmission mechanism accommodating portion 323 to close an internal space of the transmission mechanism accommodating portion 323.

The sleeve 330 is a cylindrical region provided on an outer face of the transmission mechanism accommodating portion 323 in a standing fashion. The sleeve 330 rotatably supports a base end portion 362 of the output shaft 360.

(Transmission Mechanism)

The transmission mechanism 350 is composed of a worm shaft 352 formed at a distal end of the motor shaft 313, a worm wheel 354 meshing with the worm shaft 352, a first coupling plate 356 connected to the worm wheel 354, and a second coupling plate 358 connected to the first coupling plate 356.

The worm shaft 352 is a shaft-shaped screw gear wheel formed at the distal end of the motor shaft 313. The worm shaft 352 is formed integrally with the motor shaft 313.

A base end of the worm shaft 352 is rotatably supported to the housing 320 via a sliding bearing 322 attached to the housing 320.

The worm shaft (shaft portion) 352 is supported to the housing 320 in a cantilever fashion. A distal end 352t of the worm shaft 352 is a free end, and it is not in contact with the housing 320.

The worm wheel 354 is a helical gear, and it is rotatably supported by a center shaft (not shown) provided on a bottom face 323s of the transmission mechanism accommodating portion 323 in a standing manner. The worm wheel 354 meshes with the worm shaft 352 so that a rotation force of the electric motor section 310 is transmitted from the worm shaft 352 to the worm wheel 354.

A rotation speed of the motor shaft 313 of the electric motor section 310 is reduced by the worm shaft 352 and the worm wheel 354. A large speed reduction ratio can be obtained by the worm shaft 352 and the worm wheel 354. Furthermore, this gear mechanism is smaller in backlash than the other gear mechanisms. The worm wheel 354 is rotated according to rotation of the worm shaft 352, but the inverse rotation is impossible.

The first coupling plate 356 is a member formed into an elongated flat plate shape. One end side of the first coupling plate 356 is pivotally connected to (supported by) a coupling shaft 355 provided on a side face (an upper face) of the worm wheel 354.

The other end side of the first coupling plate 356 is pivotally connected to (supported by) one end side of a second coupling plate 358.

The second coupling plate 358 is a member formed into a flat plate shape shorter than the first coupling plate 356. One end side of the second coupling plate 358 is pivotally connected to (supported by) the other end side of the first coupling plate 356. The other end side of the second coupling plate 358 is connected to the output shaft 360. The second coupling plate 358 and the output shaft 360 are connected to each other so as not to be capable to rotate relative to each other.

The output shaft 360 is rotatably supported to the housing 320 (the sleeve 330) via a sliding bearing (a first bearing) 332 described later, so that the other end side of the second coupling plate 358 is also rotatably supported to the housing 320.

The worm wheel 354 (the coupling shaft 355), the first coupling plate 356 and the second coupling plate 358 constitute a four-node link mechanism also including the housing 320 (the transmission mechanism accommodating portion 323).

The coupling shaft 355 is rotationally moved along a circumferential direction of the worm wheel 354 according to rotation of the worm wheel 354. The first coupling plate 356 coupled to the coupling shaft 355 swings the second coupling plate 358 according to the rotational movement of the coupling shaft 355. Thereby, the output shaft 360 fixed to the second coupling plate 358 is pivoted (pivoted in a reciprocating manner).

(Output Shaft)

The output shaft 360 is a rod-shaped member formed of metal such as, for example, iron. The output shaft 360 is provided toward the outside of the housing 320 (the transmission mechanism accommodating portion 323) in a projecting manner.

An entire length of the output shaft 360 varies correspondingly to vehicle types because it is properly set according to a vehicle type on which the electric motor apparatus 301 is mounted.

A base end portion 362 of the output shaft 360 is rotatably supported by the sleeve 330 of the housing 320. A center hole 331 extending along a longitudinal direction is formed in the sleeve 330. The center hole 331 communicates with the transmission mechanism accommodating portion 323 of the housing 320.

A base end of the output shaft 360 is coupled to the transmission mechanism 350. The base end of the output shaft 360 is connected to the second coupling plate 358. The output shaft 360 and the second coupling plate 358 are fitted to each other, for example, through a serration and a relative rotation therebetween is restricted.

A screw portion (not shown) is formed at a distal end of the output shaft 360. A rear wiper is fixed to this screw portion by a nut or the like.

The output shaft 360 is pivoted in a reciprocating fashion in response to swinging of the second coupling plate 358. The output shaft 360 is pivoted by one reciprocation for each rotation of the worm wheel 354. The rear wiper attached to the output shaft 360 is swung according to the reciprocating pivot of the output shaft 360.

(Sleeve and Resin-Made Bush)

FIG. 29 is a view showing the sleeve 330. FIG. 29(a) is sectional view and FIG. 29(b) is a rear view.

Figure 30:
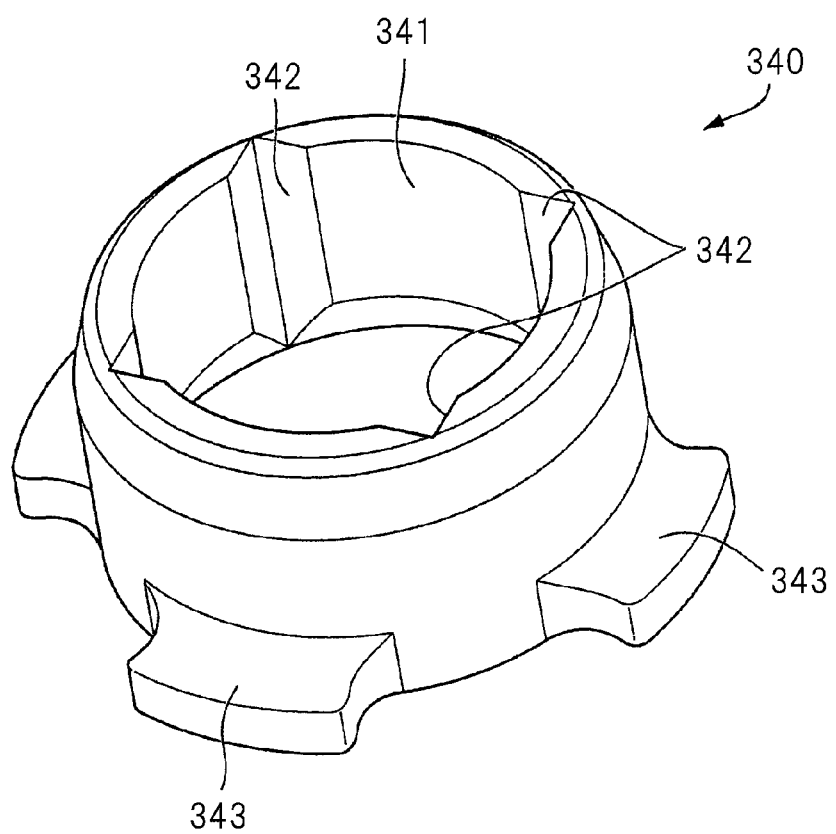
FIG. 30 is a perspective view of a resin-made bush 340.

FIG. 30 is a perspective view of a resin-made bush 340.

FIG. 31 is a view showing a whirl-stop mechanism of the resin-made bush 340. FIG. 31(a) shows a recessed portion 334 of an accommodating portion 333, and FIG. 31(b) shows a projection portion 343 of the resin-made bush 340.

The sleeve 330 rotatably supports the base end portion 362 of the output shaft 360. The base end portion 362 of the output shaft 360 is accommodated in the center hole 331 of the sleeve 330.

The sliding bearing 332 supporting the base end portion 362 of the output shaft 360 in a sliding contact manner is formed a region of the center hole 331 positioned on the distal end side of the sleeve 330. That is, a portion of an inner circumferential face of the center hole 331 comes in direct contact with an outer circumferential face of the output shaft 360 to rotatably support the output shaft 360. The sliding bearing 332 is formed by cutting the center hole 331.

An accommodating portion 333 larger in diameter than the diameter of the output shaft 360 is formed in a region of the center hole 331 positioned on the base end side of the sleeve 330. The accommodating portion 333 is formed so as to be opened to a back face of the sleeve 330 (the bottom face 323s of the transmission mechanism accommodating portion 323).

The resin-made bush 340 is accommodated in the accommodating portion 333. By pushing the resin-made bush 340 from the back face of the sleeve 330 (the bottom face 323s of the transmission mechanism accommodating portion 323) toward the accommodating portion 333, the resin-made bush 340 is accommodated in (attached to) the accommodating portion 333.

The resin-made bush (the second bearing) 340 is an approximately cylindrical member made of synthetic resin. The resin-made bush 340 is formed of, for example, POM (polyacetal) or the like. Besides POM, the resin-made bush 340 can be formed of PA (polyamide), PTFE (polytetrafluoroethylene) or the like.

The resin-made bush 340 supports the base end portion 362 of the output shaft 360 in a sliding contact manner like the sliding bearing 332. An inner circumferential face of the center hole 341 of the resin-made bush 340 comes in direct contact with an outer circumferential face of the output shaft 360 to rotatably support the output shaft 360.

Thus, the base end portion 362 of the output shaft 360 is supported by the sliding bearing 332 and the resin-made bush 340. The sliding bearing 332 and the resin-made bush 340 receive an external force applied to the output shaft 360 to support the output shaft 360 such that the output shaft 360 does not tilt.

The most base end side of the base end portion 362 of the output shaft 360 is supported by the resin-made bush 340. The resin-made bush 340 is smaller in mechanical strength than the sliding bearing 332. That is, the resin-made bush 340 has such a fragility that it is defeated by an external force applied to the output shaft 360 be deformed.

Therefore, when a force crossing in the axial direction acts on the distal end of the output shaft 360 by applying a strong external force exceeding an anticipated force to the rear wiper, the resin-made bush 340 is deformed.

The strong force exceeding an anticipated force is generated when a driver of a vehicle or another person presses the rear wiper in a direction reverse to the swinging direction of rear wiper or water attached to the rear wiper is frozen to adhere to the rear wiper.

When a strong force crossing in the axial direction acts on the distal end of the output shaft 360, in other words, when a strong bending moment acts on the output shaft 360, the resin-made bush 340 supporting the most base end side of the output shaft 360 is deformed. Therefore, the output shaft 360 can slightly tilt with the sliding bearing 332 as a starting point.

Thus, by supporting the most base end side of the base end portion 362 of the output shaft 360 by the resin-made bush 340 having fragility, such a drawback can be prevented that the output shaft 360 bites into the sliding bearing 332 when a strong external force exceeding an anticipated force is applied to the output shaft 360. The "biting" means that the output shaft 360 and the sliding bearing 332 is bonded to each other in a melting manner.

Even if the output shaft 360 tilts due to a strong bending moment acting thereon, it can continue to rotate without biting into the sliding bearing 332 while deforming the resin-made bush 340.

The conventional electric motor apparatus is configured such that, even if a strong bending moment has acted on an output shaft, the output shaft does not tilt. A sliding bearing is formed over an approximately whole region of a center hole of a sleeve to receive the strong bending moment. Thereby, such a drawback that the output shaft bites into the sliding bearing is prevented. Therefore, according to increase of the entire length of the output shaft, it is necessary to make the entire length of the sleeve (the sliding bearing) longer.

However, according to increase of the length of the sleeve, it becomes more difficult to perform a die cutting work of a mold for molding a sleeve or a cutting work of a sliding bearing. Furthermore, it is necessary to use sleeves with different lengths for respective vehicle types. That is, since it is necessary to prepare different housings corresponding to vehicle types, reduction of a manufacturing efficiency and cost rise are incurred.

On the other hand, the electric motor apparatus 301 allows the output shaft 360 to slightly tilt, when a strong bending moment acts on the output shaft 360. The resin-made bush 340 supporting a portion of the base end portion 362 of the output shaft 360 is deformed so that such a drawback is prevented that the output shaft 360 bites into the sliding bearing 332. Therefore, even if the entire length of the output shaft 360 becomes long, it is unnecessary to make the entire length of the sleeve 330 (the sliding bearing 332) long.

Therefore, it can be made easy to perform a die cutting work of a mold molding the sleeve 330 or a cutting work of the sliding bearing 332. Furthermore, even if the lengths of the output shafts 360 corresponding to respective vehicle types are different, the lengths of the sleeves are the same, so that it is unnecessary to prepare a plurality of housings 320. Therefore, improvement of the manufacturing efficiency and the cost reduction can be achieved.

Lubrication grooves 342 holding lubricant such as grease are formed on the inner circumferential face of the center hole 341 of the resin-made bush 340. Thereby, the output shaft 360 can be rotated smoothly for a long period of time.

Four projecting portions 343 projecting in a diametrical direction are integrally formed on one end portion of the resin-made bush 340. The four projecting portions 343 are arranged at intervals of 90 degrees. On the other hand, two recessed portions 334 corresponding to four projection portions 343 of the resin-made bush 340 are formed on a back face of the sleeve 330 (the bottom face 332s of the transmission mechanism accommodating portion 323) in the accommodating portion 333. One recessed portion 334 corresponds to two projection portions 343.

When the resin-made bush 340 is accommodated in the accommodating portion 333, four projection portions 343 are fitted into two recessed portions 334 two by two. Thereby, the resin-made bush 340 cannot rotate around the axial direction to the sleeve 330. That is, the whirl-stop mechanism of the resin-made bush 340 is constituted of four projection portions 343 of the resin-made bush 340 and two recessed portions 334 of the accommodating portion 333.

(Shaft Abutting Portion)

Figure 32:
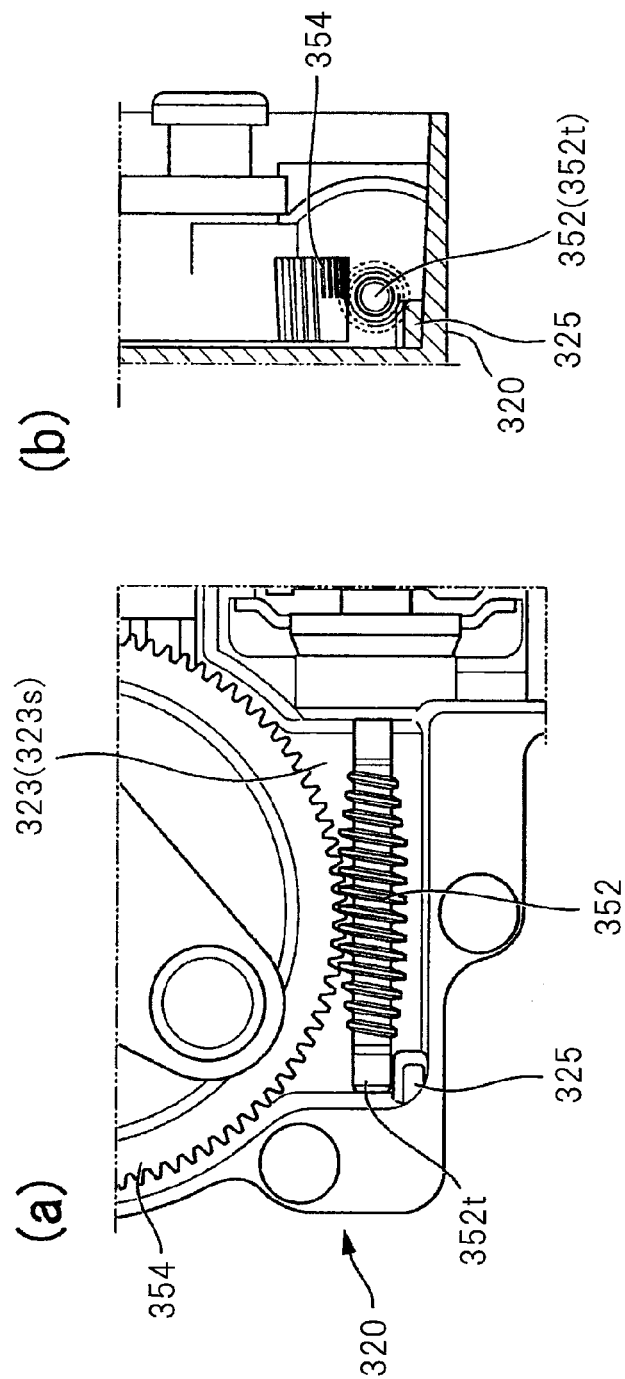
FIG. 32 is a view showing a shaft abutting portion 325.

FIG. 32 is a view showing a shaft abutting portion 325. FIG. 32(a) is a plan view, and FIG. 32(b) is a sectional view.

The worm shaft 352 connected to the motor shaft 313 is accommodated in the transmission mechanism accommodating portion 323 of the housing 320. A base end of the worm shaft 352 (the distal end of the motor shaft 313) is supported by a sliding bearing 322 attached to the housing 320. On the other hand, a distal end 352t of the worm wheel 352 is a free end which is not supported by a bearing or the like.

That is, the worm shaft 352 is a cantilever structure where it is supported by only the sliding bearing 322.

The shaft abutting portion 325 provided so as to stand up from the bottom face 323s of the transmission mechanism accommodating portion 323 is provided laterally of the distal end 352t of the worm shaft 352. The shaft abutting portion (the shaft abutting portion) 325 is provided on the side opposite to the worm wheel 354 regarding the worm shaft 352 laterally of the worm shaft 352.

The shaft abutting portion 325 is arranged at a position spaced away from the distal end 352t of the worm shaft 352 by several millimeters. The shaft abutting portion 352 comes close to the distal end 352t of the worm shaft 352 but it is not in contact with the distal end 352t.

When the a rotational force of the electric motor section 310 is transmitted from the worm shaft 352 to the worm wheel 354, there is such a case that the worm shaft 352 is deflected to the opposite side to the worm wheel 354 with a region of the worm shaft 352 supported by the sliding bearing 322 as a starting point.

Thus, when the worm shaft 352 is deflected, the distal end 352t of the worm shaft 352 abuts on the shaft abutting portion 325. Thereby, when the worm shaft 352 is deflected, plastic deformation or a crack is prevented from being generated.

In order to prevent such a drawback, it is thought that a both-end-support structure where the distal end 352t of the worm shaft 352 is also supported by a bearing is adopted.

However, a troublesome machining work is required in order to form a bearing (a sliding bearing) supporting the distal end 352t of the worm shaft 352.

It is necessary to perform a hole processing to the housing 320 in order to form a bearing for supporting the worm shaft 352 on the housing 320 (the transmission mechanism accommodating portion 323).

Since the sliding bearing 322 is formed on the motor attaching portion 321, the hole processing is easy.

On the other hand, a hole processing for forming a bearing for supporting the distal end 352t of the worm shaft 352 is performed by inserting a cutting tool from the through-hole causing the motor attaching portion 321 and the transmission mechanism accommodating portion 323 to communicate with each other and working a wall face or the like ahead thereof. Thus, since it is necessary to work a narrow and inner region by a slender cutting tool, a troublesome machining work with a high degree of difficulty is required.

Therefore, by providing the shaft abutting portion 325 provided from the bottom face 323s of the transmission mechanism accommodating portion 323 in a standing manner, the troublesome cutting work (a hole processing) with a high degree of difficulty is omitted in the electric motor apparatus 301.

Since the worm shaft 352 is sufficiently supported by the sliding bearing 322, a frequency of deflection of the worm shaft 352 is reduced. Therefore, by providing the shaft abutting portion 352, such a drawback as plastic deformation of the worm shaft 352 or crack generation can be prevented.

The shaft abutting portion 325 is formed in a standing manner along a die-cutting direction of the transmission mechanism accommodating portion 323 of the housing 320. The shaft abutting portion 325 is formed in a standing fashion along a die-cutting direction of a mold (not shown) molding the transmission mechanism accommodating portion 323. That is, the shaft abutting portion 325 is formed in a standing manner vertically from the bottom face 323s of the transmission mechanism accommodating portion 323 in an opening direction. Therefore, the abutting portion 325 is formed without causing cost rise.

As described above, in the electric motor apparatus 301, the sleeve 330 rotatably supporting the output shaft 360 is provided with the sliding bearing 332 and the resin-made bush 340. Thereby, when a strong bending moment acts on the output shaft 360, the resin-made bush 340 is deformed so that such a drawback can be prevented that the output shaft 360 bites into the sliding bearing 332.

Since the electric motor apparatus 301 allows the output shaft 360 to tilt slightly when the resin-made bush 340 is deformed, even if the entire length of the output shaft 360 is long, it is unnecessary to make the entire length of the sleeve 330 (the sliding bearing 332) long. That is, the sleeve 330 of the electric motor apparatus 301 can support output shafts 360 having various lengths.

Therefore, the die-cutting work of a mold molding the sleeve 330 or the cutting work of the sliding bearing 332 can be made easy. Furthermore, since the lengths of the sleeves 330 are the same, it is unnecessary to prepare a plurality of housings 320, so that improvement of a manufacturing efficiency and cost reduction can be achieved.

Furthermore, the electric motor apparatus 301 is provided with the shaft abutting portion 325 coming in close to the worm shaft 352 supported in the transmission mechanism accommodating portion 323 in a cantilever manner. When the worm shaft 353 is deflected, the distal end 352*t* of the worm shaft 352 abuts on the shaft abutting portion 325, so that such a drawback as plastic deformation of the worm shaft 352 or a crack generation therein can be prevented.
(Modified Examples of Shaft Abutting Portion)

Figure 33:
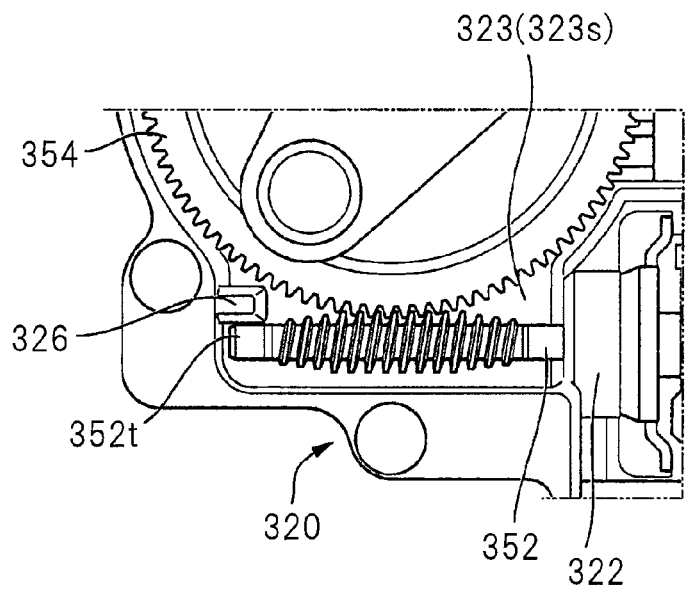
FIG. 33 is a view showing a first modified example (a shaft abutting portion 326) of the shaft abutting portion.
Figure 34:
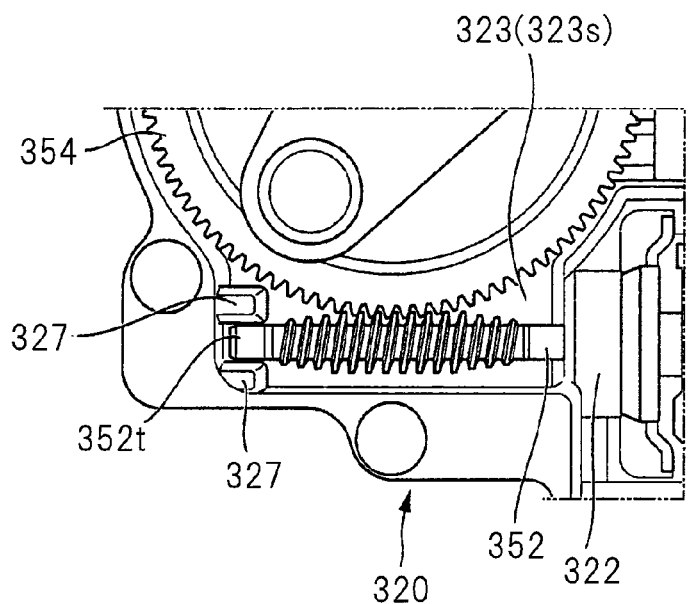
FIG. 34 is a view showing a second modified example (a shaft abutting portion 327) of the shaft abutting portion.
Figure 35:
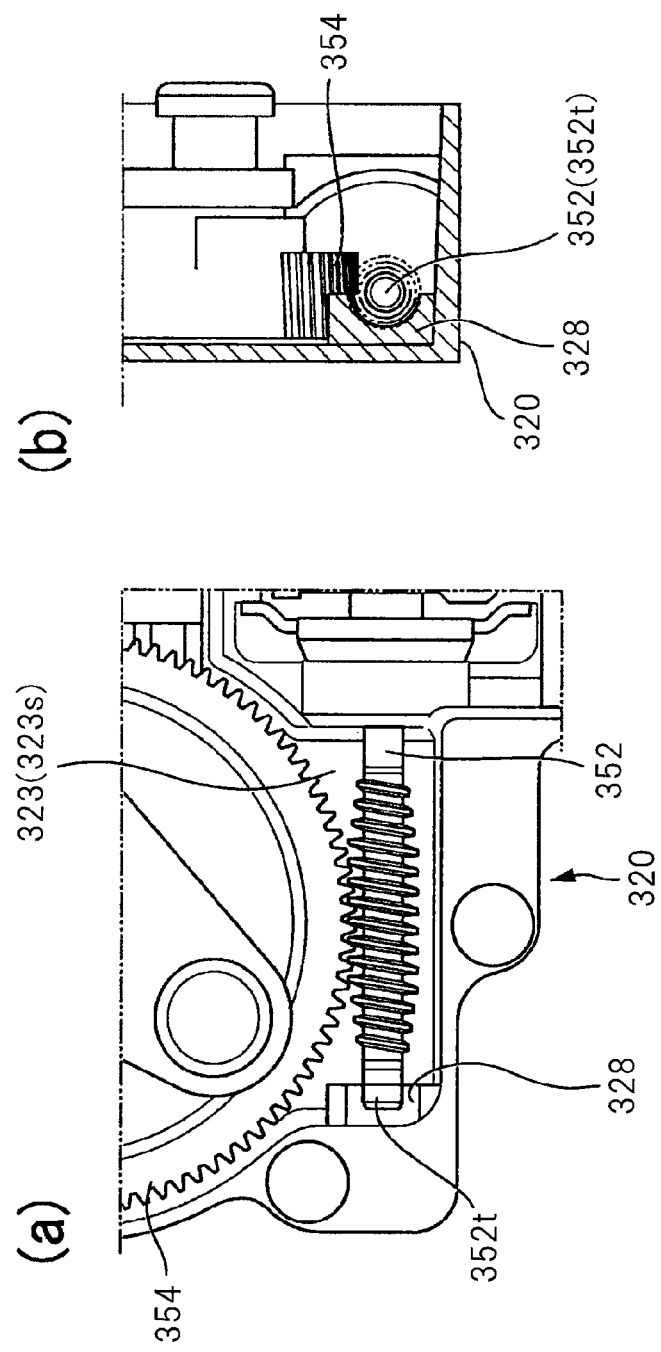
FIG. 35 is a view showing a third modified example (a shaft abutting portion 328) of the shaft abutting portion.
Figure 36:
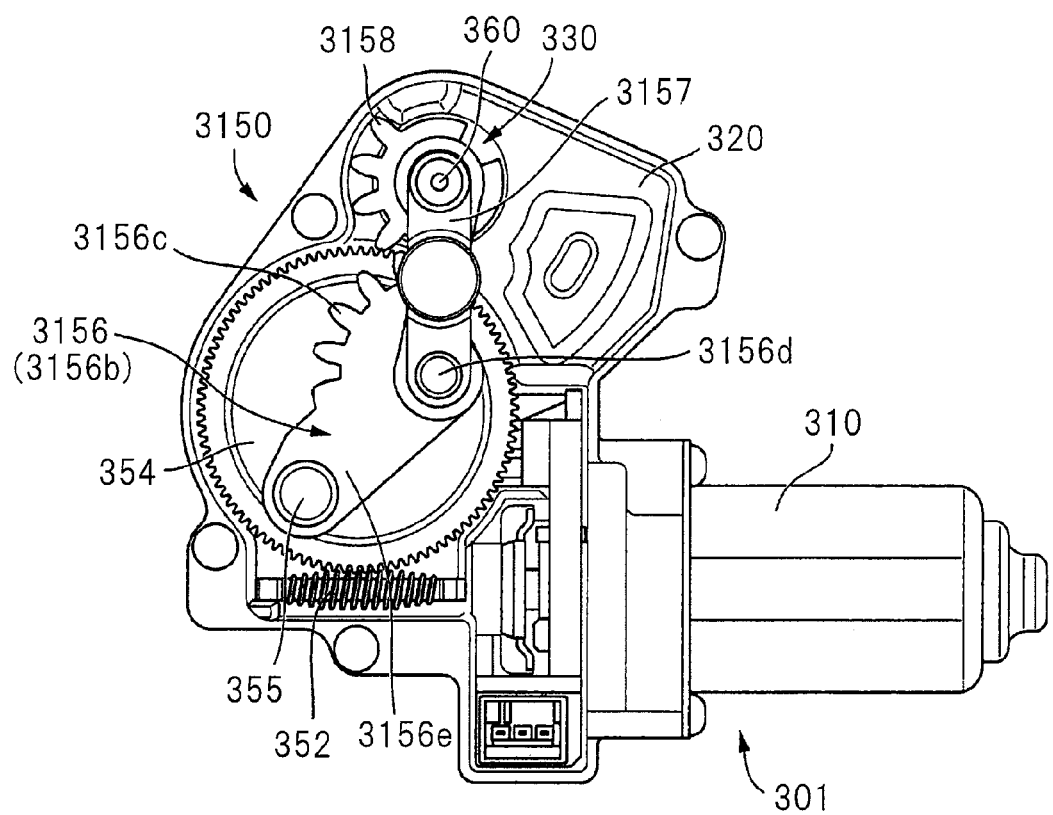
FIG. 36 is a view showing a modified example (a transmission mechanism 3150) of the transmission mechanism.

FIG. 33 is a view showing a first modified example (a shaft abutting portion 0326) of the shaft abutting portion. FIG. 34 is a view showing a second modified example (a shaft abutting portion 327) of the shaft abutting portion. FIG. 35 is a view showing a third modified example (a shaft abutting portion 328) of the shaft abutting portion.

Instead of the shaft abutting portion 325, either one of the shaft abutting portions 326 to 328 can be used.

The shaft abutting portion (shaft abutting portion) 326 is provided to the worm shaft 352 laterally of the same side as the worm wheel 354.

There is such a case that the worm shaft 352 is deflected so as to get close to the worm wheel 354 with a region of the worm shaft 352 supported by the sliding bearing 322 as the starting point. The shaft abutting portion 326 provides for such a case.

The shaft abutting portions (shaft abutting portions) 327 are provided to the worm shaft 352 laterally of both the same side as the worm wheel 354 and the opposite side thereto, respectively.

There is such a case that the worm shaft 352 is deflected in a direction getting close to the worm wheel 354 and in a direction departing therefrom, respectively, with a region of the worm shaft 352 supported by the sliding bearing 322 as the starting point. The shaft abutting portions 327 provide for such a case.

The shaft abutting portions (shaft abutting portions) 328 are provided to the worm shaft 352 laterally of both the same side as the worm wheel 354 and the opposite side thereto, respectively. Furthermore, the bottom face 323*s* of the transmission mechanism accommodating portion 323 is also formed to get close to the distal end 352*t* of the worm shaft 352. That is, the shaft abutting portion 328 is formed so as to have a shape (a semi-circular recessed portion) surrounding the distal end 352*t* of the worm shaft 352 from three directions.

There is such a case that the worm shaft 352 is deflected in a direction getting close to the worm wheel 354 and in a direction departing therefrom, and further in a vertical direction with a region of the worm shaft 352 supported by the sliding bearing 322 as the starting point. The shaft abutting portions 328 provide for such a case.
(Modified Example of Transmission Mechanism)

FIG. 26 is a view showing a modified example (a transmission mechanism 3150) of the transmission mechanism.

Instead of the transmission mechanism 350, the transmission mechanism 3150 can be used.

The transmission mechanism 3150 is composed of the worm shaft 352, the worm wheel 354, a power transmission member 3156 connected to the worm wheel 354, a coupling plate 3157 connected to the power transmission member 3156, and a second sector gear 3158 connected to the coupling plate 3157.

The power transmission member 3156 is formed of a flat plate shape metal, and it is provided with an elongated plate portion 3156*b*, and a fan-shaped first sector gear portion 3156*c* formed integrally with the plate portion 3156*b*.

An end portion 3156*e* of the plate portion 3156*b* is pivotally connected to (supported by) a coupling shaft 355 provided on a side face (an upper face) of the worm wheel 354.

The first sector gear portion 3156*c* of the power transmission member 3156 meshes with the second sector gear 3158.

The second sector gear portion 3158 is formed into a fan shape, and it is arranged outside the worm wheel 354. The output shaft 360 is fixed to a pivoting center of the second sector gear 3158.

A sector gear shaft 3156*d* is attached to a pivoting center of the first sector gear portion 3156*c*. An elongated plate-shaped coupling plate 3157 is disposed between the sector gear shaft 3156*d* and the output shaft 360.

The coupling plate 3157 is disposed between the sector gear shaft 3156*d* and the output shaft 360, so that a distance between the sector gear shaft 3156*d* and the output shaft 360 is kept constant.

The coupling shaft 355 is rotationally moved along the circumferential direction of the worm wheel 354 according to rotation of the worm wheel 354. The power transmission member 3156 and the coupling plate 3157 rotatably coupled to each other are swung by the rotational movement of the coupling shaft 355. The swinging is continuously repeated according to the rotational movement of the coupling shaft 355 such that a relative angle between the power transmission member 3156 and the coupling plate 3157 increases and decreases. When the coupling shaft 355 (the worm wheel 354) rotates one time, a series of movements where the relative angle between the power transmission member 3156 and the coupling plate 3157 increases and decreases are performed one time.

According to the swinging of the power transmission member 3156 and the coupling plate 3157, the first sector gear portion 3156*c* of the power transmission member 3156 is pivoted about the sector gear shaft 3156*d*. According to the pivoting of the first sector gear portion 3156*c*, the second sector gear 3158 meshing with the first sector gear portion 3156*c* and the output shaft 360 are pivoted.

The output shaft 360 is pivoted by one reciprocation according to one rotation of the worm wheel 354 (the coupling shaft 355).

The present invention is not limited to this embodiment, but it goes without saying that the present invention can be variously modified without departing from the gist of the present invention.

The housing 320 is not limited to the case where the transmission mechanism accommodating portion 323 and the sleeve 330 are formed integrally with each other. Such a case that the transmission mechanism accommodating portion 323 and the sleeve 330 are formed individually can be adopted.

The case where the resin-made bush 340 is used as the second bearing has been described, but this invention is not limited to this case. A bush (bearing) formed of gold, silver, resin or the like can be used as the second bearing.

The second bearing is only required to be formed of material weaker in mechanical strength than the first bearing. Therefore, when the first bearing is formed of iron, a bush (a bearing) formed of copper, aluminum, gold, silver, resin and the like can be used as the second bearing.

The case where the number of projection portions 343 of the resin-made bush 340 is four, and the number of recessed portions 334 of the accommodation portion 333 is two has been described, but the present invention is not limited to this case. If a structure where the resin-made bush 340 cannot be rotated relative to the accommodating portion 333 is adopted, the numbers of projection portions 343 and recessed portions 334 can be set arbitrarily.

The case where the worm shaft 352 and the worm wheel 354 cannot be rotated reversely (the case where a self-lock mechanism is provided) has been described, but the present invention is not limited to this case. A case where the worm shaft 352 and the worm wheel 354 can be rotated reversely (the case where a self-lock mechanism is not provided) can be adopted.

Seventh Embodiment

Hereinafter, a seventh embodiment of the present invention will be described in detail with reference to the drawings.

Figure 37:
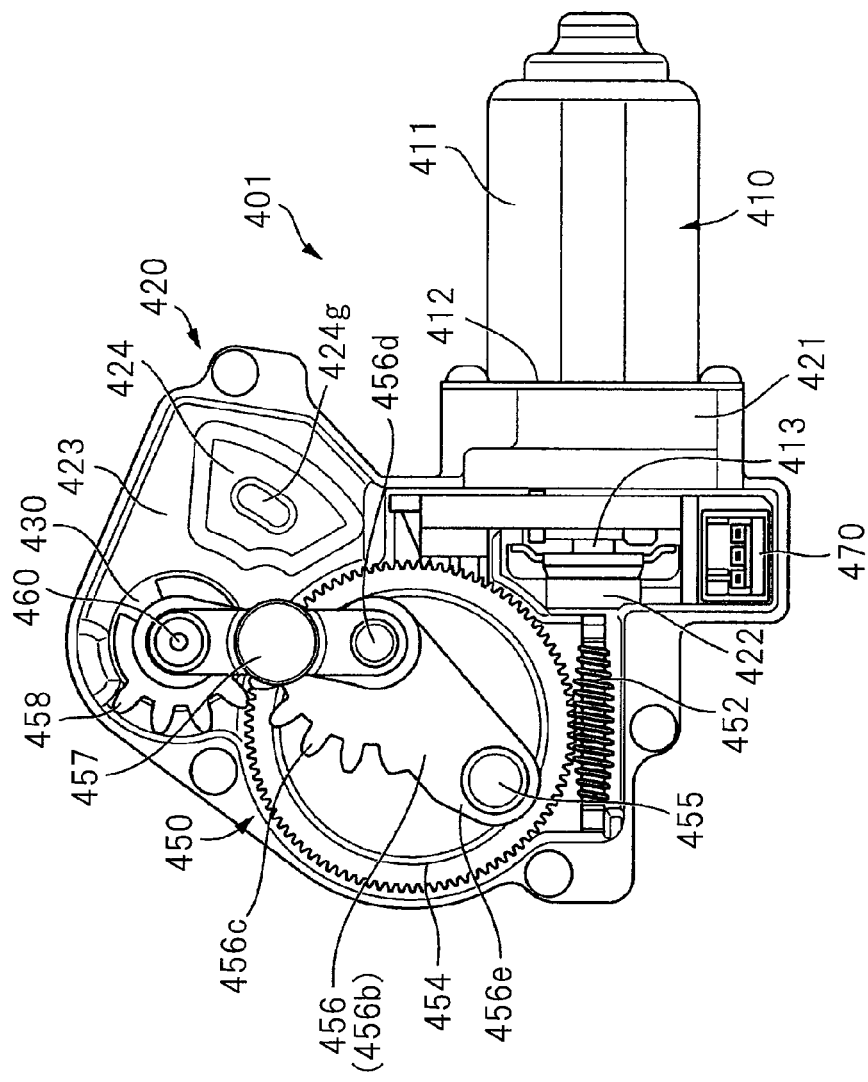
FIG. 37 is a plan view of an electric motor apparatus 401 according to a seventh embodiment.

FIG. 37 is a plan view of an electric motor apparatus 401 according to a seventh embodiment. FIG. 37 shows it with a housing cover off which will be described below.

The electric motor apparatus (motor apparatus) 401 is used, for example, as an electric motor apparatus for rear wiper driving (a wiper motor) pivoting a wiper arm such as a rear wiper (not shown). The electric motor 301 is provided to a back door of a vehicle. A rear wiper (a wiper arm (not shown)) wiping a rear window glass of the vehicle is attached to an output shaft 460 of the electric motor apparatus 401.

The electric motor apparatus 401 is provided with an electric motor section (a motor section) 410, a housing 420, a transmission mechanism 450, an output shaft 460, and the like.

The electric motor section 410 is a drive source swinging the rear wiper. The housing 420 accommodates the transmission mechanism 450 and supports the electric motor section 410 and the output shaft 460. The transmission mechanism 450 is connected to the electric motor section 410 to transmit a rotation force of the electric motor section 410. The output shaft 460 is coupled to the transmission mechanism 450 to transmit the rotation force of the electric motor section 410 to the rear wiper.

(Electric Motor Section)

The electric motor section 410 is a so-called "motor with brush" supplying power using a brush.

The electric motor section 410 is provided with a bottomed cylindrical motor housing 411, an armature (not shown) rotatably arranged within the motor housing 411, and the like.

The motor housing 411 is a member made of metal such as iron, and it is formed by press work for performing deep drawing or the like. A plurality of magnets is attached to an inner circumferential face of the motor housing 411 by adhesive or the like.

A flange 412 is formed on an opening end of the motor housing 411. The motor housing 411 is fixed to the housing 420 by bolts inserted into attaching holes (not shown) of the flange 412.

The armature has a motor shaft 413 and the like. The motor shaft 413 is a rod-shaped member made of metal such as iron. One end (not shown) of the motor shaft 413 is supported at a bottom portion of the motor housing 411. A distal end of the motor shaft 413 is rotatably supported by the housing 420 through a sliding bearing 422.

(Housing)

The housing 420 is a member made of, for example, aluminum or the like. The housing 420 is formed by aluminum die-casting. The housing 420 has a motor attaching portion 421, a transmission mechanism accommodating portion 423, and a sleeve 430, which are formed integrally.

The electric motor section 410 is attached to the motor attaching portion 421. The motor attaching portion 421 and the transmission mechanism accommodating portion 423 communicate with each other through a through-hole (not shown). A motor shaft 413 (a worm shaft 452) is inserted into the through-hole.

A connector member (a connector unit) 470 for supplying power to the electric motor section 410 is assembled to the motor attaching portion 421. A harness (an external connector, not shown) extending from a power source (not shown) such as a battery is connected to the connector housing 470. Thereby, power is supplied to the electric motor section 410.

A sliding bearing 422 is formed on the motor attaching portion 421. The sliding bearing 422 is formed by cutting work. The sliding bearing 422 is arranged coaxially with the through-hole causing the motor attaching portion 421 and the transmission mechanism accommodating portion 423 to communicate with each other.

The transmission mechanism accommodating portion 423 is a bottomed box-shaped region whose one face is opened and it accommodates the transmission mechanism 450. The transmission mechanism 450 is arranged on a bottom face 423s of the transmission mechanism accommodating portion 423. A plate-shaped housing cover (not shown) is attached to an opening of the transmission mechanism accommodating portion 423 to close an internal space of the transmission mechanism accommodating portion 423.

The sleeve 430 is a cylindrical region provided on an outer face of the transmission mechanism accommodating portion 423 in a standing fashion. The sleeve 430 rotatably supports a base end portion 462 of the output shaft 460.

(Transmission Mechanism)

The transmission mechanism 450 is composed of a worm shaft 452, a worm wheel 454, a power transmission member 456 coupled to the worm wheel 454, a coupling plate 457 connected to the power transmission member 456, and a second sector gear 458 connected to the coupling plate 457.

The worm shaft 452 is a shaft-shaped screw gear wheel formed at the distal end of the motor shaft 413. The worm shaft 452 is formed integrally with the motor shaft 413.

A base end of the worm shaft 452 is rotatably supported to the housing 420 via a sliding bearing 422 attached to the housing 420.

The worm wheel (sliding member) 454 is a helical gear, and it is rotatably supported by a center shaft (not shown) provided on a bottom face 423s of the transmission mechanism accommodating portion 423 in a standing manner. The worm wheel 454 meshes with the worm shaft 452 so that a rotation force of the electric motor section 410 is transmitted from the worm shaft 452 to the worm wheel 454.

A rotation speed of the motor shaft 413 of the electric motor section 410 is reduced by the worm shaft 452 and the worm wheel 454. A large speed reduction ratio can be obtained by the worm shaft 452 and the worm wheel 454. Furthermore, this gear mechanism is smaller in backlash than the other gear mechanisms. The worm wheel 454 is rotated according to rotation of the worm shaft 452, but the inverse rotation is impossible.

The power transmission member (the sliding member, the both-face sliding member, the link member) 456 is a member formed into an elongated flat plate shape. The power transmission member 456 is formed by performing press work to, for example, a high-tension steel (High Tensile Strength Steel). The power transmission member 456 has an elongated plate portion 456b and a fan-shaped first sector gear portion (a sector gear portion) 456c formed integrally with the plate portion 456b.

An end portion 456e of the plate portion 456b is pivotally connected to (supported by) the coupling shaft 455 provided on a side face (an upper face) of the worm gear 454.

The first sector gear portion 456c of the power transmission member 456 meshes with the second sector gear 458.

The second sector gear (the sliding member, the sector gear) 458 is a gear formed into a fan shape. The second sector gear 258 is formed by performing press work to, for example, a high-tension steel. The second sector gear 458 is arranged on the side of an outer circumstance of the worm wheel 454. The output shaft 460 is fixed to the center of the second sector gear 458.

The sector gear shaft 456d is attached to the center of the first sector gear section 456c.

The sector gear shaft 456d and the output shaft 460 are rotatably coupled with an elongated plate-shaped coupling plate 457 (the sliding member, the connection sliding member), respectively. The coupling plate 457 is formed by performing press work to a high-tension steel.

The coupling plate 457 is disposed between the sector gear shaft 456d and the output shaft 460, so that a distance between the sector gear shaft 456d and the output shaft 460 is kept constant.

The worm wheel 454 (the coupling shaft 455), the power transmission member 456, the coupling plate 457, and the housing 420 (the transmission mechanism accommodating portion 423) collectively constitute a four-joint link mechanism.

The coupling shaft 455 is rotationally moved along a circumferential direction of the worm wheel 454 according to rotation of the worm wheel 454. The power transmission member 456 coupled to the coupling shaft 455 swings the coupling plate 457 according to the rotational movement of the coupling shaft 455. A motion where a relative angle between the power transmission member 456 and the coupling plate 457 increases and decreases is continuously repeated according to the rotational movement of the coupling shaft 455. When the coupling shaft 455 (the worm wheel 354) rotates one time, a series of movements where the relative angle between the power transmission member 456 and the coupling plate 457 increases and decreases are performed one time.

According to the swinging of the power transmission member 456 and the coupling plate 457, the first sector gear portion 456c of the power transmission member 456 is pivoted about the output shaft 460 (the sector gear shaft 456). Thereby, the second sector gear 458 meshing with the first sector gear portion 456c and the output shaft 460 are pivoted. The output shaft 460 is pivoted by one reciprocation according to one rotation of the worm wheel 454 (the coupling shaft 455).

(Output Shaft)

The output shaft 460 is a rod-shaped member formed of metal such as, for example, iron. The output shaft 460 is provided toward the outside of the housing 420 (the transmission mechanism accommodating portion 423) in a projecting manner.

An entire length of the output shaft 460 varies corresponding to vehicle types because it is properly set according to a vehicle type on which the electric motor apparatus 401 is mounted.

A base end portion 462 of the output shaft 460 is rotatably supported by the sleeve 430 of the housing 420. A center hole 431 extending along a longitudinal direction is formed in the sleeve 430. The center hole 431 communicates with the transmission mechanism accommodating portion 423 of the housing 420.

A base end of the output shaft 460 is coupled to the transmission mechanism 450. The base end of the output shaft 460 is connected to the second sector gear 458. The output shaft 460 and the second sector gear 458 are fitted to each other, and not rotated with respect to each other.

A screw portion (not shown) is formed at a distal end of the output shaft 460. A rear wiper is fixed to the screw portion by a nut or the like.

The output shaft 460 is pivoted in a reciprocating fashion in response to swinging of the second sector gear 458. The output shaft 460 is pivoted by one reciprocation for each rotation of the worm wheel 454. The rear wiper attached to the output shaft 460 is swung according to the reciprocating pivot of the output shaft 460.

(Sliding Member)

Figure 38:
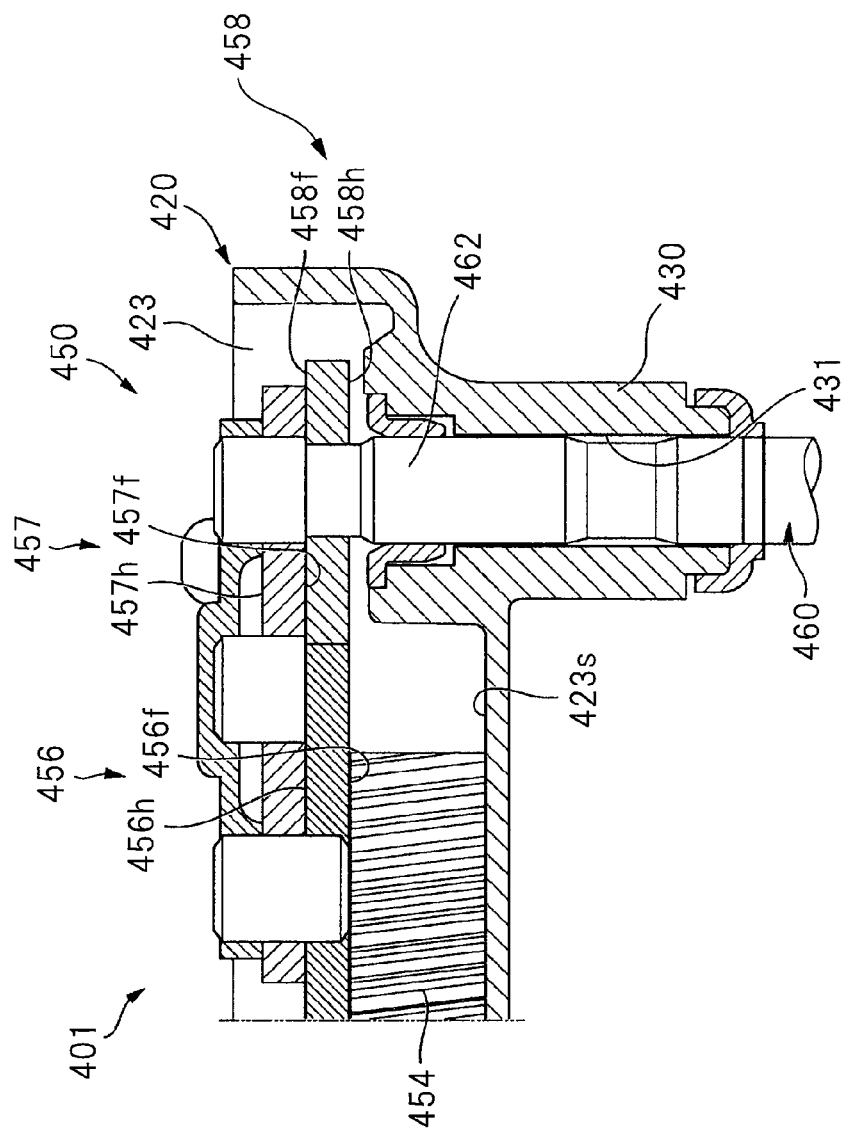
FIG. 38 is a sectional view of a transmission mechanism 450.

FIG. 38 is a sectional view of the transmission mechanism 450.

FIG. 39 is a view showing the coupling plate 457 and the second sector gear 458, FIG. 39(a) is a plan view of the coupling plate 457, FIG. 39(b) is a sectional view of an outer edge of the coupling plate 457, and FIG. 39(c) is a plan view of the second sector gear 458.

The power transmission member 456, the coupling plate 457 and the second sector gear 458 of members constituting the transmission mechanism 450 are members (sliding members) swung or pivoted while they coming in sliding contact with (be sliding) one another.

The power transmission member 456, the coupling plate 457 and the second sector gear 458 are flat plate-shaped members, respectively, and they are formed by performing press work (punching) to a sheet metal (a high-tension steel) with a thickness of about 3 mm or the like.

Therefore, the power transmission member 456, the coupling plate 457 and the second sector gear 458 have machined faces 456f, 457f and 458f to which press work is performed and back faces 456h, 357h, 358h facing the machined faces 456f, 457f and 458f back to back. The machined faces 456f, 457f and 458f are faces on which a punch (a male die) abuts and the back faces 456h, 457h, 458h are faces on which a die (a female die) abuts (is placed), when press work is performed.

When a sheet metal is subjected to press work (punching work), a droop "D" or a burr "B" is formed in a region through which the punch has passed.

As shown in FIG. 39(b), in the coupling plate 457, for example, a droop "D" and a burr "B" are formed in an inner face of an outer peripheral face orthogonal to the machined face 457f and the back face 457h. The side of the machined face 457f of the inner face of the outer peripheral face constitutes a sheared face to be formed with the droop "D". The side of the back face 457h constitutes a broken face to be formed with the burr "B". The burr "B" projects on the side of the back face 457h to be formed in a standing fashion vertically from the back face 457h.

A droop "D" and a burr "B" are also formed on an inner face of the through-hole of the coupling plate 457. When the through-hole is formed simultaneously with punching the coupling plate 457 from a sheet metal, both of an inner face of a burr "B" formed on an inner face of the outer peripheral face and a burr "B" formed on the through-hole project to the side of the back face 457h.

In the case where the through-hole is formed after the coupling plate 457 has been punched out from the sheet metal, there is such a case that projecting directions of the burr "B" formed on the inner face of the outer peripheral face and the burr "B" formed on the inner face of the through-hole are reversed to each other.

Similarly, burrs "B" projecting from the back faces 456h are also formed on inner faces of the outer peripheral faces of the power transmission member 456 and the second sector gear 458.

It is desirable to completely remove the burrs "B" formed on the outer peripheral faces of the power transmission member 456, the coupling plate 457 and the second sector gear 458. However, there is also such a case that a burr-removing work is insufficient or a burr-removing work is not performed.

Incidentally, the burr "B" formed on the inner face of the through-hole is almost completely removed since the shaft or the like is fitted into the through-hole.

When the transmission mechanism 450 is assembled in such a state that burrs "B" remain on the outer peripheral faces of the power transmission member 456, the coupling plate 457 and the second sector gear 458, drawbacks described below occur.

The power transmission member 456, the coupling plate 457 and the second sector gear 458 are arranged so as to overlap with one another to come in sliding contact with one another. The power transmission member 456 and the coupling plate 457 come in sliding contact with each other, and the coupling plate 457 and the second sector gear 458 come in sliding contact with each other.

At this time, for example, when the back face 456h of the power transmission member 456 and the back face 457h of the coupling plate 457 come in sliding contact with each other, the burr "B" projecting from the back face 456h and the burr "B" projecting from the back face 457h come in contact with each other so that they bite into each other. The biting means melt-bonding between metals due to frictional heat. Therefore, such a drawback that sliding between the power transmission member 456 and the coupling plate 457 is blocked occurs.

Furthermore, there is a possibility that noises are generated due to rubbing of burrs "B" against each other or a wear resistance (durability) of the power transmission member 456 or the coupling plate 457 lowers.

Therefore, the transmission mechanism 450 of the electric motor apparatus 401 is configures such that burrs "B" formed on the power transmission member 456, the coupling plate 457 and the second sector gear 458 do not come in contact with one another.

Specifically, the second sector gear 458 is arranged such that the back face 458h faces the side of the bottom face 423s of the transmission mechanism accommodating portion 423 (the housing 420). Therefore, the machined face 58f of the second sector gear 58 faces the opening side to come in sliding contact with the coupling plate 457.

The coupling plate 457 is arranged such that the back face 457h faces the opening side. Therefore, the machined face 457f of the coupling plate 457 faces the side of the bottom face 423s of the transmission mechanism accommodating portion 423 (the housing 420) to come in sliding contact with the second sector gear 458.

Thus, since the coupling plate 457 and the second sector gear 458 is configured such that the machined faces 457f and 458f come in sliding contact with each other, the burrs "B" do not come in contact with each other. Therefore, the coupling plate 457 and the second sector gear 458 can slide or pivot smoothly.

The power transmission member 456 is arranged such that the back face 456h faces the opening side. Therefore, the machined face 456f of the power transmission member 456 faces the side of the bottom face 423s of the transmission mechanism accommodating portion 423 (the housing 420) to come in sliding contact with the worm wheel 454.

Thus, since the power transmission member 456 causes the machined face 456f to come in sliding contact with the worm wheel 454, the burr "B" is prevented from coming in contact with the side face of the worm wheel 454. Therefore, the power transmission member 456 and the worm wheel 454 can slide or rotate smoothly.

On the other hand, the back face 456h of the power transmission member 456 comes in sliding contact with the machined face 457f of the coupling plate 457. Therefore, the burr "B" of the power transmission member 456 comes in contact with the machined face 457f of the coupling plate 457.

When a sliding movement area of the power transmission member 456 to the worm wheel 454 and a sliding movement area of the power transmission member 456 to the coupling plate 457 are compared with each other, the former (the sliding movement area to the worm wheel 454) is larger than the latter several times.

Therefore, by avoiding that the burr "B" of the power transmission member 456 comes in contact with the worm wheel 454, the burr "B" is brought into contact with the coupling plate 457. The burr "B" of the burrs "B" of the power transmission member 456 coming in contact with the coupling plate 457 is only one formed on the first sector gear portion 456c. Furthermore, contact between burrs "B" is avoided. Therefore, a possibility of occurrence of a drawback such as described above is low.

The coupling plate 457 and the second sector gear 458 can be formed in a line-symmetric shape regarding an imaginary line extending through the through-hole or the center hole.

However, when the coupling plate 457 or the second sector gear 458 is formed into a line-symmetric shape, there is such a possibility that an attaching direction of the coupling plate 457 or the second sector gear 458 is missed at an assembling time of the transmission mechanism 450. That is, since the machined face 457f, 458f and the back face 457h, 458h cannot be distinguished from each other, there is a possibility that the machined face 457f, 458f and the back face 457h, 458h are assembled to be become opposite to each other. In such a case, the above-described drawback occurs.

Therefore, as shown in FIG. 39, the coupling plate 457 and the second sector gear 458 are formed into a non-symmetric shape.

The coupling plate 457 is composed of ring-shaped connecting portions 457s at both ends thereof, and a rectangular central portion 457t coupling the connecting portions. Portions at which the connecting portions 457s and the central portion 457t connect to each other are formed into a non-symmetric shape.

Incidentally, a sectional area of the central portion 457t is set to become slightly larger than the sectional area of the connecting portion 457s. This is because weight reduction is achieved while strength is secured.

(Sliding Contact Face)

As shown in FIG. 37, a sliding contact face 424 coming in sliding contact with the power transmission member 456 is formed on the bottom face 423s of the transmission mechanism accommodating portion 423 (the housing 420). The sliding contact face 424 is formed on the outer circumferential sides of the worm wheel 454 and the second sector gear 458.

When the power transmission member 456 slides so that the first sector gear portion 456c of the power transmission member 456 projects from the side face (the upper face) of the worm wheel 454 to the outer circumferential side, the machined face 456f of the power transmission member 456 comes in contact with the sliding contact face 424. Thereby, the first sector gear portion 456c of the power transmission member 456 slides while being supported by the sliding contact face 424.

The sliding contact face 242 comes in sliding contact with a region of the machined face 456f of the power transmission member 456 except for the first sector gear portion 456c. That is, the sliding contact face 424 does not come in sliding contact with a region meshing with the second sector gear 458 (the first sector gear portion 456c) of the distal end side of the power transmission member 456.

When the first sector gear portion 456c and the second sector gear 458 mesh with each other, sliding contact on the sliding contact face 424 causes noises or vibrations. Therefore, the sliding contact face 424 is set so as not to come in sliding contact with the first sector gear portion 456c.

Furthermore, since the sliding contact face 424 comes in sliding contact with only a portion of the distal end side of the power transmission member 456, a contact area between the power transmission member 456 and the sliding contact face 424 becomes smaller than that of the conventional art. Therefore, such a drawback that a sliding movement (contact) resistance between the power transmission member 456 and the sliding contact face 424 becomes large, so that sliding movement of the power transmission member 456 is blocked or the power transmission member 456 bits into the sliding contact face 424 is prevented from occurring.

Furthermore, a recessed portion (a first recessed portion) 424g holding grease is formed at a central portion of the sliding contact face 424. The grease is held in the recessed portion 424g, so that the sliding movement (contact) resistance between the power transmission member 456 and the sliding contact face 424 is prevented from increasing.

As described above, in the electric motor apparatus 401, the coupling plate 457 and the second sector gear 458 of the transmission mechanism 450 are configured such that the machined face 457f and 458f come in sliding contact with each other. Therefore, burrs "B" projecting from the back faces 457h and 458h of the coupling plate 457 and the second sector gear 458 do not come in contact with each other. Accordingly, the coupling plate 457 and the second sector gear 458 can slide or pivot smoothly.

Furthermore, in the electric motor apparatus 401, the machined face 456f of the power transmission member 456 respectively coming in sliding contact with the coupling plate 457 and the worm wheel 454 is set to the side where the sliding contact area becomes large.

When a sliding movement area of the power transmission member 456 to the worm wheel 454 and a sliding movement area of the power transmission member 456 to the coupling plate 457 are compared with each other, the former is larger than the latter. Therefore, the machined face 456f of the power transmission member 456 is arranged so as to come in sliding contact with the worm wheel 454.

Therefore, the power transmission member 456 and the worm wheel 454 can slide or rotate smoothly.

On the other hand, since the back face 456h of the power transmission member 456 comes in sliding contact with the machined face 457f of the coupling plate 457, the burr "B" of the power transmission member 456 comes in contact with the machined face 457f of the coupling plate 457. However, a portion of the burr "B" of the power transmission member 456 only comes in contact with the coupling plate 457. Therefore, such a possibility is low that sliding movement of the power transmission member 456 and the coupling plate 457 is blocked.

Furthermore, the coupling plate 457 and the second sector gear 458 are formed into a non-symmetric shape. Therefore, the machined face 456f, 458f and the back face 457h, 458f can be prevented from being assembled in the opposite directions.

In addition, the sliding contact face 424 coming in sliding contact with the power transmission member 456 is formed on the bottom face 423s of the transmission mechanism accommodating portion 423 (the housing 420). The sliding contact face 424 does not come in sliding contact with the first sector gear portion 456c at the distal end side of the power transmission member 456. Therefore, when the first sector gear portion 456c and the second sector gear 458 mesh with each other, it can be avoided that sliding movement on the sliding contact face 424 causes noises or vibrations.

Furthermore, such a drawback that the sliding movement (contact) resistance between the power transmission member 456 and the sliding contact face 424 becomes large so that sliding movement of the power transmission member 456 is blocked or the power transmission member 456 bits into the sliding contact face 424 is prevented from occurring.

(Modified Example of Transmission Mechanism)

Figure 40:
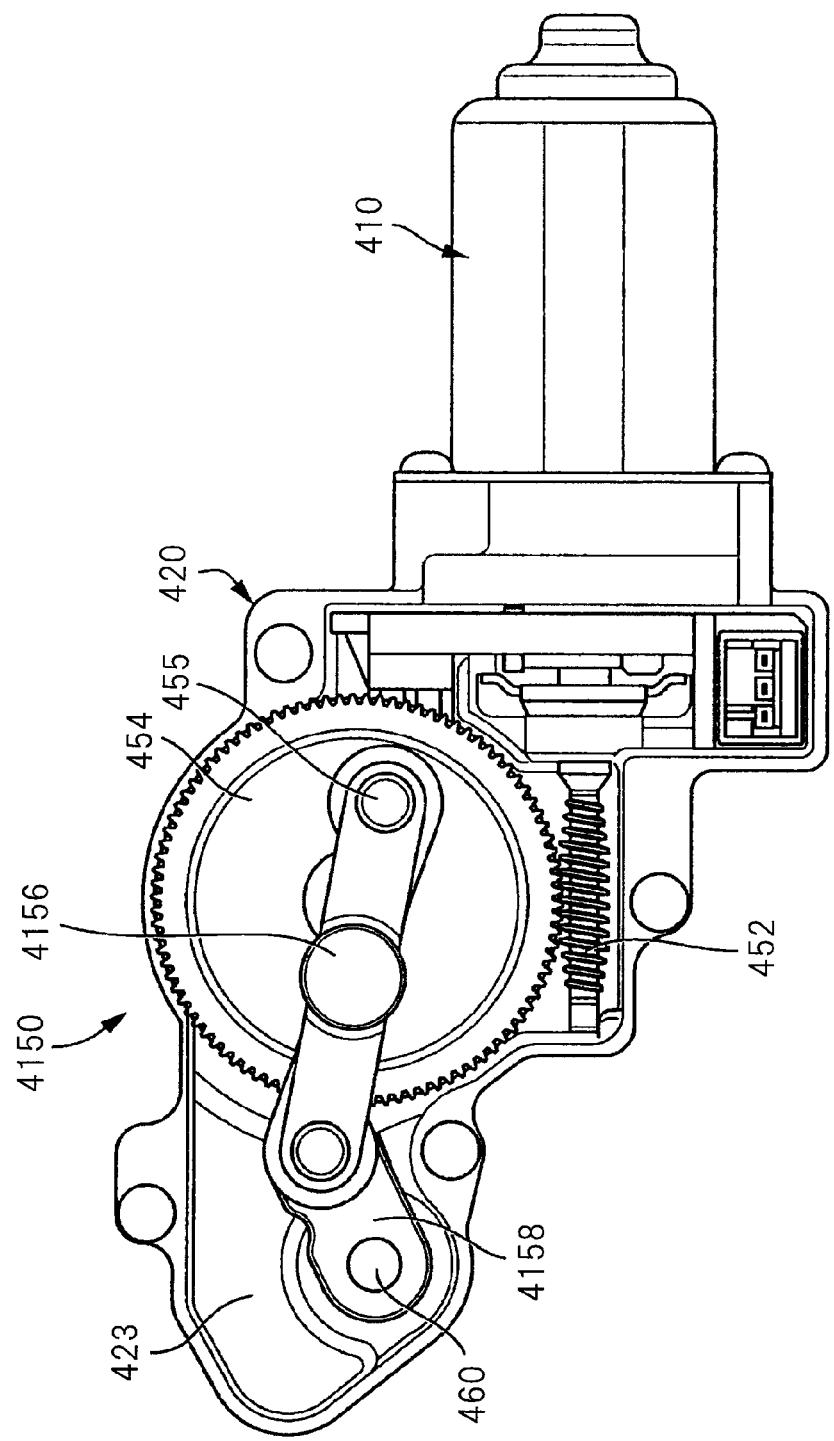
FIG. 40 is a plan view showing a modified example (a transmission mechanism 4150) of the transmission mechanism.

FIG. 40 is a plan view showing a modified example (a transmission mechanism 4150) of the transmission mechanism.

Figure 41:
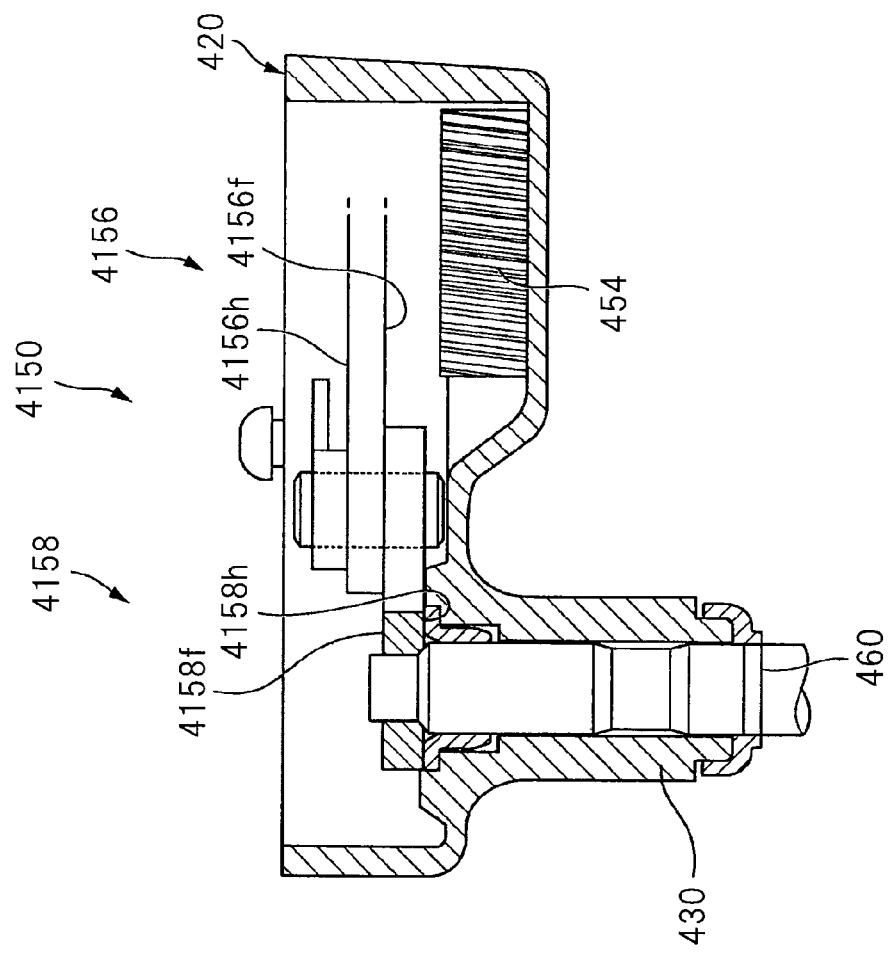
FIG. 41 is a sectional view of the transmission mechanism 4150.

FIG. 41 is a sectional view of the transmission mechanism 4150.

The transmission mechanism 4150 can be used instead of the transmission mechanism 450.

The transmission mechanism 4150 is composed of the worm shaft 452 formed at the distal end of the motor shaft 413, the worm wheel 454 meshing with the worm shaft 452, a first coupling plate 4156 connected to the worm wheel 454, and a second coupling plate 4158 connected to the first coupling plate 4156.

The first coupling plate (the sliding member) 4156 is a member formed into an elongated flat plate shape. On end side of the first coupling plate 4156 is pivotally connected to (supported by) the coupling shaft 455 provided on the side face (the upper face) of the worm wheel 454.

The other end side of the first coupling plate 4156 is pivotally connected to (supported by) one end side of the second coupling plate 4158.

The second coupling plate (a sliding member) 4158 is a member formed into a flat plate shape so as to be shorter than the first coupling plate 4156. One end side of the second coupling plate 4158 is pivotally connected to (supported by) the other end side of the first coupling plate 4158. The other end side of the second coupling plate 4158 is connected to the output shaft 460. The second coupling plate 4158 and the output shaft 460 are connected to each other so as not to be capable of rotating relative to each other.

The output shaft 460 is rotatably supported by the housing 420 (the sleeve 430), so that the other end side of the second coupling plate 4158 is also rotatably supported by the housing plate 420.

The worm wheel 454 (the coupling shaft 455), the first coupling plate 4156 and the second coupling plate 4158 constitute a four-joint link mechanism including the housing 420 (the transmission mechanism accommodating portion 423).

The coupling shaft 455 is rotationally moved along the circumferential direction of the worm wheel 454 according to rotation of the worm wheel 454. The first coupling plate 4156 coupled to the coupling shaft 455 swings the second coupling plate 4158 by the rotational movement of the coupling shaft 455. Thereby, the output shaft 460 fixed to the second coupling plate 4158 is pivoted (pivoted in a reciprocating manner).

The first coupling plate 4156 and the second coupling plate 4158 are formed by performing a press work (a punching) to a sheet metal. Burrs "B" are formed on the back faces 4156h and 4158h of the first coupling plate 4156 and the second coupling plate 4158 in a projecting fashion.

The first coupling plate 4156 is arranged such that the back face 4156h faces the opening side. Therefore, the machined face 4156f of the first coupling plate 4156 faces the side of the bottom face 423s of the transmission mechanism accommodating portion 423 (the housing 420) to comes in sliding contact with the second coupling plate 4158.

The second coupling plate 4158 is arranged such that the back face 4158h faces the side of the bottom face 423s of the transmission mechanism accommodating portion 423 (the housing 420). Therefore, the machined face 4158f of the second coupling plate 4158 faces the opening side to come in sliding contact with the first coupling plate 4156.

Thus, since the first coupling plate 4156 and the second coupling plate 4158 are arranged such that the machined faces 4156f and 4158f come in sliding contact with each other, burrs "B" are prevented from coming in contact with each other. Therefore, the first coupling plate 4156 and the second coupling plate 4158 can slide or pivot smoothly.

The present invention is not limited to the above embodiments, but it goes without saying that the present invention can be variously modified without departing from the gist of the present invention.

The power transmission member 456, the coupling plate 457, the second sector gear 458, the first coupling plate 4156 and the second coupling plate 4158 are not limited to the case where they are formed by press work (punching). These members may be formed by laser working. In this case, dross pieces are formed on the back face sides of these members in a projecting manner without being formed with the burrs. By preventing the dross pieces from be brought into contact with each other, the power transmission member 456 and the like can be slid smoothly.

Figure 42:
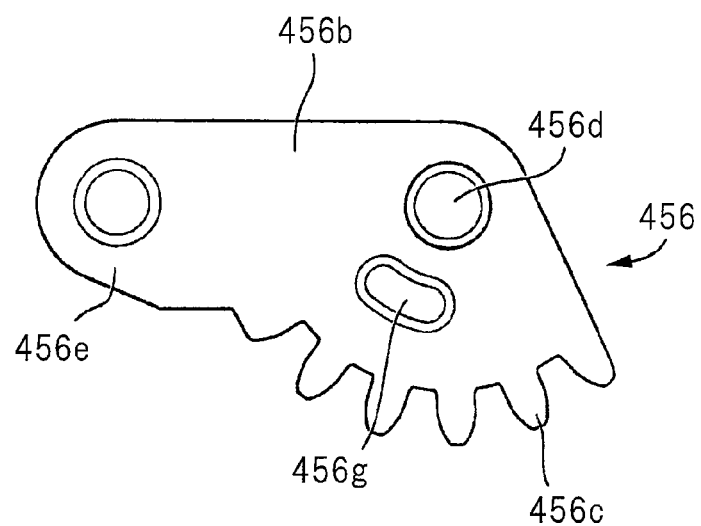
FIG. 42 is a view showing a recessed portion 456g of a power transmission member 456.

FIG. 42 is a view showing a recessed portion 456g of the power transmission member 456.

The case where the recessed portion 424g holding grease is formed on the sliding contact face 424 of the transmission mechanism accommodating portion 423 (the housing 420) has been described, but the present invention is not limited to this case. A recessed portion (a second recessed portion) 456g may be formed on the machined face 456f of the power transmission member 456. By causing the recessed portion 456g to hold grease, the same effect as that of the recessed portion 424g can be obtained.

The case where the worm shaft 452 and the worm wheel 454 cannot be rotated reversely (the case that a self-lock function is provided) has been described, but the present invention is not limited to this case. A case where the worm shaft 452 and the worm wheel 454 can be rotated reversely (a case where the self-lock mechanism is not provided) can be adopted.

The motor apparatus can be used to drive, in a swinging manner, a wiper arm for wiping a window glass provided to an automobile or the like to make a view of a driver or a person good.

The embodiments described above are provided by way of example only. The skilled person will be aware of many modifications, changes and substitutions that could be made without departing from the scope of the present disclosure. The claims of the present disclosure are intended to cover all such modifications, changes and substitutions as fall within the spirit and scope of the disclosure.

What is claimed is:

1. An electric motor to be applied as a motor section to a motor apparatus provided with a connector unit to which an external connector for supplying driving current to the motor section is connected, the electric motor comprising a motor case and four magnets each formed into an approximately arc shape in cross section, wherein the motor case has a side wall portion to which the four magnets attached, the side wall portion being composed of a pair of arc-shaped portions and a pair of straight portions, the straight portions intervening between the arc-shaped portions, the straight portions respectively having flat inner faces parallel to each other, the four magnets are housed in the motor case, arranged along a circumferential direction of the motor case at intervals of 90 degrees, and directly fixed to the arc-shaped portions such that gaps are respectively formed between the thin portions of the four magnets and the arc-shaped portions of the motor case, and gaps are respectively formed between the thin portions of the four magnets and the straight portions of the motor case, the four magnets are respectively arranged in the vicinity of four corners between the arc-shaped portions and the straight portions so that the inner face of one of the straight portions is partially overlapped with parts of two magnets, and the inner face of the other of the straight portions is partially overlapped with parts of the remaining magnets, a rotor is rotatably provided in an internal space formed by the four magnets, an armature shaft is axially aligned with the rotor and fixed to the rotor, a commutator is fixed to an approximately central portion of the armature shaft along an axial direction of the armature shaft, each of the four magnets has a thick portion and two thin portions smaller than in thickness than the thick portion, the thin portions being integrally formed on both sides of the thick portion in the circumferential direction of the motor case.

2. The electric motor according to claim 1, which is used as a driving source of a wiper apparatus for driving and swinging a wiper blade for wiping a windshield clean.

3. A motor apparatus provided with a connector unit to which an external connector for supplying driving current to a motor section is connected, wherein the motor section comprising a motor case and four magnets each formed into an approximately arc shape in cross section, wherein the motor case has an approximately oval-shaped cross section which has a pair of arc-shaped portions and a pair of straight portions, the four magnets are housed in the motor case, and fixed along a circumferential direction of the motor case at intervals of 90 degrees, the connector unit comprises:

a base portion provided with an opening portion in which an armature shaft extending from the motor section is inserted;

a connector connecting portion provided with a plug-in hole in which the external connector is plugged; and a plurality of conductive members arranged over the base portion and the connector connecting portion, wherein the conductive members respectively include connector-side connecting portions connected to the external connector so as to face the connector connecting portion from a first direction reversed to a plug-in direction of the external connector to the plug-in hole, base-side connecting portions connected to terminals or wirings provided in the base portion, and intermediate portions through which the connector-side connecting portions and the base-side connecting portions are electrically connected to each other, wherein the connector-side connecting portions of the respective conductive members are respectively inserted into a plurality of insertion holes provided at positions different from each other in a second direction intersecting the first direction, wherein the base-side connecting portions of the conductive members are respectively arranged at the same position in the second direction, the intermediate portions of the conductive members are respectively disposed at positions different from each other in the second direction, and the connector unit has supporting faces which are different in position from each other in the second direction, and which support the respective intermediate portions of the conductive members, wherein the four magnets are respectively arranged in the vicinity of four corners between the arc-shaped portions and the straight portions so that an inner face of one of the straight portions is partially overlapped with parts of two magnets, and an inner face of the other of the straight portions is partially overlapped with parts of the remaining magnets, each of the four magnets has a thick portion and two thin portions smaller than in thickness than the thick portion, the thin portions being integrally formed on both sides of the thick portion in the circumferential direction of the motor case, gaps are respectively formed between the thin portions of the four magnets and the arc-shaped portions of the motor case, and gaps are respectively formed between the thin portions of the four magnets and the straight portions of the motor case.

4. The motor apparatus according to claim 3, wherein a holder member holding the conductive members is provided between the same and the connector connecting portion so as to face from the first direction to the connector connecting portion.

5. The motor apparatus according to claim 4, wherein an insulating projection interposed between the conductive members adjacent to each other is formed on an inner face of the holder member facing the connector connecting portion.

6. The motor apparatus according to claim 3, wherein the connector unit is at least provided with a first attaching portion attached with a first conductive member and a second attaching portion attached with a second conducive member, the first attaching portion has a first supporting face on which a lower face of the intermediate portion of the first conductive member is placed, and a first positioning face rising from the first supporting face, on which a side face of the intermediate portion of the first conductive member is caused to abut, and the second attaching portion has a second supporting face extending from the first positioning face in parallel with the first supporting face, on which a lower face of the intermediate portion of the second conductive member is placed, and a second positioning face rising from the second supporting face, on which a side face of the intermediate portion of the second conductive member is caused to abut.

7. The motor apparatus according to claim 3, wherein the intermediate portions of the conductive members have respective flat portions parallel to the base-side connecting portions, and the flat portions of the intermediate portions are respectively supported by the first supporting faces.

8. A motor apparatus provided with a connector unit to which an external connector for supplying driving current to a motor section is connected, wherein the motor section comprising a motor case and four magnets each formed into an approximately arc shape in cross section, wherein the motor case has an approximately oval-shaped cross section which has a pair of arc-shaped portions and a pair of straight portions, the four magnets are housed in the motor case, and fixed along a circumferential direction of the motor case at intervals of 90 degrees, the connector unit comprises:

a base portion provided with an opening portion in which an armature shaft extending from the motor section is inserted;

a connector connecting portion provided with a plug-in hole in which the external connector is plugged; and a plurality of conductive members arranged over the base portion and the connector connecting portion, wherein the conductive members respectively include connector-side connecting portions connected to the external connector so as to face the connector connecting portion from a first direction reversed to a plug-in direction of the external connector to the plug-in hole, base-side connecting portions connected to terminals or wirings provided in the base portion, and intermediate portions through which the connector-side connecting portions and the base-side connecting portions are electrically connected to each other, wherein the connector-side connecting portions of the respective conductive members are respectively inserted into a plurality of insertion holes provided at positions different from each other in a second direction intersecting the first direction, wherein the base-side connecting portions of the conductive members are respectively arranged at the same position in the second direction, the intermediate portions of the conductive members are respectively disposed at positions different from each other in the second direction, and the connector unit has supporting faces which are different in position from each other in the second direction, and which support the respective intermediate portions of the conductive members.

9. The motor apparatus according to claim 8, wherein a holder member holding the conductive members is provided between the same and the connector connecting portion so as to face from the first direction to the connector connecting portion.

10. The motor apparatus according to claim 9, wherein an insulating projection interposed between the conductive members adjacent to each other is formed on an inner face of the holder member facing the connector connecting portion.

11. The motor apparatus according to claim 8, wherein the connector unit is at least provided with a first attaching portion attached with a first conductive member and a second attaching portion attached with a second conducive member, the first attaching portion has a first supporting face on which a lower face of the intermediate portion of the first conductive member is placed, and a first positioning face rising from the first supporting face, on which a side face of the intermediate portion of the first conductive member is caused to abut, and the second attaching portion has a second supporting face extending from the first positioning face in parallel with the first supporting face, on which a lower face of the intermediate portion of the second conductive member is placed, and a second positioning face rising from the second supporting face, on which a side face of the intermediate portion of the second conductive member is caused to abut.

12. The motor apparatus according to claim 8, wherein the intermediate portions of the conductive members have respective flat portions parallel to the base-side connecting portions, and the flat portions of the intermediate portions are respectively supported by the first supporting faces.

\* \* \* \* \*